INVENTOR:
Stanley P. Frankel
By Smyth, Roston & Pavitt
Attorneys

RECIRCULATING MEMORY TIMING

Filed Feb. 6, 1964

INVENTOR
Stanley P. Frankel
By Smyth, Roston & Pavitt
Attorneys

INVENTOR
Stanley P. Frankel

By Smyth, Roston & Pavitt
Attorneys

INVENTOR
Stanley P. Frankel
By Smyth, Roston & Pavitt
Attorneys

INVENTOR
Stanley P. Frankel
By Smyth, Roston & Pavitt
Attorneys

Add-Subtract Routine

INVENTOR
Stanley P. Frankel

By Smyth, Roston & Pavitt
Attorneys

June 30, 1970 S. P. FRANKEL 3,518,629

RECIRCULATING MEMORY TIMING

Filed Feb. 6, 1964 36 Sheets-Sheet 7

Multiply Routine

INVENTOR
Stanley P. Frankel

By Smyth, Roston & Pavitt
Attorneys

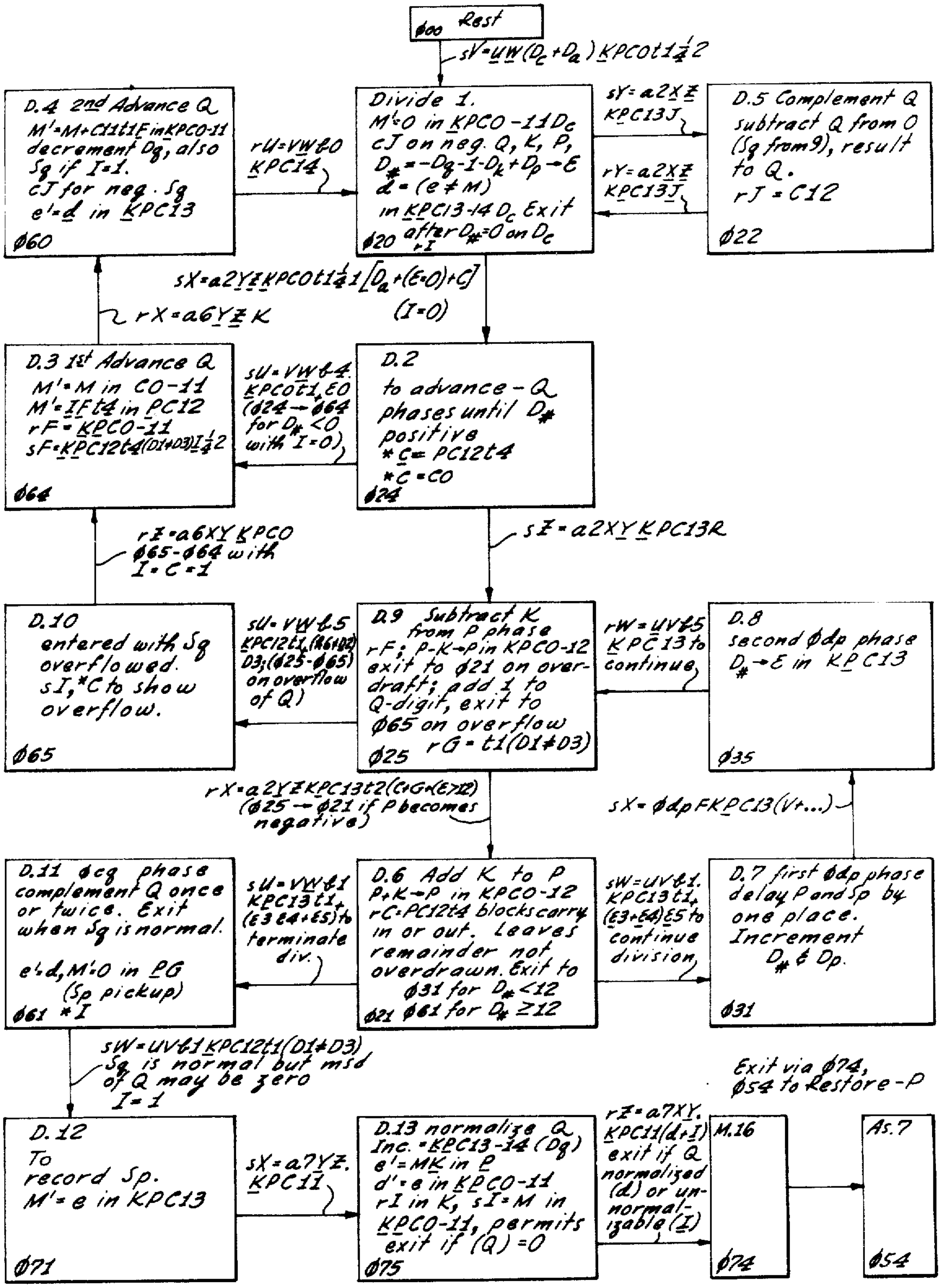
Fig. 11 Divide Routine
INVENTOR
Stanley P. Frankel
By Smyth, Roston & Pavitt
Attorneys Fig. 12 Restore-P Routine
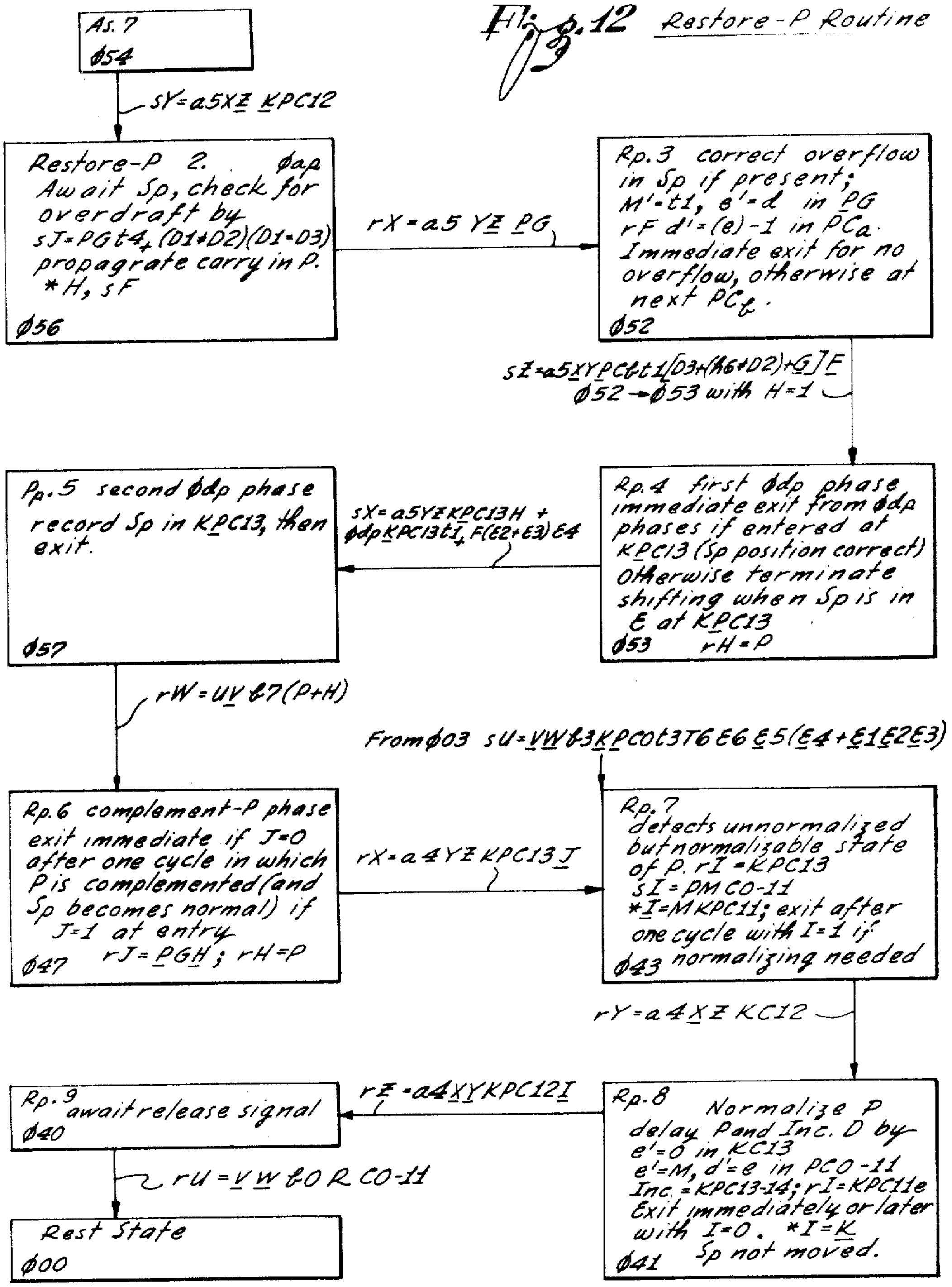
INVENTOR
Stanley P. Frankel
By Smyth, Roston & Pavitt
Attorneys June 30, 1970 S. P. FRANKEL 3,518,629
RECIRCULATING MEMORY TIMING
Filed Feb. 6, 1964 36 Sheets-Sheet 10
Fig. 13 Transfer routine and Enter Digit routine
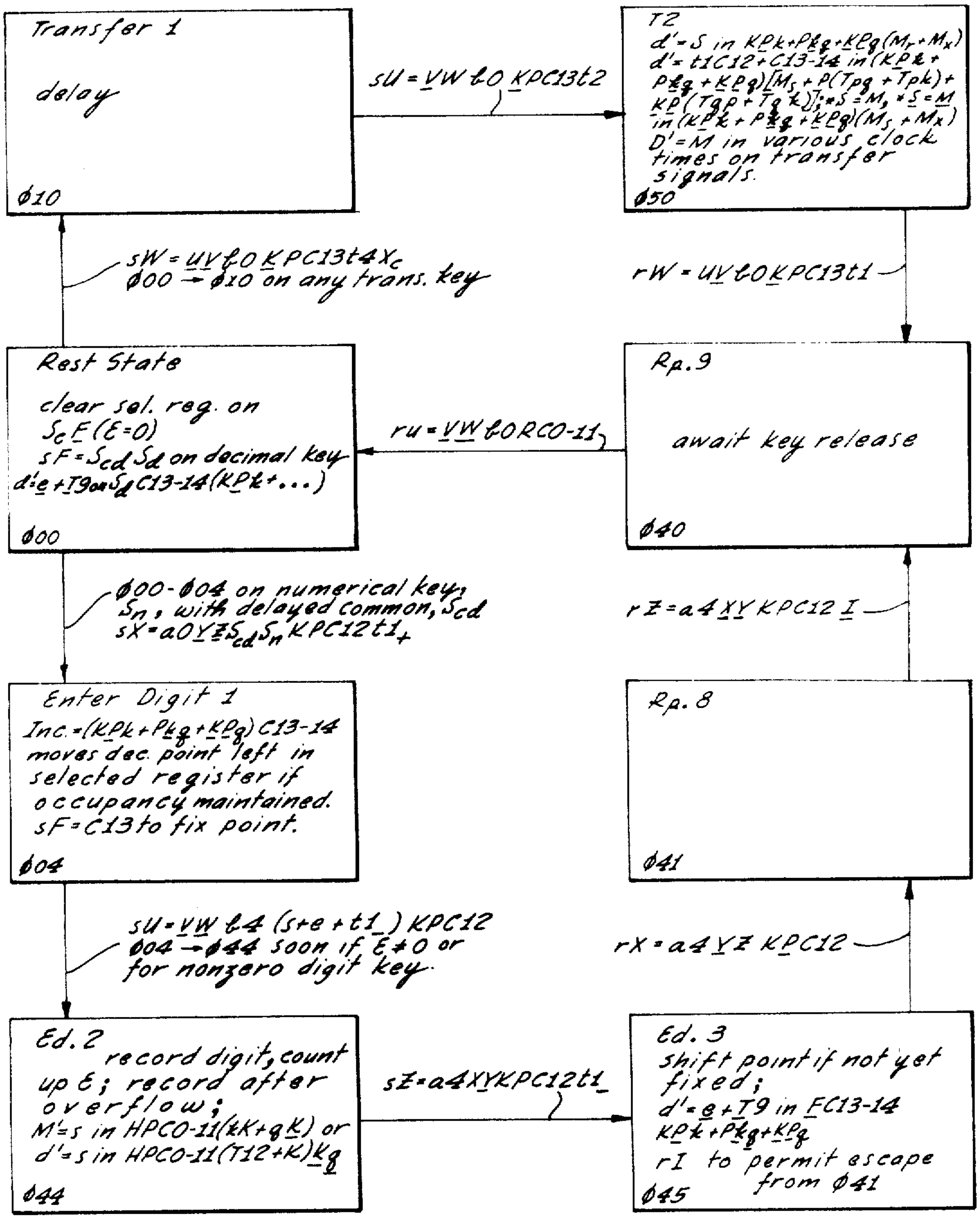
INVENTOR
Stanley P. Frankel
By Smyth, Roston & Pavitt
Attorneys INVENTOR
Stanley P. Frankel
By Smyth, Roston & Pavitt
Attorneys cT0 = 1 (Unconditional)
*T1 = T0T1
*T1 = T0T1 (T2 + T3 + T4 + T5T6T7T8)
cT2 = T0T1
cT3 = 1 (Unconditional)
cT4 = T3
cT5 = T3T4
cT6 = T3T4T5
n1 = T3T4T5
n2 = n1T2T6
n3 = n2T0
n4 = T1T2Tgp
n5 = T1T2T3T4T5
enable Cp = DLa + T0 + T1 + T2 + T3 + T4 + Cp
N127 = n5T0T6

INVENTOR
Stanley P. Frankel
By Smyth, Roston & Pavitt
Attorneys

June 30, 1970 S. P. FRANKEL 3,518,629

RECIRCULATING MEMORY TIMING

Filed Feb. 6, 1964 36 Sheets-Sheet 13

INVENTOR
Stanley P. Frankel
By Smyth, Roston & Pavitt
Attorneys

INVENTOR
Stanley P. Frankel
By Smyth, Roston & Pavitt
Attorneys

INVENTOR
Stanley P. Frankel
By Smyth, Roston & Pavitt
Attorneys

INVENTOR
Stanley P. Frankel
By Smith Roston & Pavitt
Attorneys

INVENTOR
Stanley P. Frankel
By Smyth, Roston & Pavitt
Attorneys

June 30, 1970 S. P. FRANKEL 3,518,629

RECIRCULATING MEMORY TIMING

Filed Feb. 6, 1964 36 Sheets-Sheet 18

INVENTOR
Stanley P. Frankel
By [signature]
Attorneys

INVENTOR
Stanley P. Frankel
By Angell, Rosten & Pavitt
Attorneys

FIG. 29

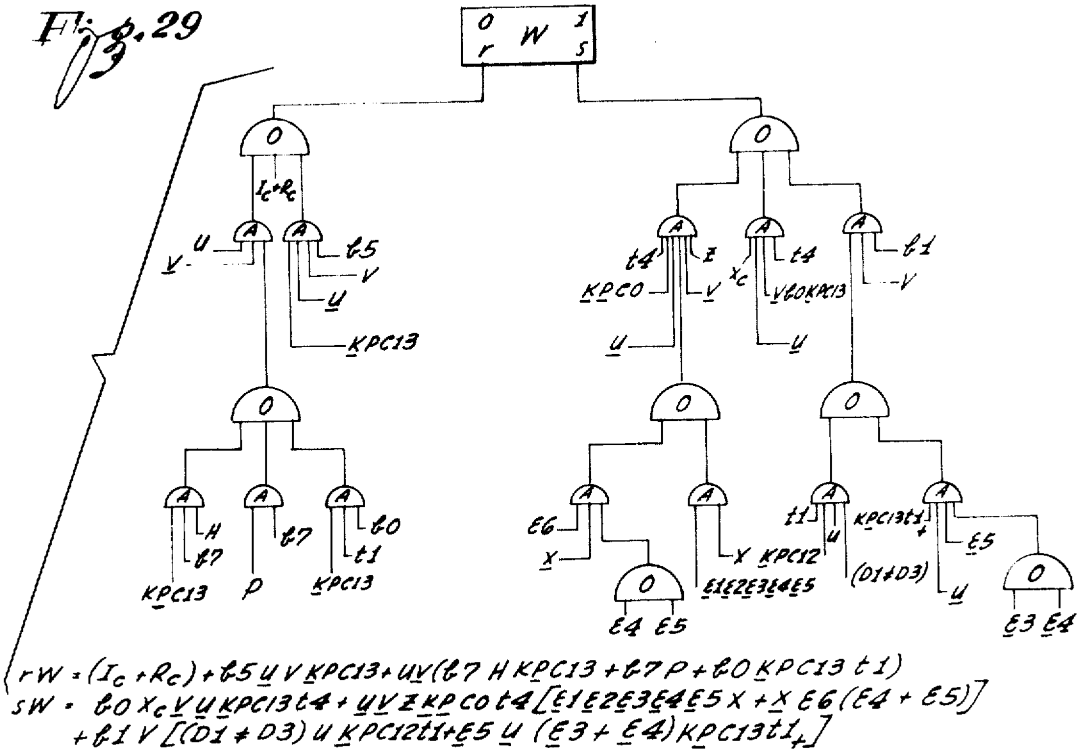

$$rW = (I_c + R_c) + t5\,\underline{u}\,V\,\underline{K}PC13 + u\underline{v}(t7\,H\,K\underline{P}C13 + t7\,P + t0\,\underline{K}PC13\,t1)$$

$$sW = t0\,X_c\,\underline{V}\,\underline{u}\,\underline{K}PC13\,t4 + \underline{u}\,\underline{v}\,Z\,\underline{K}\underline{P}C0\,t4[E1\underline{E}2\underline{E}3\underline{E}4E5\,X + \underline{X}\,E6(E4 + E5)] + t1\,V[(D1 + D3)\,u\,\underline{K}PC12\,t1 + \underline{E}5\,\underline{u}\,(\underline{E}3 + \underline{E}4)K\underline{P}C13\,t1_+]$$

FIG. 31

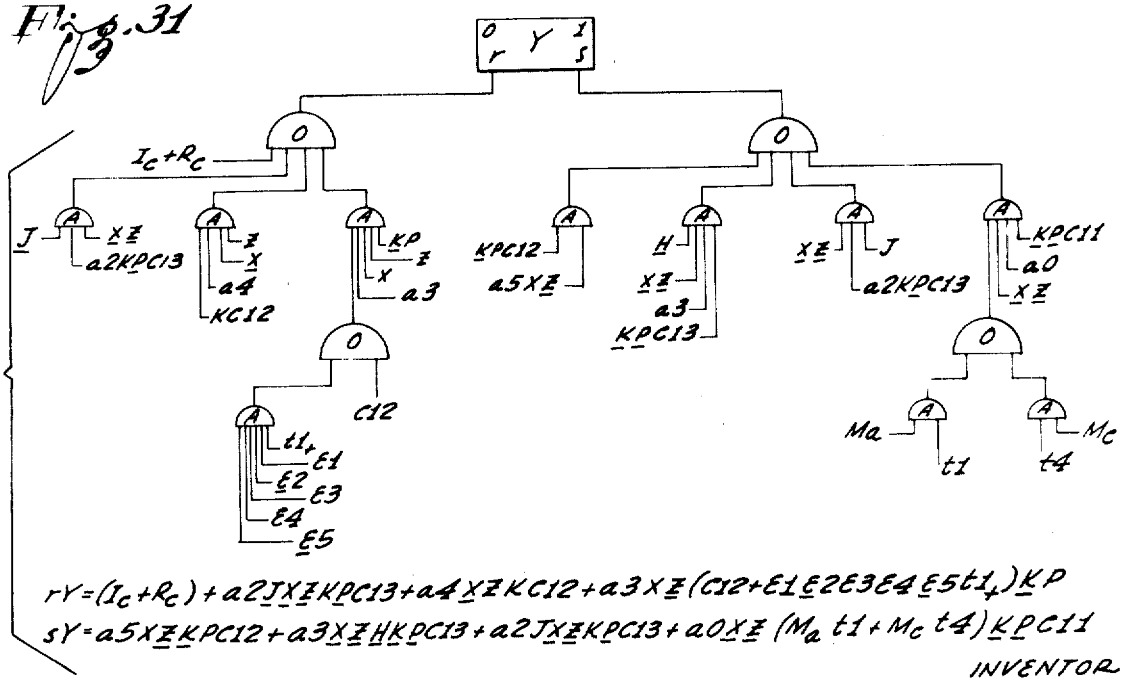

$$rY = (I_c + R_c) + a2\underline{J}X\underline{Z}K\underline{P}C13 + a4\underline{X}ZKC12 + a3X\underline{Z}(C12 + E1\underline{E}2E3E4\underline{E}5t1_+)\underline{K}\underline{P}$$

$$sY = a5X\underline{Z}\underline{K}PC12 + a3\underline{X}\underline{Z}\underline{H}K\underline{P}C13 + a2J\underline{X}\underline{Z}K\underline{P}C13 + a0\underline{X}\underline{Z}(M_a\,t1 + M_c\,t4)\underline{K}\underline{P}C11$$

INVENTOR
Stanley P. Frankel
By Smyth, Roston & Pavitt
Attorneys

INVENTOR
Stanley P. Frankel

By Smyth, Roston & Pavitt
Attorneys $rZ = (I_c+R_c) + a1XFP + a3XYP + a4XYIKPC12 + a0XYR + XY[a6C0 + a7C11(d+I)]KP$ $sZ = a3XYKPC12 + a2XYKPC13 + a4XYKPC12t1 + a5XYFt1[D3+G+(R6 \neq D2)]PC_l$
$+ a0Xt2(A+S_l+Y)KPC11$ INVENTOR
Stanley P. Frankel
By Smyth, Roston & Pavitt
Attorneys

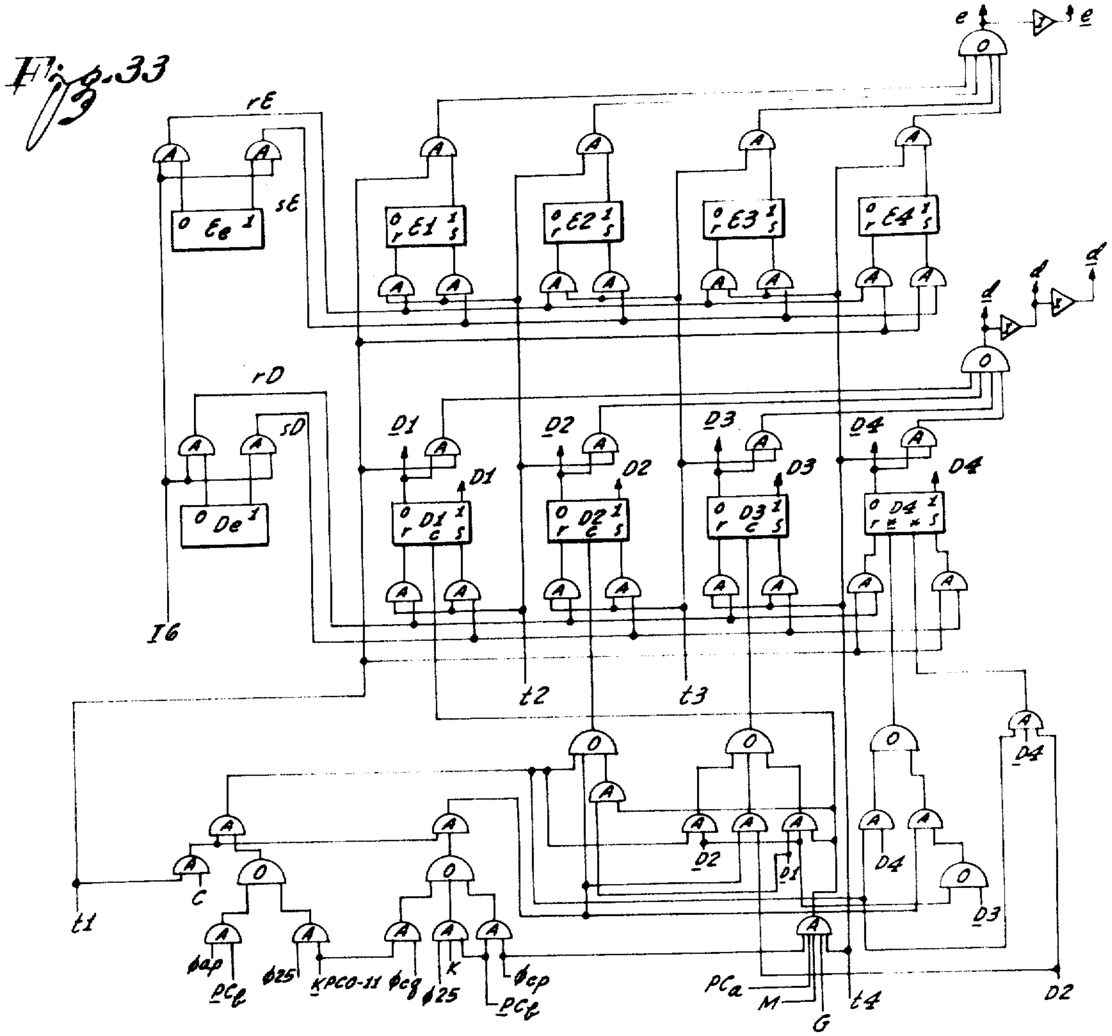

Fig. 33

$e = E1t1 + E2t2 + E3t3 + E4t4$ $\underline{d} = \underline{D}1t1 + \underline{D}2t2 + \underline{D}3t3 + \underline{D}4t4$ $rE = \underline{E}e\underline{I}6 \; ; \; sE = Ee\,\underline{I}6$ $rE1 = rEt2 ; sE1 = sEt2 ; rE2 = rEt3 ; sE2 = sEt3$ $rE3 = rEt4 ; sE3 = sEt4 ; rE4 = rEt1 ; sE4 = sEt1$ $rD = \underline{D}e\,\underline{I}6 ; sD = De\,\underline{I}6$ $rD1 = rDt2 ; sD1 = sDt2 ; rD2 = rDt3 ; sD2 = sDt3$ $rD3 = rDt4 ; sD3 = sDt4 ; rD4 = rDt1 ; sD4 = sDt1$ $cD1 = \phi ep\, PC_a\, t4\, MG$ $cD2 = [(\phi ap + \phi 25K + \phi cp)\underline{P}C_f + (\phi 25 + \phi cq)\underline{K}PC0\text{-}11]t1C + \phi ep\, PC_a\, t4\, MG\underline{D}1$ $cD3 = \{[\phi ap\, \underline{D}2 + (\phi 25K + \phi cp)D2]\underline{P}C_f + (\phi 25\underline{D}2 + \phi cq\, D2)\underline{K}PC0\text{-}11\}t1C + \phi cp\, PC_a\, t4MG\underline{D}1\underline{D}2$ $*\underline{D}4 = \{[\phi ap\, D4 + (\phi 25K + \phi cp)(\underline{D}2 + \underline{D}3)]\underline{P}C_f + [\phi 25D4 + \phi cq\,(\underline{D}2 + \underline{D}3)]\underline{K}PC0\text{-}11\}\, t1C$ $*D4 = (\phi ap\, \underline{P}C_f + \phi 25\,\underline{K}PC0\text{-}11)\, t1CD2\underline{D}4$ INVENTOR
Stanley P. Frankel
By [illegible]
Attorneys INVENTOR
Stanley P. Frankel
By Smyth, Roston & Pavitt
Attorneys INVENTOR
Stanley P. Frankel
By [signature]
Attorneys INVENTOR
Stanley P. Frankel
By Smyth, Roston & Pavitt
Attorneys

Fig. 37

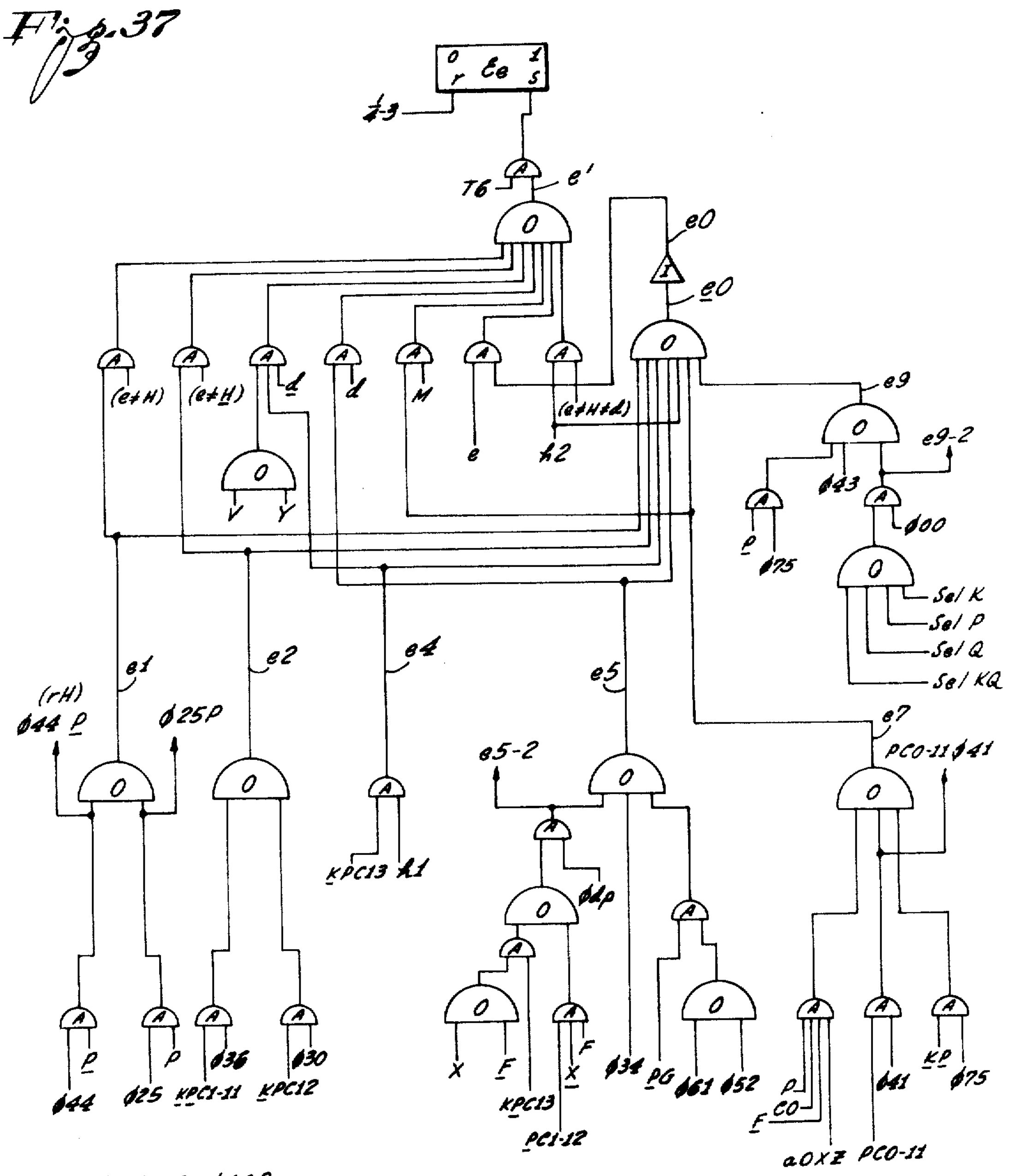

$e1 = \phi 25P + \phi 44\underline{P}$ $e2 = \phi 36\underline{K}\underline{P}C1\text{-}11 + \phi 30\underline{K}PC12$ $e4 = \hbar 1\,\underline{K}PC13$ $e5 = e5\text{-}2 + \phi 34 + (\phi 61 + \phi 52)\underline{P}G$ $e5\text{-}2 = \phi dp[\underline{X}F\underline{P}C1\text{-}12 + (X + \underline{F})K\underline{P}C13]$ $e7 = aOXZ\,PCO\underline{F} + \phi 75\underline{K}\underline{P} + \phi 41\,PCO\text{-}11$ $e9 = \phi 43 + \phi 75\underline{P} + e9\text{-}2;\ e9\text{-}2 = \phi 00(Sel.K + Sel.Q + Sel.P + Sel.KQ)$ $\underline{e}0 = e1 + e2 + \hbar 2 + e4 + e5 + e7 + e9$ $e' = [e1(e \neq H) + e2(e \neq \underline{H}) + \hbar 2(e \neq H \neq d) + e4\underline{d}(V+Y) + e5d + e7M + e0e]$ $rEe = \bar{t}3$ $sEe = e'T6$ INVENTOR
Stanley P. Frankel
By Smyth, Roston & Pavitt
Attorneys INVENTOR
Stanley P. Frankel
By Smyth, Roston & Pavitt
Attorneys INVENTOR
Stanley P. Frankel
By Smyth, Roston & Pavitt
Attorneys INVENTOR
Stanley P. Frankel
By Smyth, Roston & Pavitt
Attorneys

Fig. 43

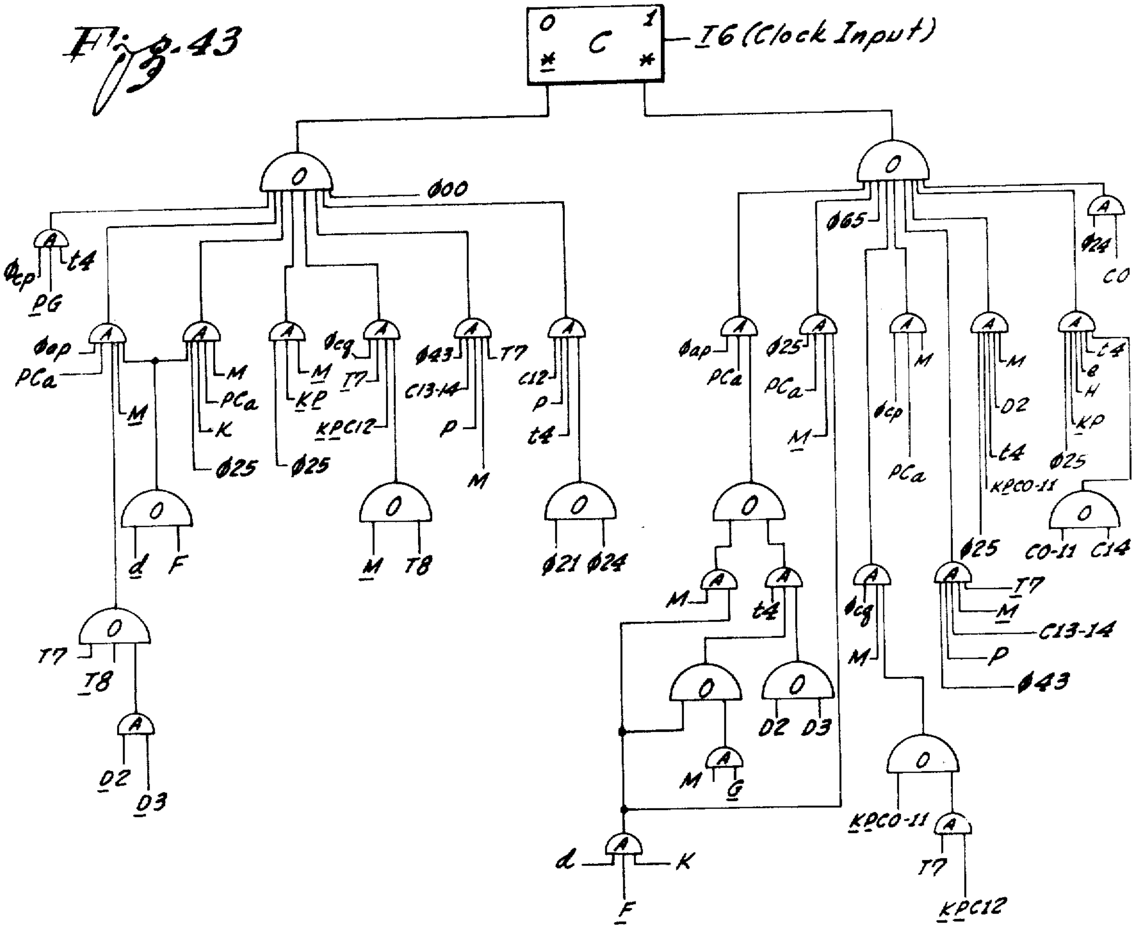

$*C = \phi_{ap}\, PC_a\, (Md\underline{F}K + t4(D2+D3)(M\underline{G} + d\underline{F}K)) + \phi_{25} KPC_a\, d\underline{F}\underline{M} + \phi_{cq}\, \underline{K}\,\underline{P}\, M(CO\text{-}11 + C12\,T7)$
$+ \phi_{65} + \phi_{24}\, CO + \phi_{cp}\, PC_a\, M + \phi_{43}\, PC13\text{-}14\,\underline{M}\,\underline{T}7 + \phi_{25}\, \underline{K}P(C14 + CO\text{-}11)\, H\, e\, t4$
$+ \phi_{25}\, \underline{K}\underline{P}\, CO\text{-}11\, t4\, D2\, M$ $*\underline{C} = \phi_{ap}\, PC_a\, \underline{M}\, (\underline{d} + F)(\underline{t}4 + \underline{D}2\underline{D}3) + \phi_{25} KPC_a (\underline{d}+F) M + \phi_{25} \underline{K}\underline{P}\underline{M} + \phi_{cq}\, \underline{K}PC12(\underline{Mt1}+\underline{t4})$
$+ \phi_{cp}\, \underline{P}G\, t4 + \phi_{43}\, PC13\text{-}14\, M\, T7 + (\phi_{21} + \phi_{24})\, PC12\, t4 + \phi_{00}$ INVENTOR
Stanley P. Frankel
By Smyth, Roston & Pavitt
Attorneys rH = t1[φ36+φ52+φ44P(KC12)+Pφ30+φ02KPC14]+(φ53+φcp)P+h2t1+
sH=φ25KPCO-11t1+φ25KPC14t3+φ44P[KC14kq t4+t1(KC12+CO-11)+C14t3(k+q)]
*H=h2d(e≠P)+φ25Pe+φ44Pe
*H=φ56+h2d(e≠P)+φ02E5KPCO+φ02eKPC14+φ36e KPC1-11+e(φ30+φ52)

INVENTOR
Stanley P. Frankel
By Smyth, Roston & Pavitt
Attorneys

RECIRCULATING MEMORY TIMING

Filed Feb. 6, 1964 36 Sheets-Sheet 33

INVENTOR
Stanley P. Frankel
By Smyth, Roston & Pavitt
Attorneys

RECIRCULATING MEMORY TIMING

INVENTOR
Stanley P. Frankel
By [signature]
Attorneys

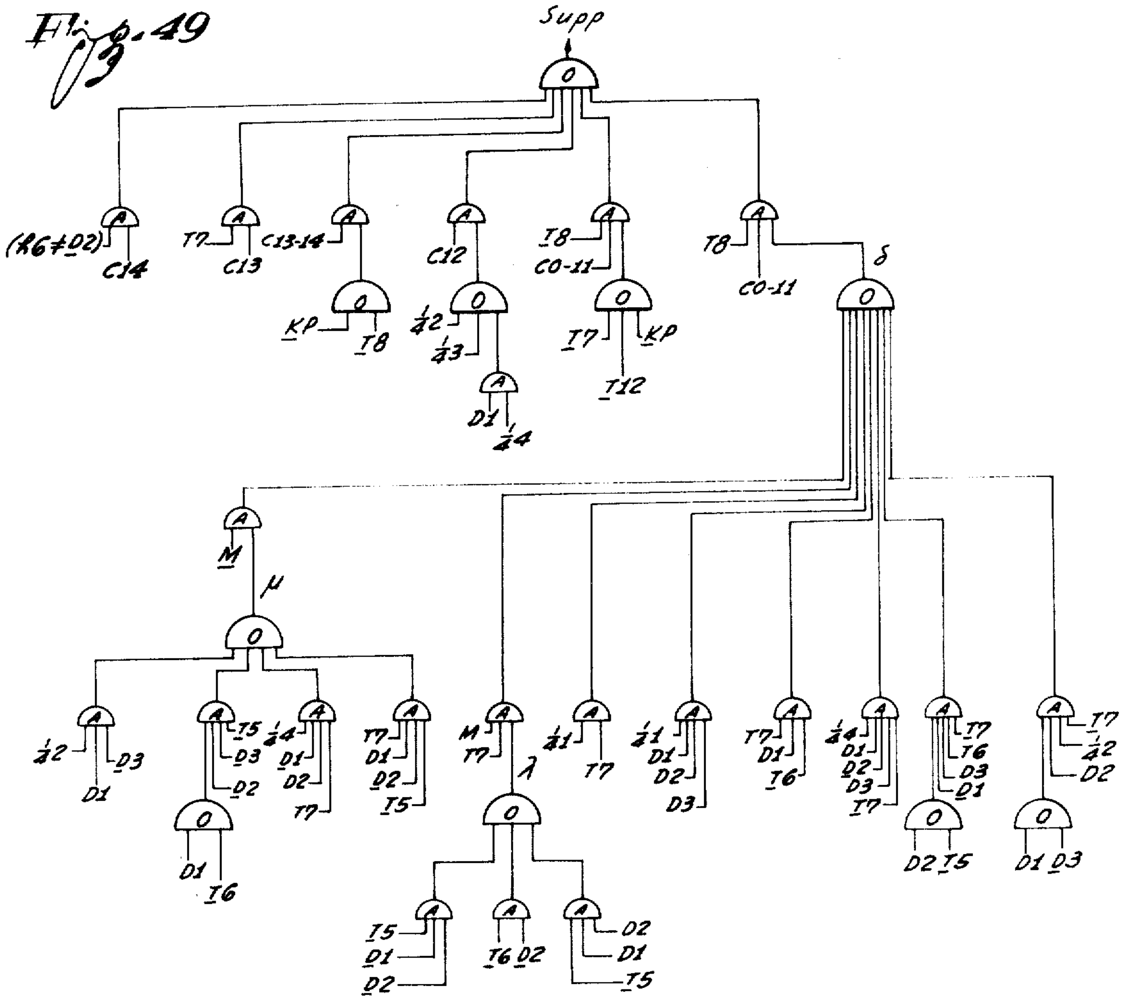

Fig. 49

$$\mu = D1\underline{D}3\underline{A}'2 + \underline{D}2\underline{D}3\underline{T}5(D1+\underline{T}6) + \underline{D}1\,D2\,T7\underline{A}'4 + D1\underline{D}2\underline{T}5T7$$

$$\lambda = \underline{D}1\underline{D}2\underline{T}5 + \underline{D}2\underline{T}6 + D1D2\underline{T}5$$

$$\delta = \mu\underline{M} + \lambda MT7 + T7\underline{A}'1 + D1D2D3\underline{A}'1 + D1\underline{T}6T7 + D1\underline{D}2D3\underline{T}7\underline{A}'4 + \underline{D}1D3T6\underline{T}7(D2+\underline{T}5) + D2\underline{T}7\underline{A}'2(D1+\underline{D}3)$$

$$Supp = (R6 \neq \underline{D}2)C14 + T7C13 + (\underline{K}P + \underline{T}8)C13\text{-}14 + S_{SC} + \underline{T}8\,CO\text{-}11(\underline{K}P + \underline{T}12 + \underline{T}7) + \delta T8\,CO\text{-}11$$

$$S_{SC} = (\underline{A}'2 + \underline{A}'3 + D1\underline{A}'4)C12$$

INVENTOR
Stanley P. Frankel
By Smyth, Roston & Pavitt
Attorneys

Fig. 50
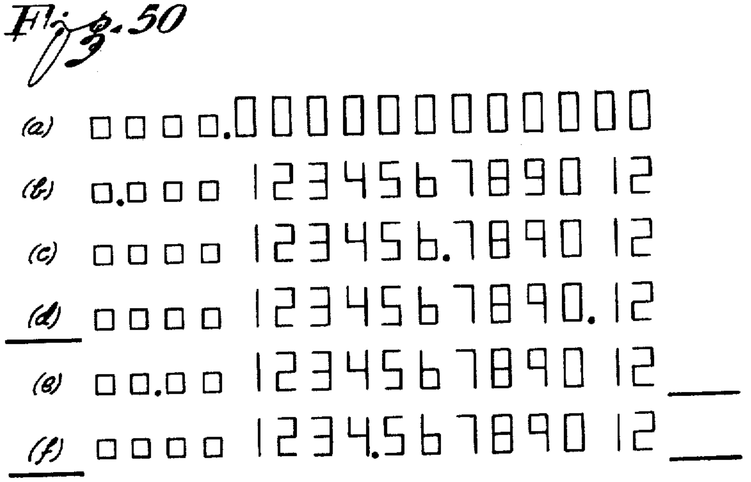
Fig. 51 (Clock Generator)
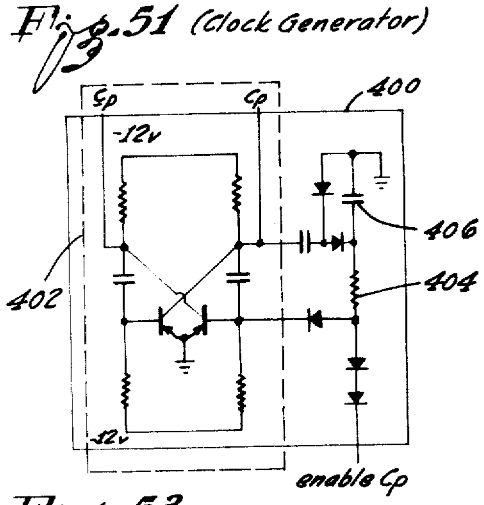
Fig. 52 (Flip-Flop)
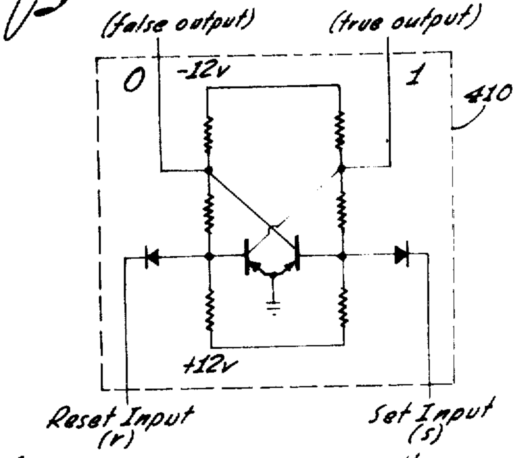
Fig. 53 Fig. 54
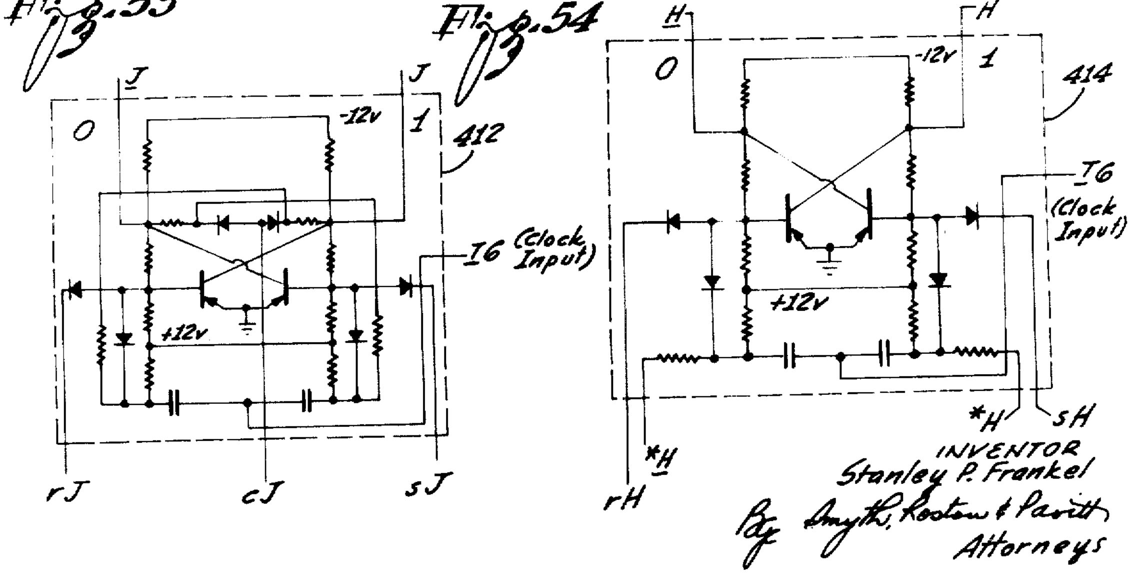
INVENTOR
Stanley P. Frankel
By Smyth, Roston & Pavitt
Attorneys United States Patent Office 3,518,629

Patented June 30, 1970

3,518,629
RECIRCULATING MEMORY TIMING

Stanley P. Frankel, Los Angeles, Calif., assignor to Computron Corporation, Oakland, Calif., a corporation of California Filed Feb. 6, 1964, Ser. No. 342,881
Int. Cl. G11c *21/00, 21/02*
U.S. Cl. 340—172.5 12 Claims

ABSTRACT OF THE DISCLOSURE

A delay line memory is disclosed in which temperature compensation is made unnecessary by provision of an inter-controlled counter-multivibrator combination for operating the delay line. The multivibrator is metastable—that is, conditionally monostable, its astability being dependent upon detection of the first pulse to emerge from the delay line.

The first pulse, though a marker pulse, is indistinguishable from the data pulses except that at the time of its arrival the counter is at a given count and the multivibrator is in its stable state. To guard against blocked operation caused by multivibrator entry into the stable state before any data pulses are recorded in the memory, an RC circuit is used to reestablish the astable or "free running" condition, spontaneously, if this does not occur within respective time limits.

BACKGROUND AND SUMMARY OF THE INVENTION

This application relates to an electronic desk calculator. More specifically, the application relates to an electronic binary-coded decimal digital desk calculator.

The desk calculators now or previously on the market are of a mechanical construction and are designed to perform a variety of functions, including those of addition, subtraction, multiplication and division. These mechanical desk calculators usually operate on a digital basis. Mechanical desk calculators have major disadvantages in that they are comparatively slow in their operation and relatively inflexible in their application. For example, some of the prior art desk calculators have huge multi-keyed keyboards for inserting the numbers which are used as part of the arithmetic computations. Further, most of the prior art mechanical desk calculators only have a single entry register which limits the flexibility of the arithmetic operations which may be performed with the calculator. One object of the desk calculator of the present invention is, therefore, to provide an electronic desk calculator which will have significantly faster operation and greater flexibility than desk calculators of the prior art.

Another object of the desk calculator of the present invention is to use a cathode ray tube for simultaneously displaying a plurality of decimal digits in a plurality of register positions. The desk calculator has three registers. Two of the registers hold twelve significant digits and the third register holds twenty-four significant digits. The two short registers are each displayed in a single line on the face of the cathode ray tube and the long register is split into halves with each half displayed in a single line on the face of the cathode ray tube. There are, therefore, four rows of digits displayed representing three registers. To the left of each of the three registers are four zeros which permanently appear on the face of the cathode ray tube. The four permanent zeros are used so that the maximum number of significant digits can be entered into each register for numbers which are smaller than 0.1 but equal to or larger than 0.00001. All of the digits which are inserted into the registers appear on the cathode ray display.

Digits are inserted into any of the three registers of the desk calculator by using a single ten-digit keyboard. The particular register to which the digits and other information are entered is chosen by the use of one of a plurality of register selection keys. These keys allow the entry of information to any one of the registers and also allow, in one instance, the entry of information to two registers at the same time. In addition to the above, there is an automatic control which provides entry to a particular one of the plurality of registers at all times. The keyboard of the desk calculator also includes keys which provide positive or negative signs. The sign information can be entered into a register at any time during the entry of the digits and can be changed at will. The keyboard of the desk calculator also includes a decimal point key. The decimal point in each register normally appears to the left of the most significant digit position. If non-zero digits are initially entered into a register, the decimal point moves to the right until the decimal point key is operated. At this time the decimal point is fixed. If zeros are initially entered into a register, the decimal point moves to the left until a non-zero digit is entered.

The desk calculator can perform various arithmetic computations which are controlled by individual keys on the keyboard. The term "arithmetic" is used in this application to include all the various computations which can be performed by the desk calculator. These include add, subtract, multiply, divide, accumulative multiply, and accumulative divide. The desk calculator will perform all of the above computations using positive and/or negative numbers together with associated decimal points.

Each of the working registers described above has associated with it a surrogate register to operate as a memory. The information which is entered into the desk calculator and which is operated upon in the desk calculator is part of the content of the working registers, but it is also possible to store, recall and exchange information between each working register and its complementary surrogate register. These functions are controlled by store, recall and exchange keys on the keyboard of the desk calculator. It is also possible to transfer information from one working register to another working register by the use of transfer keys which are located on the keyboard of the desk calculator.

The information which is inserted into the desk calculator continuously circulates in the form of a train of pulses. Each pulse position may be occupied by a pulse or, alternatively, may be unoccupied, and represents a single bit of information. Four such bits make up a character. Each four bits may represent either a decimal or a non-decimal character. The pulses pass through a delay line which operates as the memory. The length of the delay line is longer than required by the total number of pulses used in each cycle. The pulses are paced by a clock generator. In order to compensate for any timing errors in the desk calculator, each cycle of circulation is initiated by a marker pulse having the same characteristics as a bit representing the binary value "1". At the end of each cycle, the clock generator enters a metastable state until the appearance of the marker pulse.

Another obect of the desk calculator of the present invention is to interleave the bits of information so as to slowly present the successive bits of information as they leave the delay line. It is also desirable to interleave the decimal digits of the different registers to facilitate the arithmetic computations performed by the desk calculator. One of the short registers is interleaved with the first half of the long register, and the other of the short registers is interleaved with the second half of the long register. The bits of information are arranged in groups of least significant bits, next most significant bits, and so on, to the most significant bits.

The desk calculator uses a floating decimal point system. When all the necessary information has been inserted into the registers, an arithmetic operation key is pressed. During the arithmetic operation, the position of the decimal point of the result is automatically computed. If, after the arithmetic operation, the decimal point is off scale, it is carried around to the other end of the register. If the decimal point is off scale to the left, which indicates a small number, a streak appears on the lefthand side of the display. If the decimal point is off scale to the right, which indicates a large number, a streak appears on the righthand side of the display. The streaks can only operate within a certain range and if the number is either extremely large or extremely small, both streaks appear.

The desk calculator uses six flip-flops to distinguish various conditions of operation. These six flip-flops are interrelated to give sixty-four possible states which are called phases. The desk calculator uses a plurality of routines wherein each routine is a linear progression of states which are occupied in succession by the change of one of the basic flip-flops for each step in the progression. The routines also include branches or loops. The basic routines are add-substract and accumulative multiply and accumulative division which include multiply and division. Within the basic routines are other activities which are common to the basic routines. These activities include delaying or advancing the information in a register so as to align the digits of two registers. Other activities which are basic to all the routines are sub-additions and subtractions as part of all the arithmetic computation.

Another activity which is used in the divide routine is the augmentation of a register. For example, as the division progresses, the register which displays the quotient is augmented each time a successful subtraction is made. Also, during some of the basic routines it is sometimes necessary to complement a number.

After any of the arithmetic operations, it may be necessary to restore to a normal form the number which appears as the answer. This may means delaying or advancing the number to the proper position, recomplementing if the number appears in the complemented form and other normalizing activities. A clearer understanding of the desk calculator will be had with reference to the following figures wherein:

BRIEF DESCRIPTION OF THE DRAWING

FIG. 11 is a flow chart of the Divide routine;

FIG. 12 is a flow chart of the Restore-P routine;

FIG. 13 is a flow chart of the Transfer and Enter Digit routines;

FIGS. 27 to 32 are block diagrams of the phase changing flip-flops U, V, W, X, Y and Z and the associated controlling circuitry;

FIG. 33 is a block diagram of the E1–E4 and D1–D4 flip-flops and the associated control circuitry;

FIG. 37 is a block diagram of the circuitry used to produce the *e'* signal;

FIG. 43 is a block diagram of the C flip-flop and its associated control circuitry;

FIG. 49 is a block diagram of the beam suppression system for the cathode ray display unit of the desk calculator;

FIGS. 50(*a*) to (*f*) is a series of typical displays showing various decimal point indications;

FIG. 51 is a schematic diagram of a clock generator which may be used for the clock generator of FIG. 17;

FIG. 52 is a schematic diagram of a basic flip-flop having set (*s*) and reset (*r*) inputs;

FIG. 53 is a schematic diagram of a flip-flop incorporating the basic flip-flop of FIG. 52 and additionally including a complement (*c*) input; and FIG. 54 is a schematic diagram of a flip-flop incorporating the basic flip-flop of FIG. 52 and additionally including star (*) inputs.

DETAILED DESCRIPTION OF THE INVENTION

Figure 1:
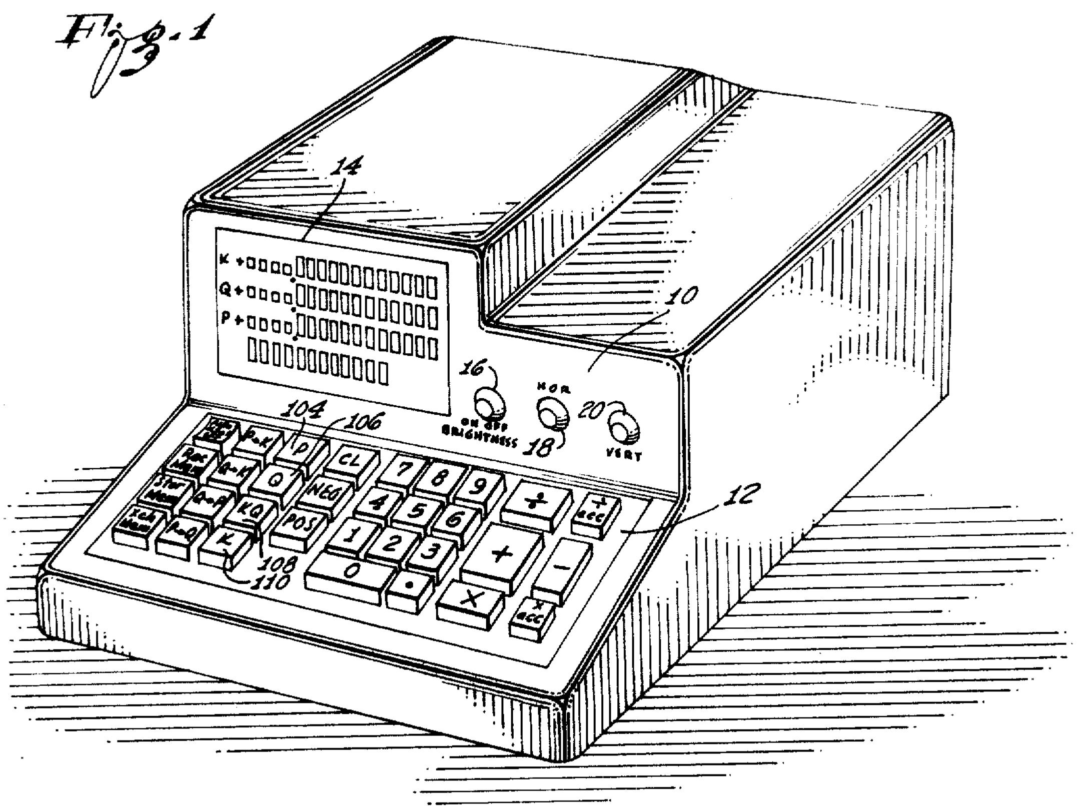
FIG. 1 is a view of the outward configuration of the desk calculator showing the keyboard, display and display controls.

The outward configuration of the desk calculator is shown in FIG. 1. The desk calculator includes a vertical face 10 and a horizontal face 12. A cathode ray display unit 14 is mounted to display information at the vertical face 10. The cathode ray unit 14 displays the contents of three registers K, Q and P. Registers K and Q are each displayed in a single line whereas the register P display is split up into two lines. Controls are mounted on the vertical face 10 to regulate the operation of the cathode ray unit 14. The controls include a combined on-off switch and variable brightens control 16, a horizontal control 18 and a vertical control 20.

The horizontal face 12 includes the keyboard controls for the desk calculator. The keyboard is more clearly shown in FIG. 2. The keyboard for the desk calculator uses a ten-key digit keyboard 100 which is used to enter numbers into the different registers. A decimal key 102 places a decimal point in the appropriate position in a register as a number is being set into a register. Also included on the keyboard are register selection keys 104, 106, 108 and 110 for selecting the entry into registers P, Q, KQ (that is, into both K and Q) and K, respectively. A switch 112 provides an automatic selection of the K register after each arithmetic operation.

A clear key 114 is included on the keyboard for clearing all the registers. Keys 116 and 118 are used to indicate the negative or positive character of numbers as they are entered into appropriate registers. Four keys 120, 122, 124 and 126 are used to transfer numbers from one register to another. Key 120 transfers a number entered into the P register to the K register. The other keys provide transfer functions as illustrated on the face of the keys shown in FIG. 2.

Three keys 128, 130 and 132 provide functions in conjunction with an auxiliary or "surrogate" memory contained within the desk calculator. Key 128 recalls information which has been previously stored in the surrogate memory. Key 130 stores information in the surrogate memory, and key 132 exchanges information between a selected register and the surrogate memory.

The right side of the keyboard contains the various keys which control the arithmetic operations in the desk calculator. Key 134 is the add button, key 136 is the subtract button, key 138 is the multiply button and key 140 is the divide button. Two additional keys 142 and 144 provide a multiplication or division in the desk calculator with a concurrent accumulation of the answer from the multiplication or division with a number stored in the desk calculator.

Figures 3, 4:
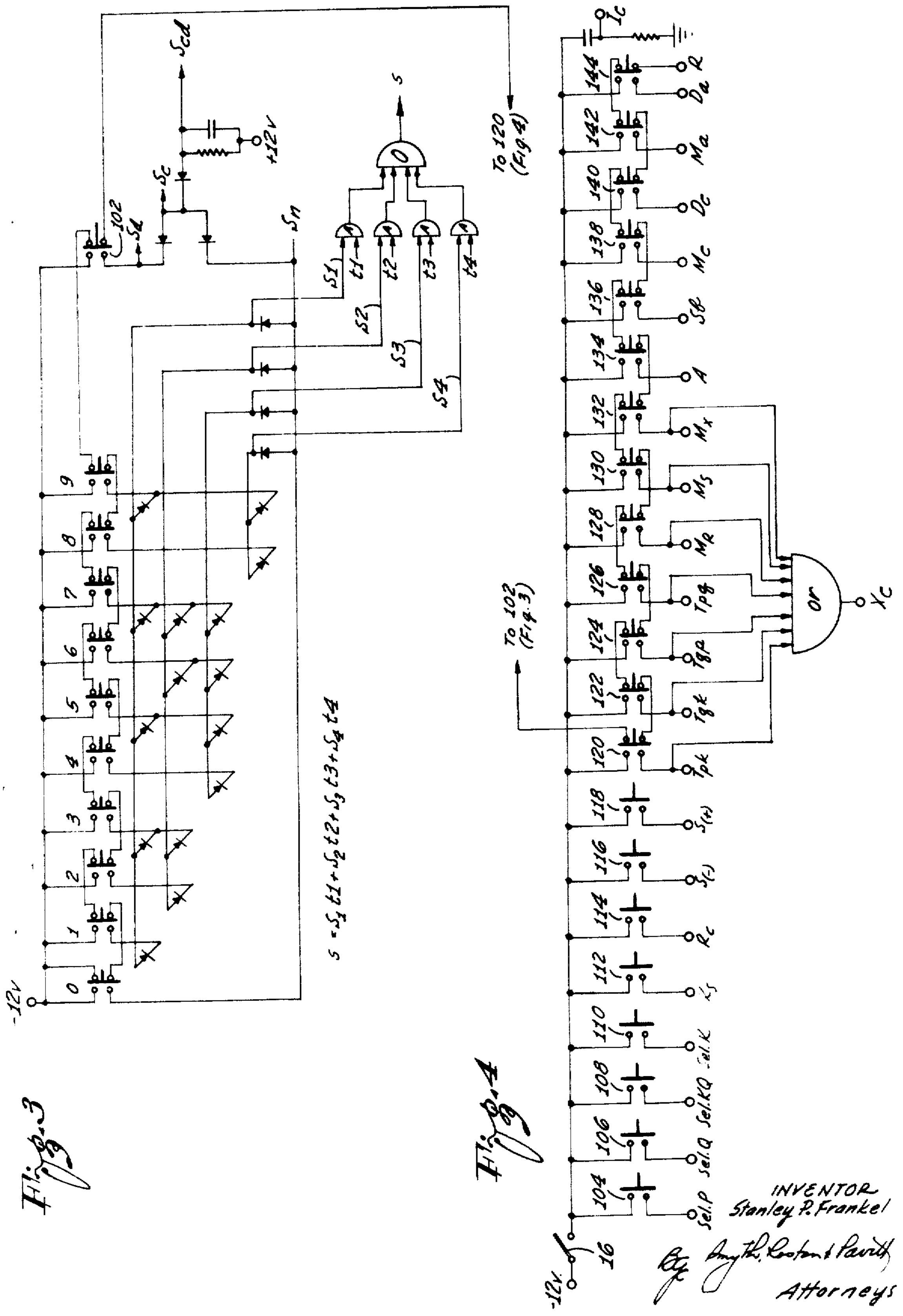
FIG. 3 is a schematic drawing showing the production of signals from the decimal digit and decimal point keys of FIG. 2.
FIG. 4 is a schematic drawing showing the production of signals from the non-decimal keys of FIG. 2.

The production of signals by the activation of any of the keys is accomplished by the circuits of FIGS. 3 and 4. The circuit of FIG. 3 is used in conjunction with the digit keyboard 100 and the decimal point key 102 to produce signals representative of the value of the numbers set into the desk calculator and signals representative of the activation of the decimal point key. The use of these signals is described at appropriate places throughout the description of the desk calculator.

The circuit of FIG. 4 shows the production of signals from all the operation-control keys contained on the keyboard. The use of the signals is described at later times in the description of the desk calculator.

Figure 5:
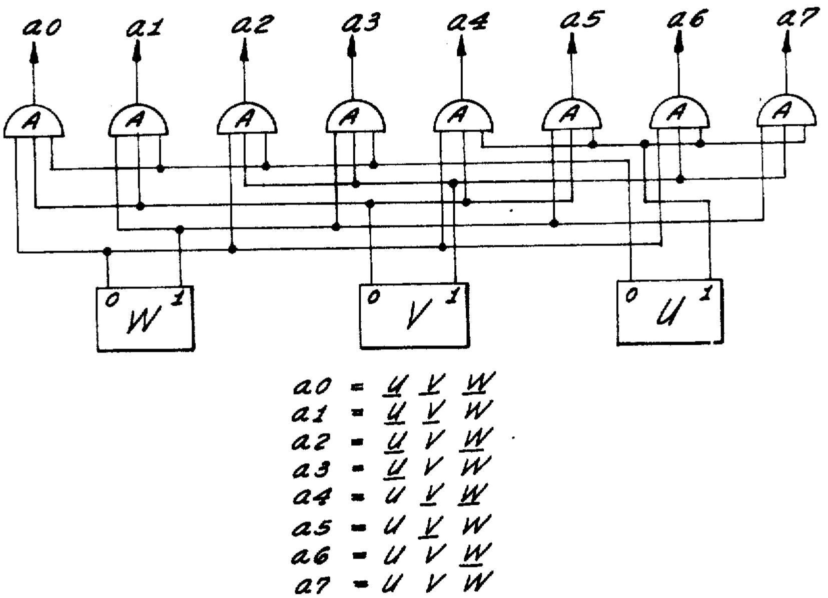
FIG. 5 is a block diagram of the circuitry to produce signals designated by the letter *a*.
Figure 6:
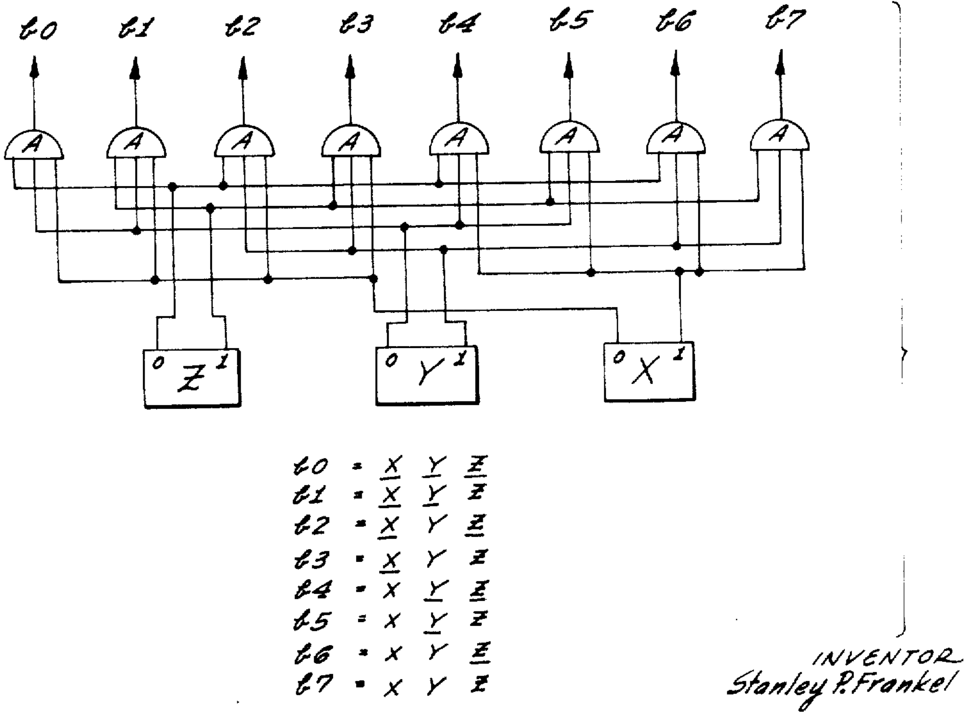
FIG. 6 is a block diagram of the circuitry to produce signals designated by the letter *b*.
Figure 7:
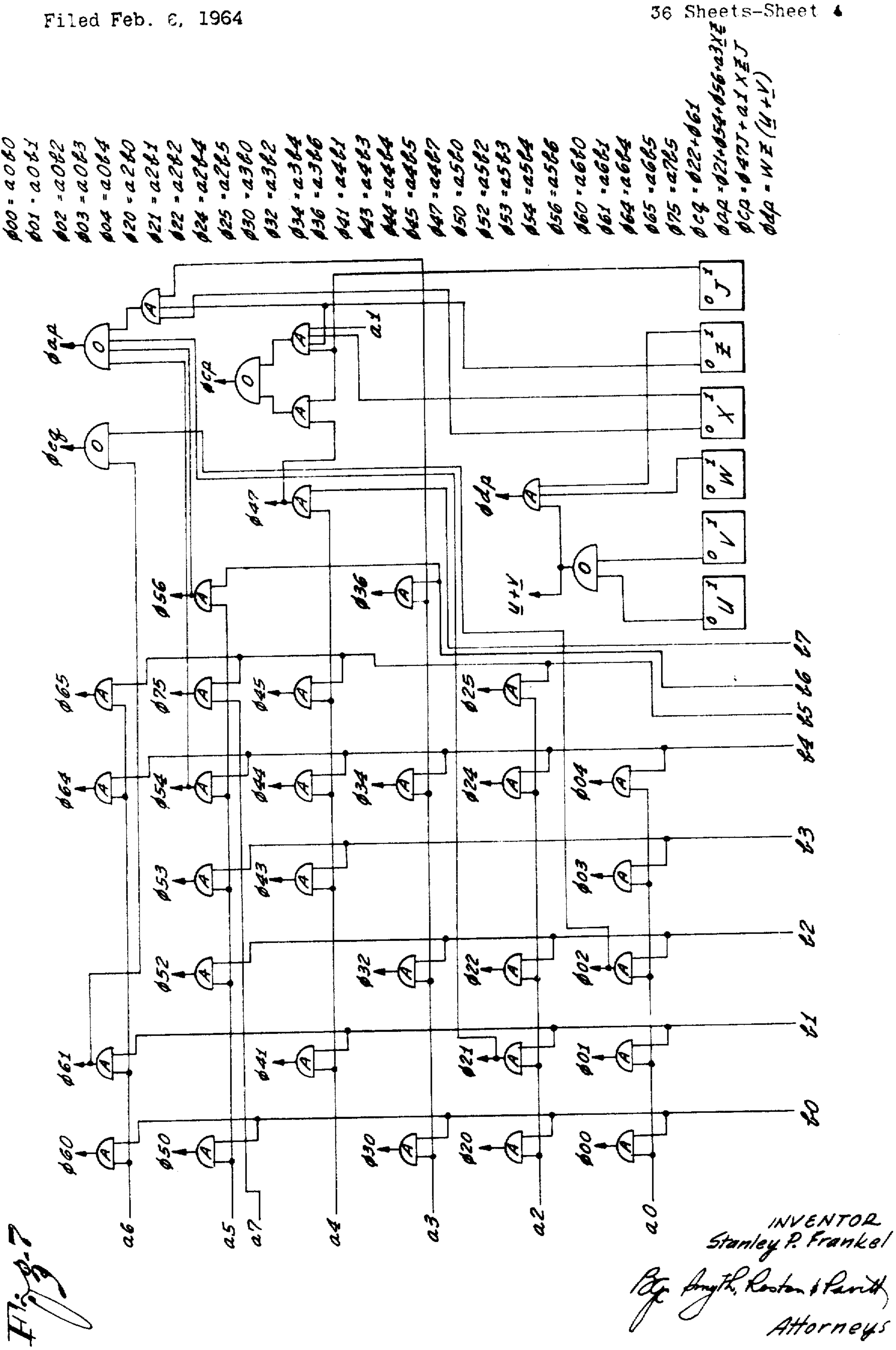
FIG. 7 is a block diagram showing the interrelationship of the *a* and *b* signal plus other signals to produce the basic phases ($\phi$) of the desk calculator.

The desk calculator uses the settings of six flip-flops, U, V, W, X, Y and Z (FIG. 5 and FIG. 6) to give a possibility of sixty-four phases of activity. Each phase ($\phi$) is named by the values of the six flip-flop settings and the specific name is described by two octal digits. The first digit indicates the state of the flip-flops U, V and W. The outputs of these three flip-flops are combined to produce signals *a*0, *a*1, *a*2 . . . *a*7. FIG. 5 shows the interconnection of the flip-flops to produce the *a* signals and contains the logic equations describing the interconnection of the flip-flops. The second digit describes the state of the flip-flops X, Y and Z which produce signals *b*0, *b*1, *b*2 . . . *b*7. FIG. 6 illustrates the production of the *b* signals. Any individual phase is described by the general term $\phi ij$ wherein $i,j=0, 1 \ldots 7$; for example, $\phi$64=$a6$, $b4=UV\underline{W}XY\underline{Z}$. All of the *a* and *b* signals are made available for direct use, as well as the most frequently used phase signals. FIG. 7 illustrates the production of the common phase signals which are used in the desk calculator. In addition to the phases which are derived solely from the *a* and *b* signals, a plurality of signals ($\phi ap$, $\phi cq$, $\phi cp$, and $\phi dp$) which are used frequently in the desk calculator are derived using the *a* and *b* signals, the phase indicating flip-flops and an auxiliary flip-flop J.

The rest state in the desk calculator occurs in $\phi$00. Departure from the rest state occurs only on the operation of control keys on the keyboard. Each key initiates an activity which leads, on completion, to a return to the rest state. The major activities are carried out in "routines." Each routine makes use of a series or group of phases. The main routines are the Add-subtract routine (indicated by A*s*.), Multiply (M), Divide (D), Transfer (T), and Enter Digit (E*d*.). Also, the first three routines (A*s*, M, D) lead into a corrective routine called Restore-P (R*p*).

Each routine is not always a linear progression of states occupied in succession, but the routine may involve branches or loops. The progression through one of these series of states, whether linear, branched, or cyclic, is accomplished by a succession of phase changes. Each phase change reverses the state of only one of the six phase-indicating flip-flops, U, V, W, X, Y and Z. Each state is also given a name which identifies the routine in which the state is used and the approximate position of the state is given by a number which is even or odd as the phase is an even or odd number of steps from the rest state, $\phi$00. (In other words, this number is odd if there is an odd number of one-states among U, V, W, X Y, Z.) These names are used in FIGS. 8 to 13.

Figure 8:
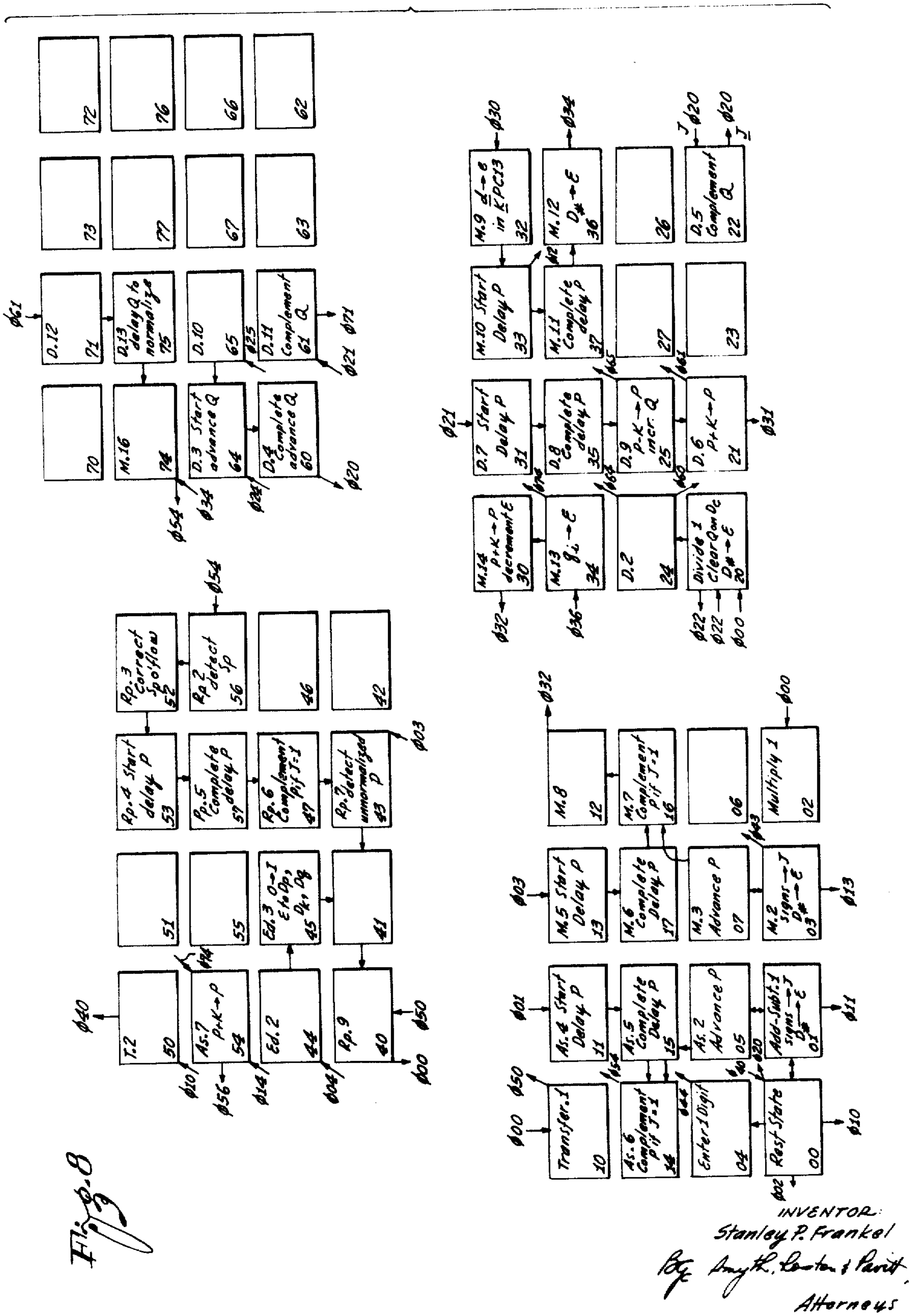
FIG. 8 is a block diagram of the desk calculator illustrating the interrelationship of all the phases.

The full array of 64 possible phases is shown in FIG. 8. It will be noted that some of the phases shown in FIG. 8 are not used as part of the activities of the desk calculator. The phases used in each of the five routines are shown in FIGS. 9 to 13. Some activities are carried out in several phases, not necessarily in the same routine. These phases are given collective names which identify the activities. As shown in FIG. 7, the major ones have collective names of: Delay P($\phi dp$), Add to P($\phi ap$), Complement Q($\phi cq$) and Complement P($\phi cp$). The above activities plus Advance P, Advance Q and Augment Q will be described prior to the description of the five routines. Also, fundamental portions of the complete desk calculator will be described first to lay the groundwork for a description of all the activities. These are the timing system, the timing logic, the delay line input, the D and E regsters and the number structure.

Figure 14:
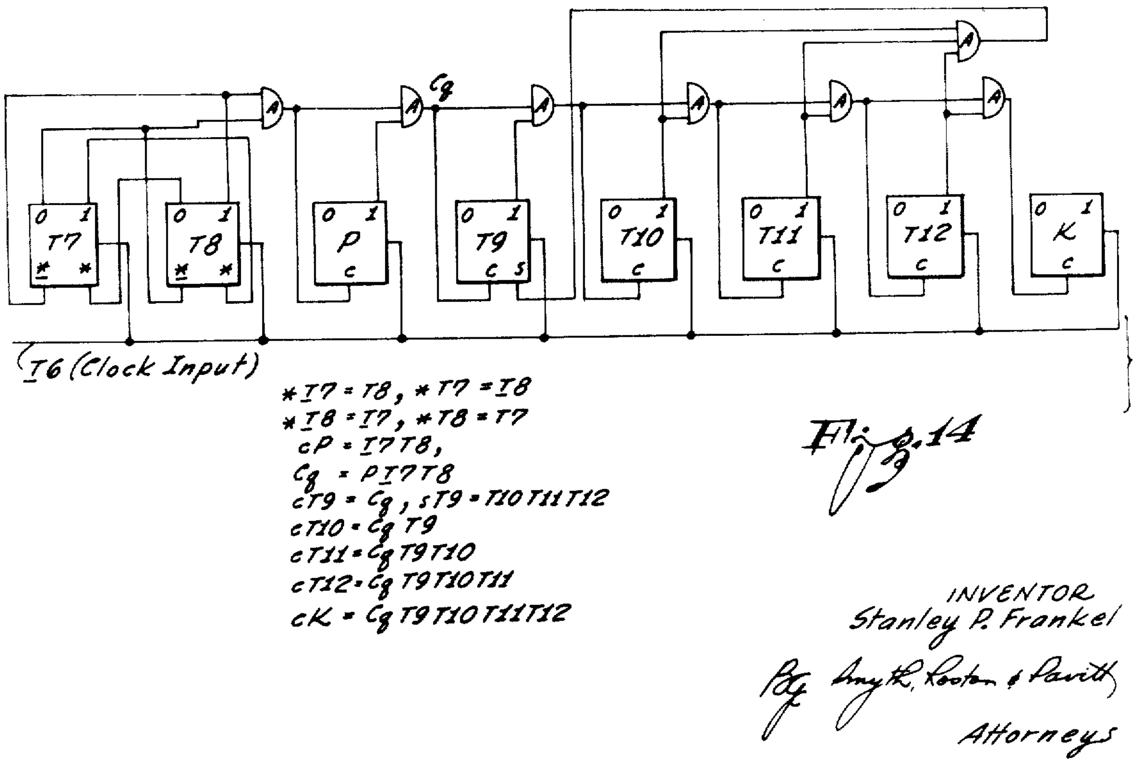
FIG. 14 is a block diagram of the K, P, and T7–T12 flip-flops which form part of the timing counter logic.

*Timing system.*—The timing system as shown in FIGS. 14, 15, 16 and 17 includes flip-flops T0, T1 . . . T12 and flip-flops P and K. The changes in state of the timing flip-flops including the P and K flip-flops are paced by a multi-vibrator which produces primary clock pulses designated $C_p$. These flip-flops define various parts of a period of time called a machine cycle. The duration of a machine cycle is approximately 30 milliseconds. Each machine cycle is divided into two half-cycles by flip-flop K, which is "Off" in the first half-cycle (marked $\underline{K}$), and "On" in the second half-cycle (marked K). The change in the state of flip-flop K is illustrated in FIG. 14. Each half-cycle is divided into 30 character periods. In each character period, one character of the number held in one of the three registers K, Q and P is available for manipulation. Usually a character which becomes available in one character period undergoes some modifications and is set into a group of four flip-flops collectively called D. These four flip-flops form a supplementary D register, the operation of which will be described later. The character held in the D register is then available for further manipulation in the following character period. Typically, the manipulation of the character ends at this time and the character is returned to an inactive status in the memory until the next machine cycle. Occasionally a character is held for one or more additional character periods in the D register. Another group of four flip-flops called the E register is used for storing a character so it may be used for a number of character periods.

A character consists of four bits which are manipulated serially; first the least significant bit, then the second and third bits, and last the most significant bit. A character may be a decimal digit, in which case the numerical value of the character is no greater than 9. A character may also be a sign character or part of a decimal position indication. The numerical value of a sign character is always greater than 9. Therefore, its possible values are 10, 11, 12, 13, 14 and 15. A decimal position indication has any value from 0 to 63, since 6 bits from two adjacent characters provide the decimal position indication.

Figure 16:
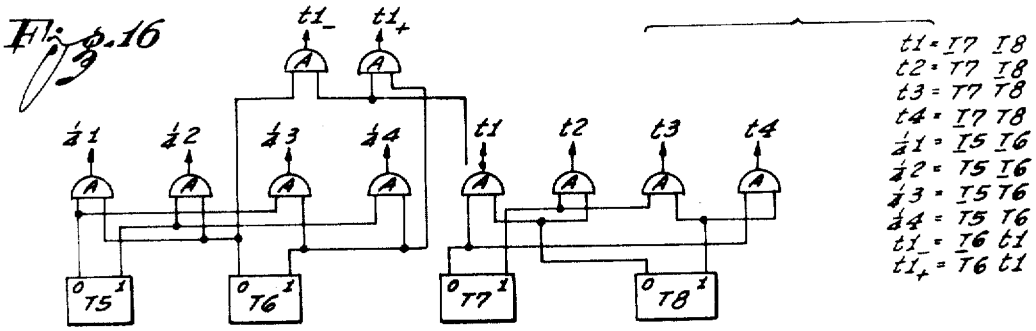
FIG. 16 is a schematic diagram of the bit time logic for producing the *t* and quadrant signals.

Each character period is divided into four bit periods. Each bit period, with one exception to be described later, is divided into 120 clock periods. The production of signals representative of the bit periods is shown in FIG. 16. The memory of the desk calculator consists of a delay line through which some 480 bits of information are recirculated. The period of recirculation is one character period and, therefore, a bit held in memory is available once in each character period. Usually a bit is not modified or made use of except during the one bit period in each machine cycle when the bit is in an active status, i.e., stored in one of a group of buffer flip-flops, as will be explained. Since the period of recirculation is one character period, this period of time is also referred to as a memory cycle.

Each bit period is divided into four quadrants. The last three of the four quadrants are of equal length but the first quadrant is sometimes longer since it may include a dead period of time, defined subsequently. In each bit period a single bit of the working memory is held in a flip-flop called M and is made available for manipulation. The working memory consists of 240 bits which are the contents of registers K, Q and P. In addition to the working memory the delay line holds in circulation another 240 bits called the surrogate memory. The 240 bits of the surrogate memory form three surrogate registers corresponding to K, Q and P. In each bit period one bit of the surrogate memory is held in a flip-flop called S. In some of the Transfer operations the bits held in flip-flop S are changed by copying into flip-flop S the bits held in M. Otherwise, the contents of the surrogate memory recirculate unchanged. The recirculation pattern for surrogate bits, which will be described in detail later, includes the occupancy of flip-flop S for one bit period of each machine cycle.

*Timing chain logic.*—The memory of the desk calculator holds the contents of the three registers and their corresponding surrogates as described before. Registers K and Q each hold fifteen characters. These fifteen characters consist of twelve decimal digits, the sign character, and the decimal position indication held in two characters. Similarly, register P holds 30 characters of which 24 are decimal digits, one is the sign and two are the decimal position. The remaining three characters of the register are meaningless sign and decimal indications associated with the less significant half of the P register which appear in the $\underline{K}$ half of the machine cycle. The machine cycle consists of 60 character periods. Each character period occupies one memory cycle, including its dead period.

Figure 15:
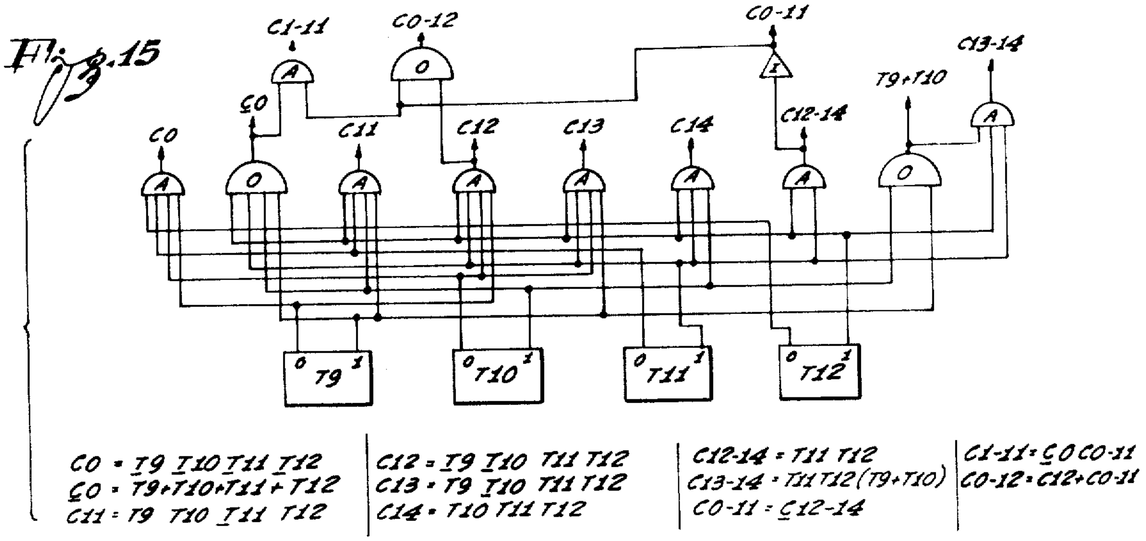
FIG. 15 is a block diagram of the character time logic for producing the C signals.

The first character period of the first half-cycle of the machine cycle is marked $\underline{KP}$C0 where C0 represents one of the states of the four flip-flops, T9, T10, T11 and T12 as shown in FIG. 15. The second character period of the first half-cycle is marked $\underline{K}$PC0. The third and fourth are marked $\underline{KP}$C1 and $\underline{K}$PC1, etc. Similarly, the successive character periods of the second half of the machine cycle are marked K$\underline{P}$C0, KPC0, etc. Flip-flop P changes state after each character period and there is a change in the state of one or more of the flip-flops T9 to T12 at the time P changes from "On" to "Off." The control of the flip-flops T9 to T12 by the flip-flop P is shown in FIG. 14. Two successive character periods, the first marked $\underline{P}$, the second marked P, are called a character period pair and have a common "C-number" indicating the states of flip-flops T9 to T12.

The fifteen C-numbers, C0, C1 . . . C14, are distinguished by the timing flip-flops T9, T10, T11 and T12 and are marked as follows:

| | T9 | T10 | T11 | T12 |
|---|---|---|---|---|
| C0 | 0 | 0 | 0 | 0 |
| C1 | 1 | 0 | 0 | 0 |
| C2 | 0 | 1 | 0 | 0 |
| C3 | 1 | 1 | 0 | 0 |
| C4 | 0 | 0 | 1 | 0 |
| C5 | 1 | 0 | 1 | 0 |
| C6 | 0 | 1 | 1 | 0 |
| C7 | 1 | 1 | 1 | 0 |
| C8 | 0 | 0 | 0 | 1 |
| C9 | 1 | 0 | 0 | 1 |
| C10 | 0 | 1 | 0 | 1 |
| C11 | 1 | 1 | 0 | 1 |
| C12 | 0 | 0 | 1 | 1 |
| C13 | 1 | 0 | 1 | 1 |
| C14 | 0 | 1 | 1 | 1 |

The first twelve C-numbers are collectively denoted C0–11. The last three C-numbers are marked C12–14, and the last two are marked C13–14. Other groups of C-numbers are denoted C1–11 and C1–12. The specific C-numbers and groups of C-numbers which are needed to limit the times of occurrence of particular activities in the desk calculator are derived in the circuit of FIG. 15.

Each C-number is held through two character periods which are distinguished by the flip-flop P, as described previously. P is Off for the first character period of the pair, On for the second. Each Character period is divided into four bit periods (*t*1, *t*2, *t*3, and *t*4) which are distinguished by flip-flops T7 and T8 as shown in FIG. 16. The flip-flops T7 and T8 cycle in the Gray code pattern.

Each of the four bit periods is divided into four quadrants $$\left(\frac{1}{4}1, \frac{1}{4}2, \frac{1}{4}3 \text{ and } \frac{1}{4}4\right)$$

The quadrants are distinguished by the states of the flip-flops T5 and T6 in the binary code as shown in FIG. 16.

With the exception of the first quadrant of the first bit period of a character period $$\left(\frac{1}{4}1t1\right)$$

each quadrant is divided into 30 clock periods by flip-flops T0, T1, T2, T3 and T4. These flip-flops form a normal binary counter except that the two conditions $\underline{T1}\,\underline{T2}\,\underline{T3}\,\underline{T4}$ (with T0=0 and T0=1) are not used at most times. These two conditions called N0 and N1 are, however, used at the beginning of the first quadrant of each character period and mark a dead period. During the dead period the normal recirculation of information in the delay line is suspended. The dead time forms a part of the first quadrant only in the *t*1 bit period. That is, the dead time lies between the $t4$ bit period in one machine cycle and the live part of the first quadrant of $t1$ in the next character period. The first and second quadrants of a bit period are designated by the subscript $_-$, the third and fourth quadrants by $_+$. Thus $t4_-$ means $$\left(\frac{1}{4}1+\frac{1}{4}2\right)t4$$

and $$t2_+=\left(\frac{1}{4}3+\frac{1}{4}4\right)t2$$

The dead period is a part of $t1_-$ or more specifically of $$\frac{1}{4}1t1$$

Figure 17:
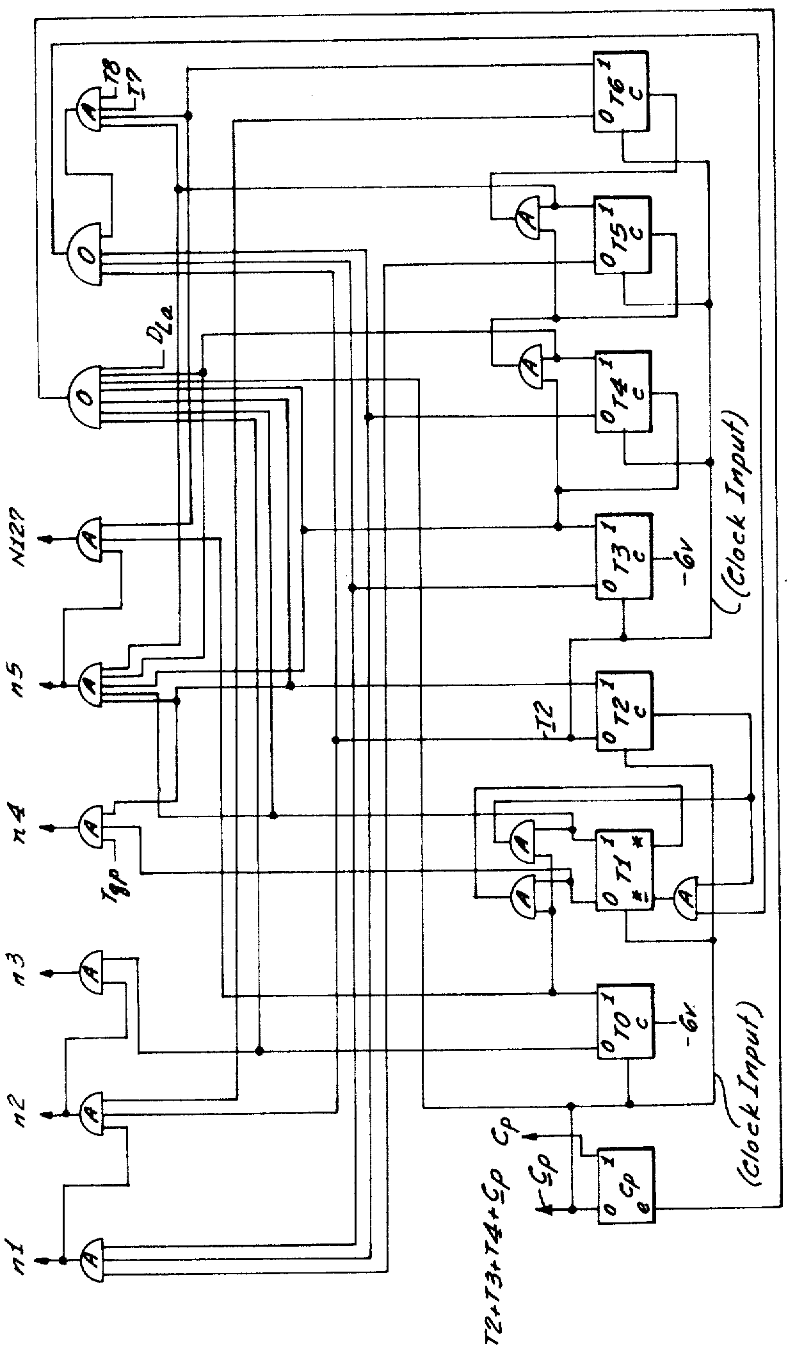
FIG. 17 is a block diagram of the clock generator and T0–T6 flip-flops which form another part of the timing counter logic to produce the *n*1–*n*5 and N127 signals associated with timing the information circulating in the Memory.

Entry to the condition N0 is permitted by the signal called "Enable *$\underline{\text{T}}$1" illustrated in FIG. 17. In the absence of the signal Enable *$\underline{\text{T}}$1, the condition N0 fails to occur, as does also the condition N1. This condition N1, the second of the two clock periods of the dead period, is of an indefinitely long duration by reason of the suppression of the signal "Enable $C_p$" which permits the free running of multivibrator $C_p$. Each of the remaining clock periods is of approximately one microsecond duration. The two extraordinary clock periods are named N0 and N1, as mentioned above, and the thirty ordinary clock periods following the first two are named N2 to N31. The next three quadrants $$\left(\frac{1}{4}2t1,\ \frac{1}{4}3t1\text{ and }\frac{1}{4}4t1\right)$$

each have thirty clock periods named N34 to N63, N66 to N95 and N98 to N127. (The names N32, N33, N64, N65, N96 and N97 are not used since the conditions which these names describe do not occur.) The bit period $t1$, therefore, has 122 clock periods, the second being extraordinarily long. Each of the following three bit periods ($t2$, $t3$ and $t4$) has only 120 clock periods named N2 to N127 (again omitting the names N32, N33 . . . N97). The names of the clock periods are indicated by the states of the flip-flops T0 to T6, where T0 is the least significant bit and has a position value of unity. T1 has a position value of 2, and so on to T6 which has a value of 64. Certain combinations of the states of flip-flops T0 to T6 are used to form signals marked $n1$, $n2$, $n3$, $n4$, $n5$ and N127 as shown in FIG. 17, and these signals are used to derive the few individual clock periods which need to be distinguished.

As was indicated previously, the duration of the normal clock periods are equal to each other and have a nominal value of one microsecond. The repetition rate of the free-running multivibrator which supplies the clock pulses need only be approximately one megacycle, since deviations from that value are compensated for during the N1 period. In N1, the behavior of the free-running clock multivibrator is modified so that it can remain in one of its two states for a long period of time. Normally, the stable condition of the clock multivibrator persists until a marker pulse is received from memory. The marker pulse advances the count held in the T1 flip-flops to N2 to restore the clock multivibrator to the free-running condition. The clock multivibrator may remain in the mono-stable condition during N1 for as much as a few dozen microseconds. The specific time depends on deviations from the nominal clock rate of the clock multivibrator (one megacycle) and from the nominal delay time of the delay line memory (slightly more than 482 microseconds).

The monostability of the clock multivibrator is not, however, absolute. The multivibrator is designed to change state spontaneously to restore the free-running condition, if no marker pulse has been received after a long period of occupancy of N1. A one-bit is always recorded in the delay line at the times N3. This ensures the appearance of a marker pulse at an appropriate time in the next dead period. However, in the initial condition following the first application of power to the machine, the timing flip-flops might fall into the state N1 before any one-bits had been recorded. If the metastable state of the clock multivibrator were fully stable, there would be no escape from that condition.

The clock multivibrator provides a primary clock pulse, called $C_p$. The primary clock pulse drives the cycling of flip-flops T0, T1 . . . T6, as described by the equations associated with FIG. 17.

The resetting of flip-flop T6 marks the end of a bit period and provides a signal to drive the flip-flops T7, T8 as shown by the equations associated with FIG. 14. The resetting of T8 marks the end of a memory cycle and serves to change the state of flip-flop P as described in FIG. 14. The resetting of P provides a clock signal, $C_q$, which drives the flip-flops T9, T10, T11, T12 and K. These changes are described by the equations shown in FIG. 14. The resetting of K marks the end of a full machine cycle.

Figure 18:
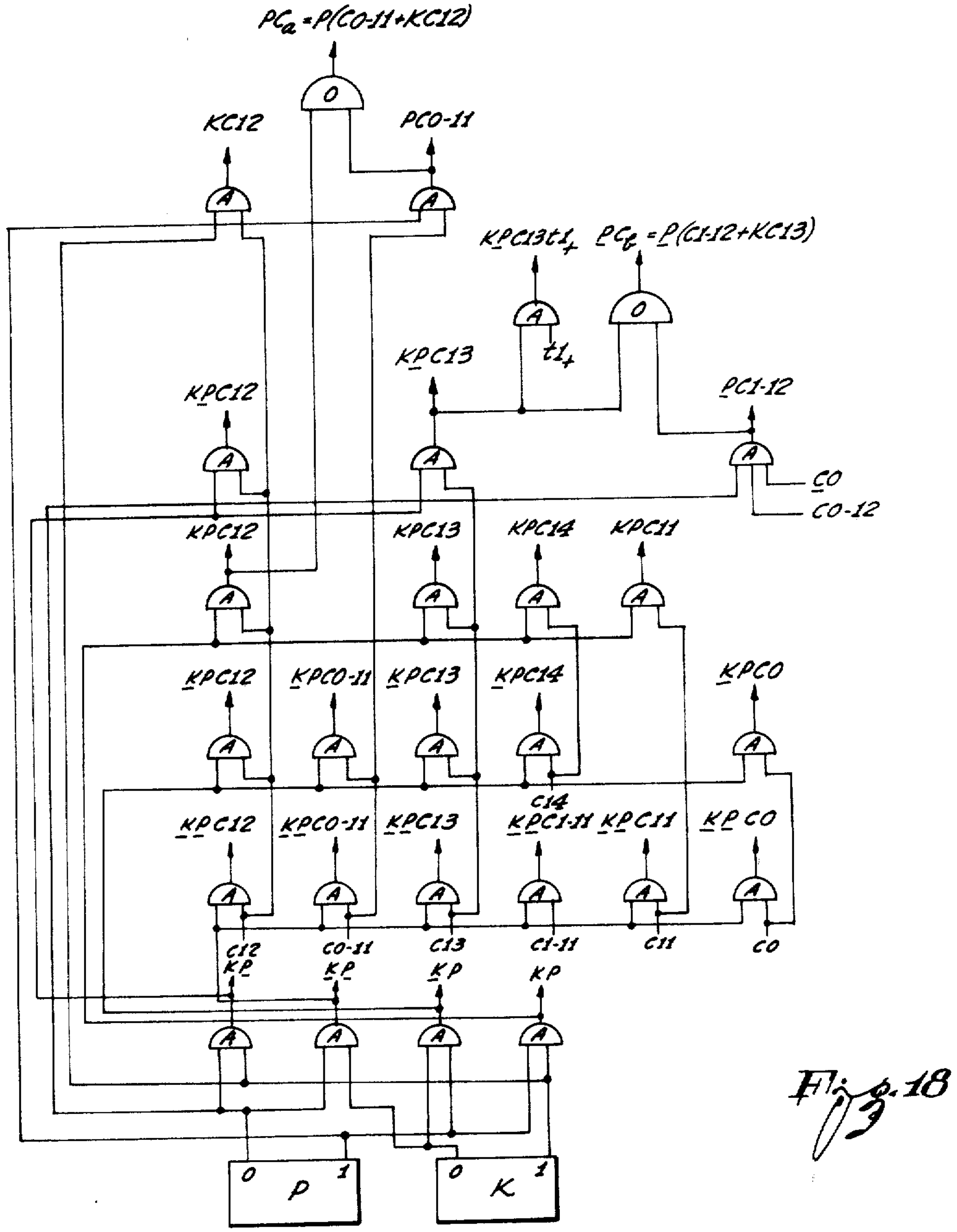
FIG. 18 is a schematic diagram of circuitry to produce signals representative of significant periods of time within each machine cycle.

The K and P flip-flops together with the C-numbers provide a plurality of signals which indicate periods of time which are of frequent occurrence in the circumstances for setting and resetting flip-flops and other expressions in the logic of the desk calculator. These signals are developed in FIG. 18.

Figure 19:
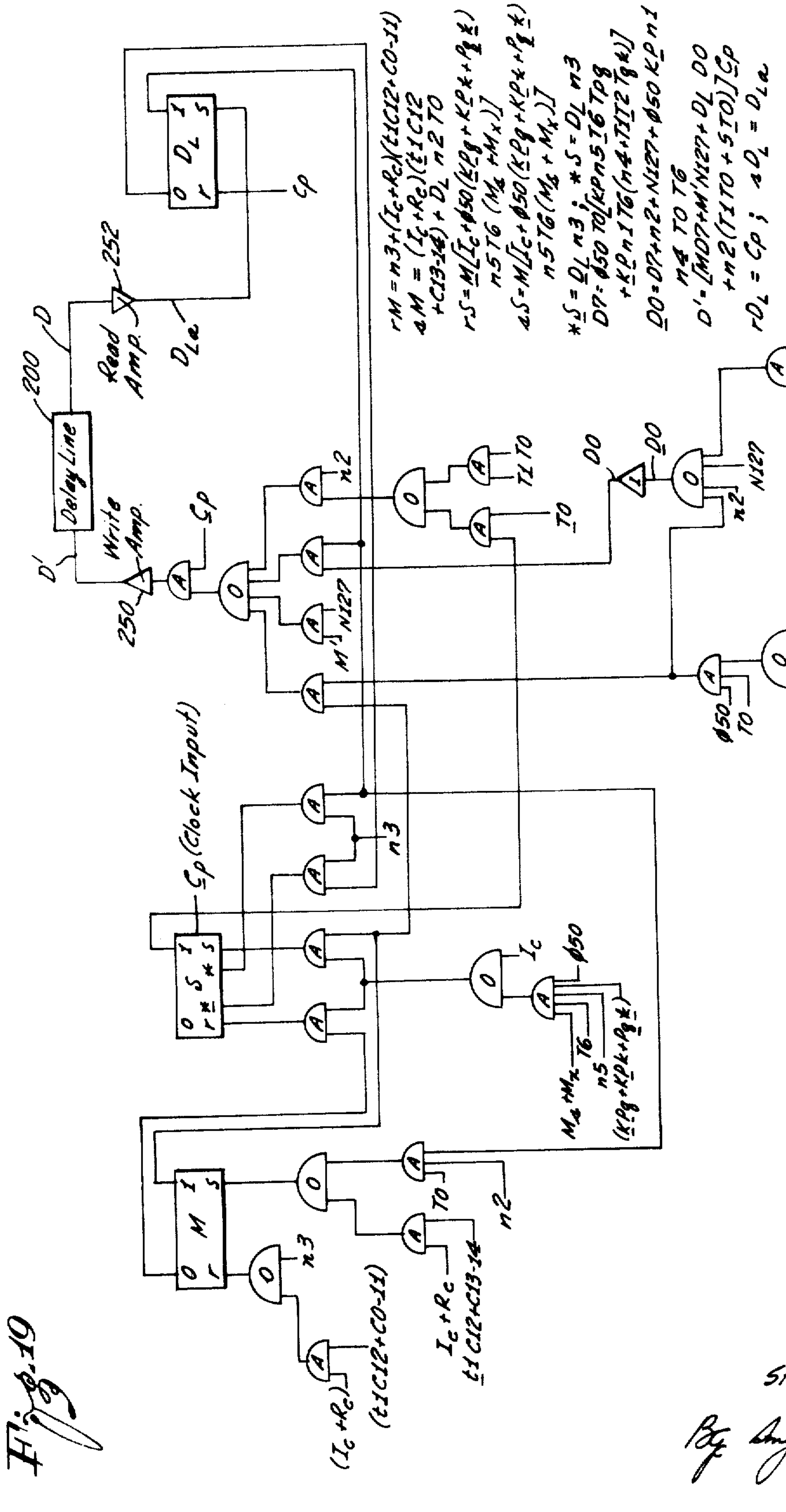
FIG. 19 is a schematic diagram of Memory logic including the delay line and flip-flops M, S, and $D_L$.

*Delay line input*.—Information in the desk calculator is circulated through a delay line 200 shown in FIG. 19 which has a nominal time delay greater than 480 microseconds. An additional period of time is provided to allow for tolerances in both the delay line length and the frequency of the clock multivibrator and for a few additional microseconds which are spent in the blocked state, N1. It is desirable that aside from the dead period, the alternation of states of the multivibrator shall be almost completely free of influence by signals received from the delay line. A small influence on the period of the multivibrator by the circulating bits is tolerable though undesirable.

Figure 21:
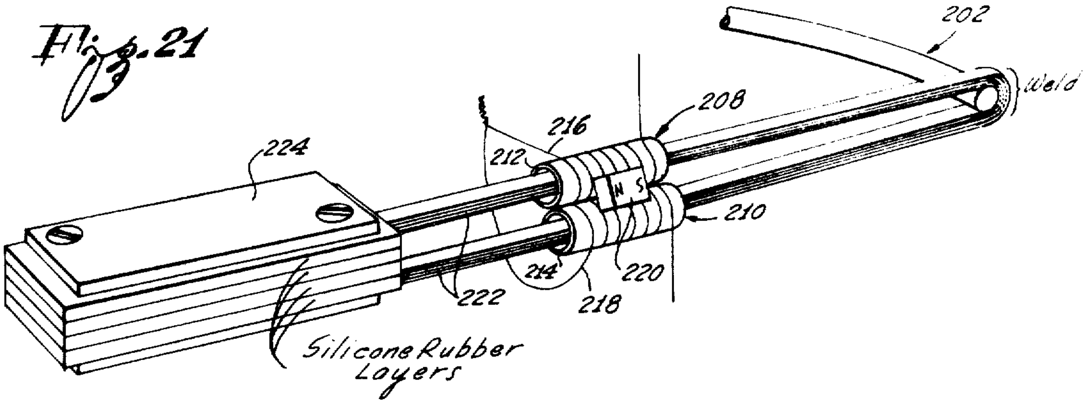
FIG. 21 is an expanded view of the coupling unit used with the delay line of FIG. 20.
Figures 20, 22, 23:
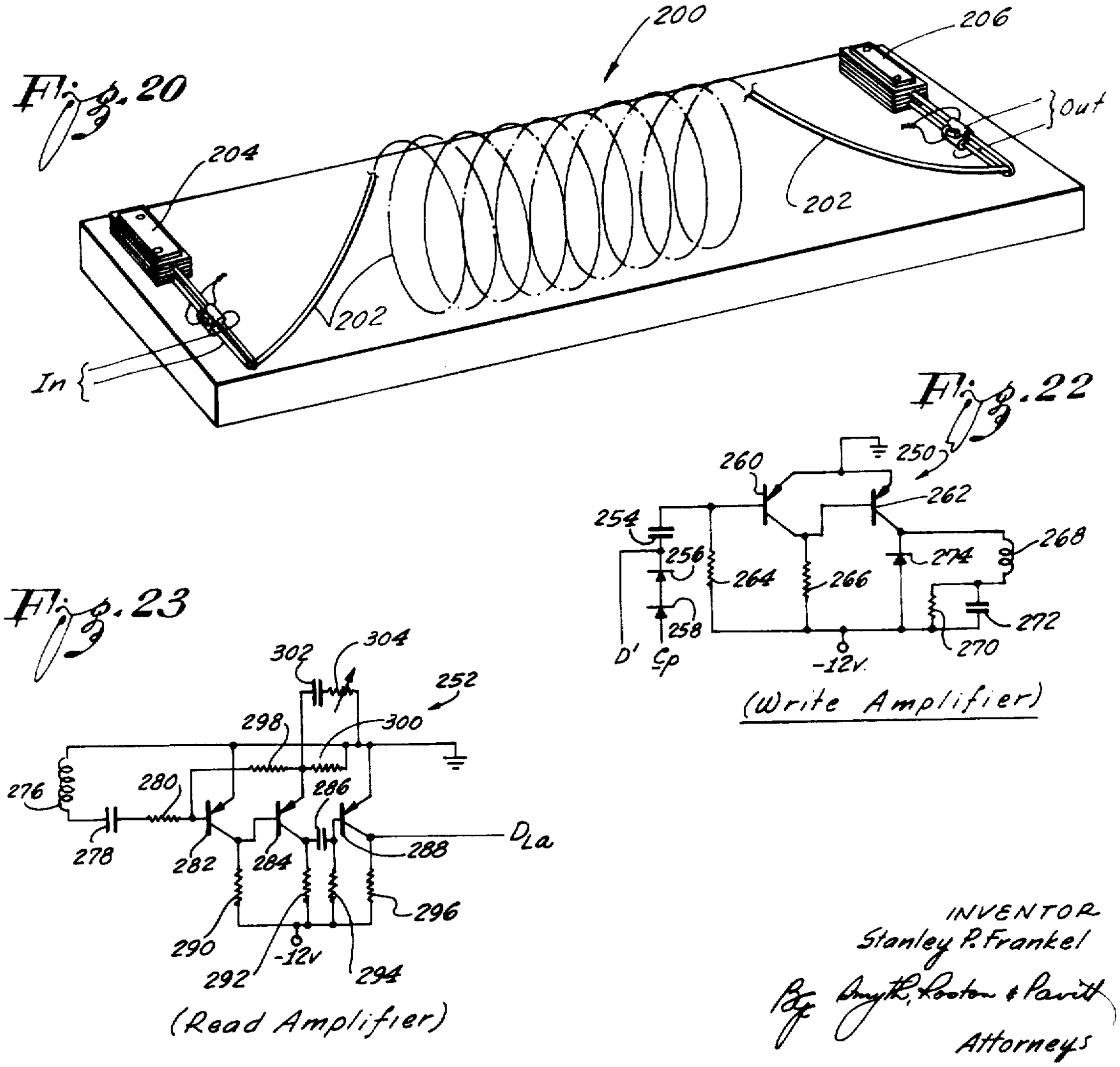
FIG. 20 is a magnetostrictive delay line which may be used with the Memory logic of FIG. 19.
FIG. 22 is an amplifier which may be used as the amplifier 250 shown in FIG. 19.
FIG. 23 is an amplifier which may be used as the amplifier 252 shown in FIG. 19.

The delay line 200 may be an electro-mechanical type as shown in detail in FIGS. 20 and 21. The delay line 200 includes a long length of wire 202 which mechanically provides the delay needed in the operation of the desk calculator. The wire 202 is excited in the torsional mode by the input signal to the delay line which passes through an input coupling mechanism 204. The output signal from the delay line is received by an output coupling mechanism 206. Both the input and output coupling mechanisms have the same structure and are shown in more detail in FIG. 21.

A pair of coils 208 and 210 are disposed adjacent to each other. The coils 208 and 210 include hollow cylindrical coil forms 212 and 214. Windings 216 and 218 are wound around the coil forms 212 and 214 in opposite directions. The first ends of each winding are electrically connected and the second ends are used as input or output terminals. A magnet 220 is provided in proximity to the two coils to operate as a magnetically biasing element.

A plurality of tapes 222 pass through the coil forms 212 and 214 and form a half turn around the wire 202. The ends of the tapes 222 are sandwiched in between layers of a silicon rubber damping element 224. The tapes 222 are secured to the wire 202, for example, by welding in the area where the tapes make a half turn around the wire. The tapes 222 are made from a magnetostrictive material.

When the input signal is applied to the input coupling mechanism 204, the length of the magnetostrictive tapes changes with the tapes becoming longer or shorter in accordance with the characteristics of the input signal. Since the windings of the coils 208 and 210 are wound in opposite directions, the change in length of the tapes as they pass through the coil form 212 is of an opposite sign to the change in length of the tapes as they pass through the coil form 214. The end of the wire 202 is, therefore, twisted in accordance with the characteristics of the input signal.

The signal passes through the wire 202 to be detected by the output coupling mechanism 206 in an opposite manner to the input coupling mechanism 204. That is, the mechanical movement of the magnetostrictive tape produces an output signal from the windings proportional to the movement and therefore to the input signal.

The delay line 200 is fed an input signal by a write amplifier 250 as shown in FIG. 19. The output signal from the delay line 200 is amplified by a read amplifier 252. The write and read amplifiers are shown in more detail in FIGS. 22 and 23. The input to the write amplifier 250 is a clocked input. The information signal D′ is applied to the junction of a capacitor 254 and a diode 256. The inverted clock pulse $\underline{C}_p$ is coupled to the junction through an additional silicon diode 258 and the diode 256. The silicon diode 258 insulates the write amplifier from noise and other extraneous signals present in the clock pulse.

The capacitor 254 operates as a high pass filter to pass a pulse train to the base of a transistor 260. The output from the transistor 260 is taken at the collector and applied to the base of a second transistor 262. The emitters of the transistors 260 and 262 are connected to a reference potential such as ground. The resistors 264 and 266 are used to bias the transistors and are electrically connected to a negative potential which may have a value on the order of −12 volts.

The output from the transistor 262 is taken at the collector and applied to a first terminal of an input winding 268. The winding, for example, may be the coils of the input coupling mechanism 204 shown in FIG. 20. A pulse shaping parallel circuit consisting of a resistor 270 and a capacitor 272 is coupled between the second terminal of the input winding 268 and the negative potential. A clipping diode 274 is also disposed between the first terminal of the input winding 268 and the negative potential. The signal applied to the delay line has a pulse width of about 1 microsecond.

The input to the read amplifier 252 is from an output winding 276 in the delay line 200. The output winding 276 may be, for example, the coils of the output coupling mechanism 206 shown in FIG. 20. The signal from the delay line has a pulse width of about 1 microsecond. The winding 276 is disposed between the first terminal of a capacitor 278 and a reference potential such as ground. A resistor 280 is connected between the second terminal of the capacitor 278 and the base of the transistor 282. The output signal from the transistor 282 is taken from the collector and applied to the base of a transistor 284. The output signal from the transistor 284 is taken from the collector and applied through a capacitor 286 to the base of the transistor 288.

The appropriate biasing for the transistors 282, 284 and 288 is provided by the resistors 290, 292, 294 and 296. The resistors 298 and 300 are coupled in series between the base of transistor 282 and the reference potential such as ground. The resistors 298 and 300 in combination with the resistor 280 operate as a voltage divider. A series circuit consisting of a capacitor 302 and a variable resistor 304 are electrically disposed between the junction of the resistors 298 and 300 and the reference potential such as ground. The variable resistor 304 is used to adjust the gain of the read amplifier 252. The output signal from the read amplifier $D_{La}$ appears at the collector of the transistor 288 and consists of a negative pulse having a width of 0.4 microsecond whenever a "one" bit of information is presented.

The two flip-flops M and S (FIG. 19) hold a working bit and its surrogate through the greater part of each bit period, as mentioned previously. The capture of these bits from the delay line output, denoted by D, is at the times N3 and N2, respectively. The clock periods N2 and N3 are marked $$N2=n3T1 \text{ or } (\underline{T}0\underline{T}2\underline{T}3\underline{T}4\underline{T}5\underline{T}6)T1$$
$$N3=n2T0T1 \text{ or } (\underline{T}2\underline{T}3\underline{T}4\underline{T}5\underline{T}6)T0T1$$

The capture process is described by *S, *$\underline{S}$, *s*M and *r*M, as shown by the circuitry and logic equations of FIG. 19. In that figure, the factor T1 in the expressions for N2 or N3 is omitted in the expressions for *S, etc., so that they represent inputs at the times N0 or N1 as well as N2 or N3. The value of D at the times N0 and N1, and, therefore, the value set into S and M at the beginning of the dead period, is zero, as shown below.

The bit set into S at N2 of each bit period is held through that bit period (usually without change) and is recorded into the delay line at the beginning of the next bit period at (N2 or N0). The input to the delay line is denoted D′ and the recording of the bit is described in the following portion of the equation of D′ shown in FIG. 19.

$$D'=S\underline{T}0(\underline{T}2\underline{T}3\underline{T}4\underline{T}5\underline{T}6)+\ldots \text{ (FIG. 19)}$$

(The symbol "+ . . ." indicates that D′ includes other terms not shown here. The symbol "+ . . ." will be similarly used throughout the description of the desk calculator. Also, the description "(FIG. 19)" indicates that the circuitry to produce the D′ signal is found in FIG. 19. This convention will be used throughout the description of the desk calculator.) The above equation also describes the recording of zero at the time N2 of bit period *t*1 since S was set to zero at the time N0 *t*1.

A one is recorded at each time N3, as described by the following term in D′.

$$D'=T0T1(\underline{T}2\underline{T}3\underline{T}4\underline{T}5\underline{T}6)+\ldots \text{ (FIG. 19)}$$

Each bit recorded in one memory cycle is received in the following cycle at a time which is earlier by two clock periods. In particular, the one-bit recorded at the time N3*t*1 returns in the following cycle as the marker bit which triggers the escape from the blocked condition of the multivibrator. The marker bit is the first signal received during N1 since a zero was recorded at the time N2 and no recording is performed during the time N1.

In the last clock period of each bit period, N127, a bit named M′ is recorded. M′ is formed by the machine logic, partly on the basis of the value of M in the corresponding bit period of the preceding memory cycle. In all of the intermediate clock periods, N4 to N126 inclusive, the bit emerging from the delay line is rerecorded unchanged. The complete input to the delay line D′ is shown in FIG. 19.

During the Initial Condition (signal $I_c$ as shown in FIG. 4) all registers, including the surrogates, are cleared. On operation of the Clear Key a signal $R_c$ (FIG. 4) clears the working registers but not the surrogates. The clearance is accomplished by setting M (on signal $R_c$) or both M and S (on signal $I_c$) to the value $$(t1C12+C13-14)$$

as described by the following logic equations:

$$sS=I_cM+\ldots \text{ (FIG. 19)}$$
$$rS=I_c\underline{M}+\ldots \text{ (FIG. 19)}$$
$$sM=(\overline{I_c}+R_c)(t1C12+C13-14)+\ldots \text{ (FIG. 19)}$$
$$rM=(I_c+R_c)(t1C12+C0-11)+\ldots \text{ (FIG. 19)}$$

The signal $I_c$ is produced by an R–C circuit. The time constant of the R–C circuit must be sufficiently large to ensure that the above terms remain effective for at least one machine cycle (about 30 milliseconds).

The combined signals, $I_c+R_c$, also reset all six of the phase flip-flops, U, V, W, X, Y, Z, thereby bringing the machine into the rest state, $\phi00$.

Figure 24:
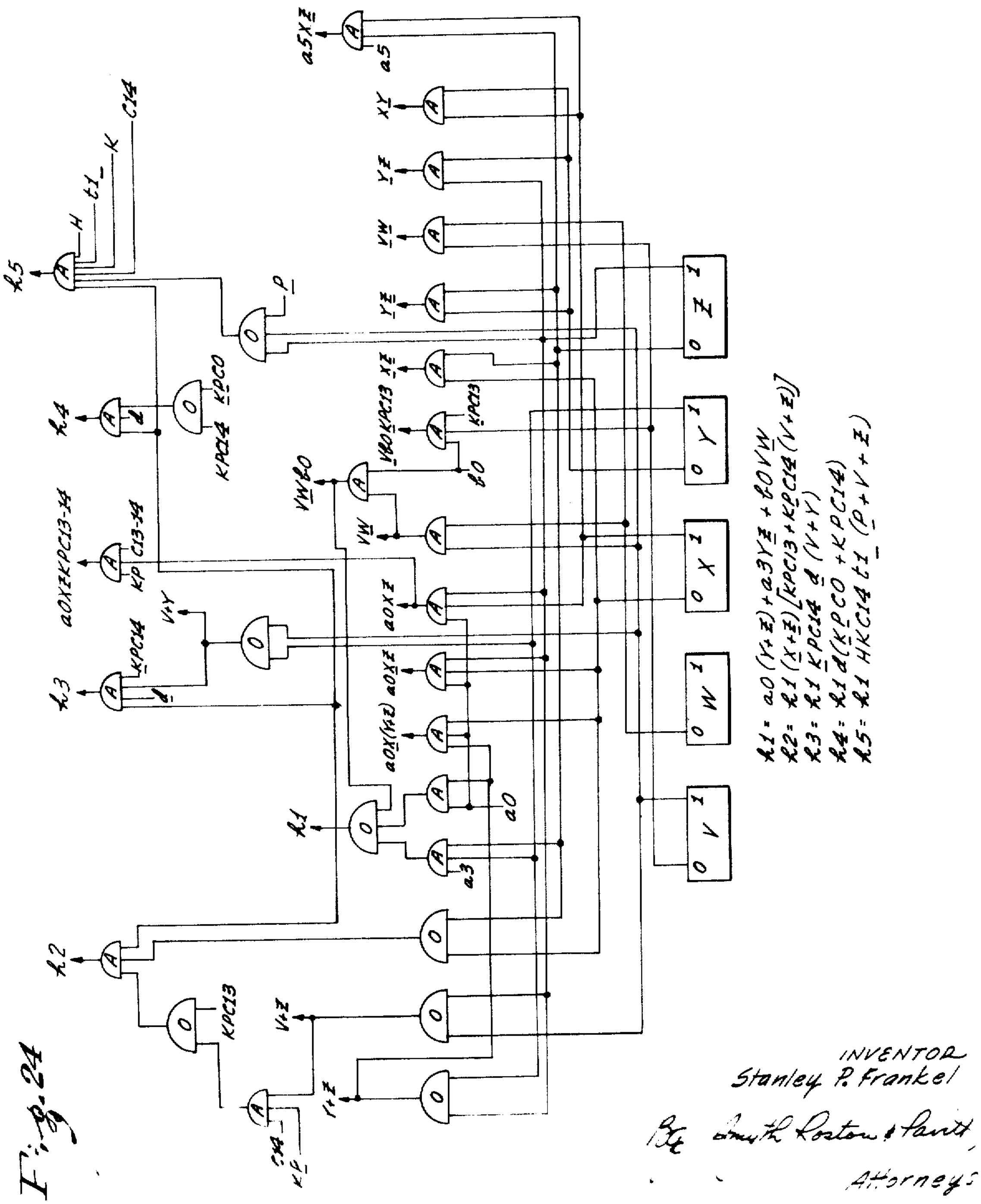
FIGS. 24 and 25(*a*) to (*e*) are block diagrams of circuitry which produce miscellaneous controlling signals including the *h*1–*h*7 signals.
Figure 25:
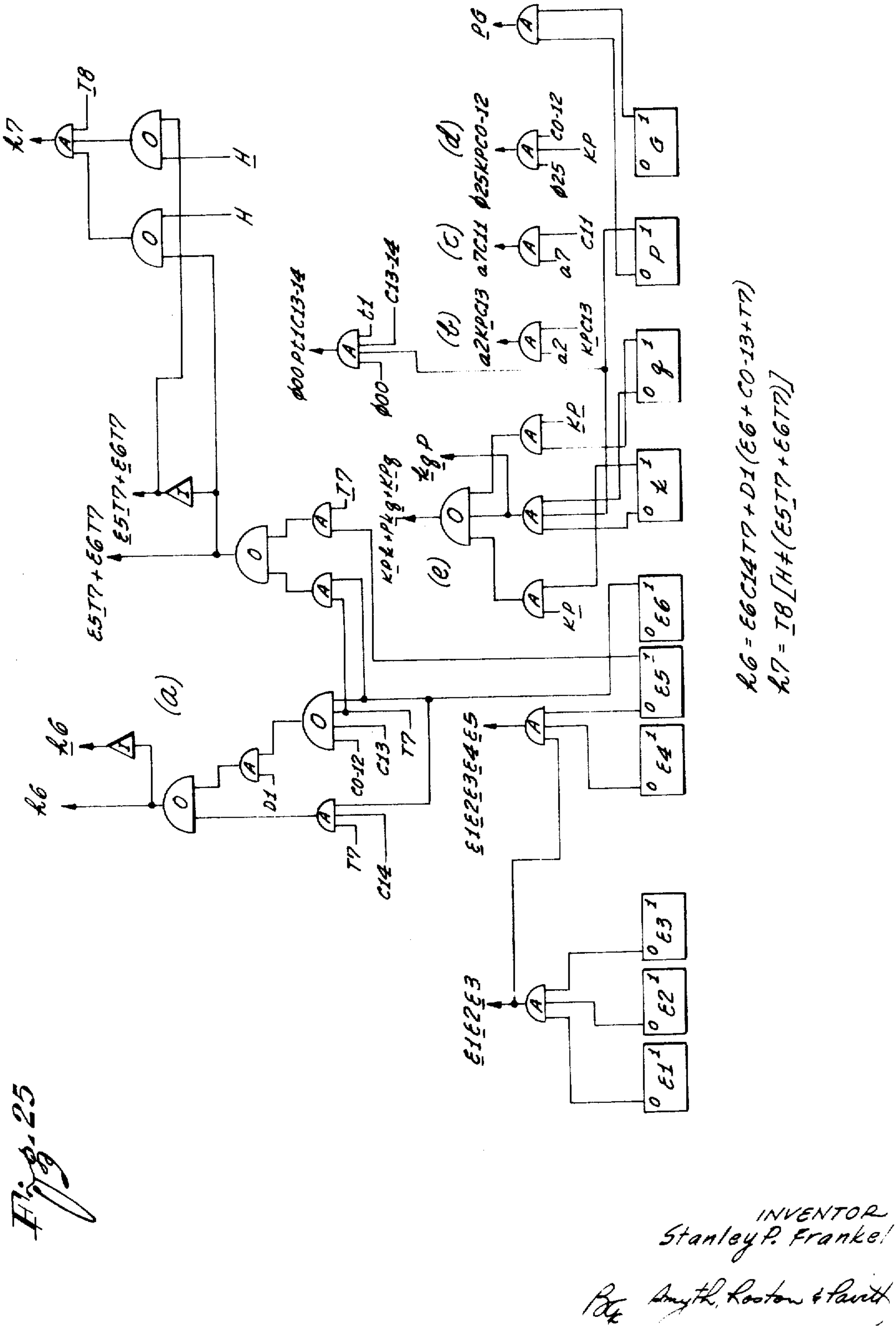
Figure 26:
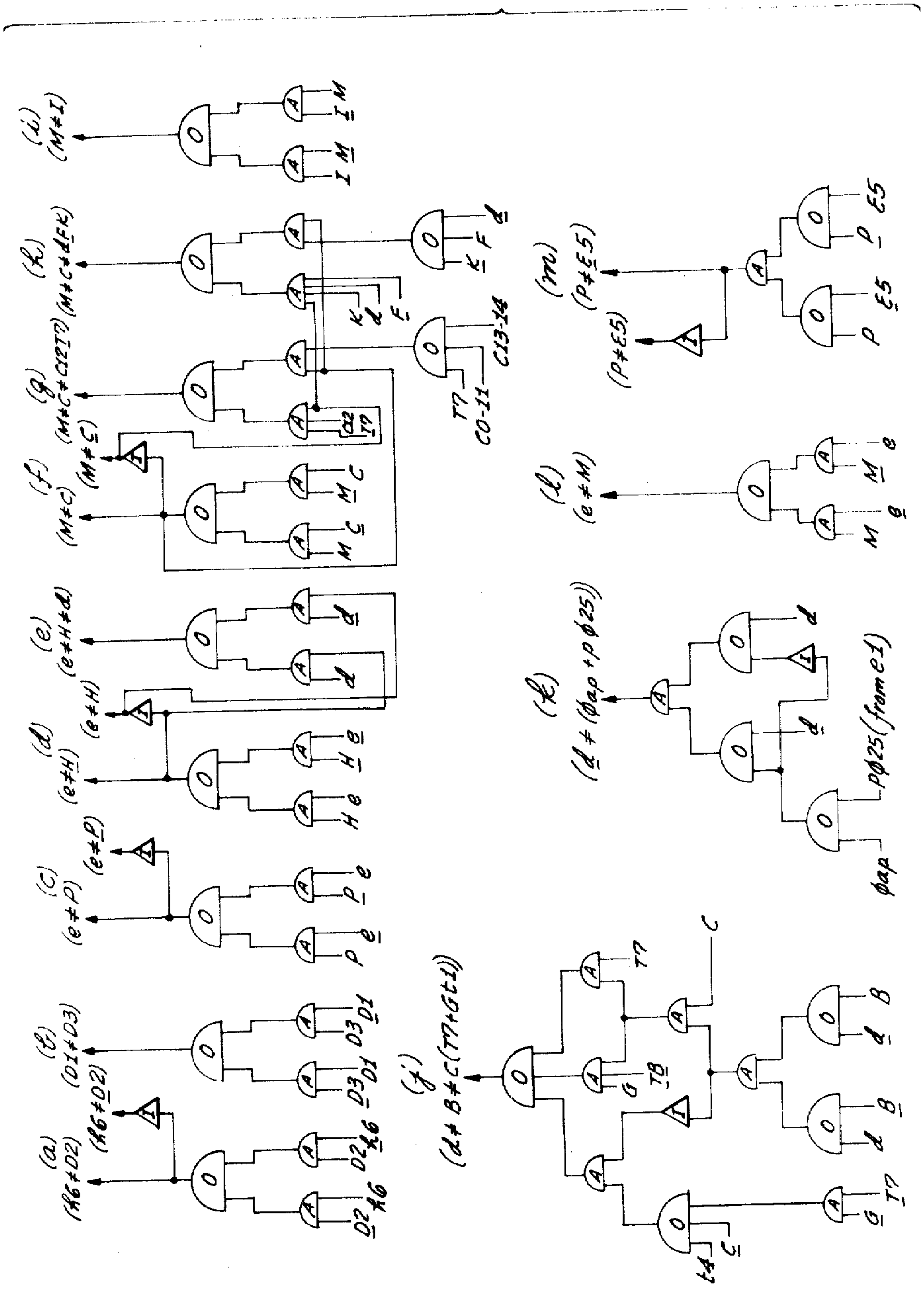
FIGS. 26(*a*) to (*m*) are block diagrams of circuitry which produce signals representative of the various inequalities used in the logic of the desk calculator.
Figure 27:
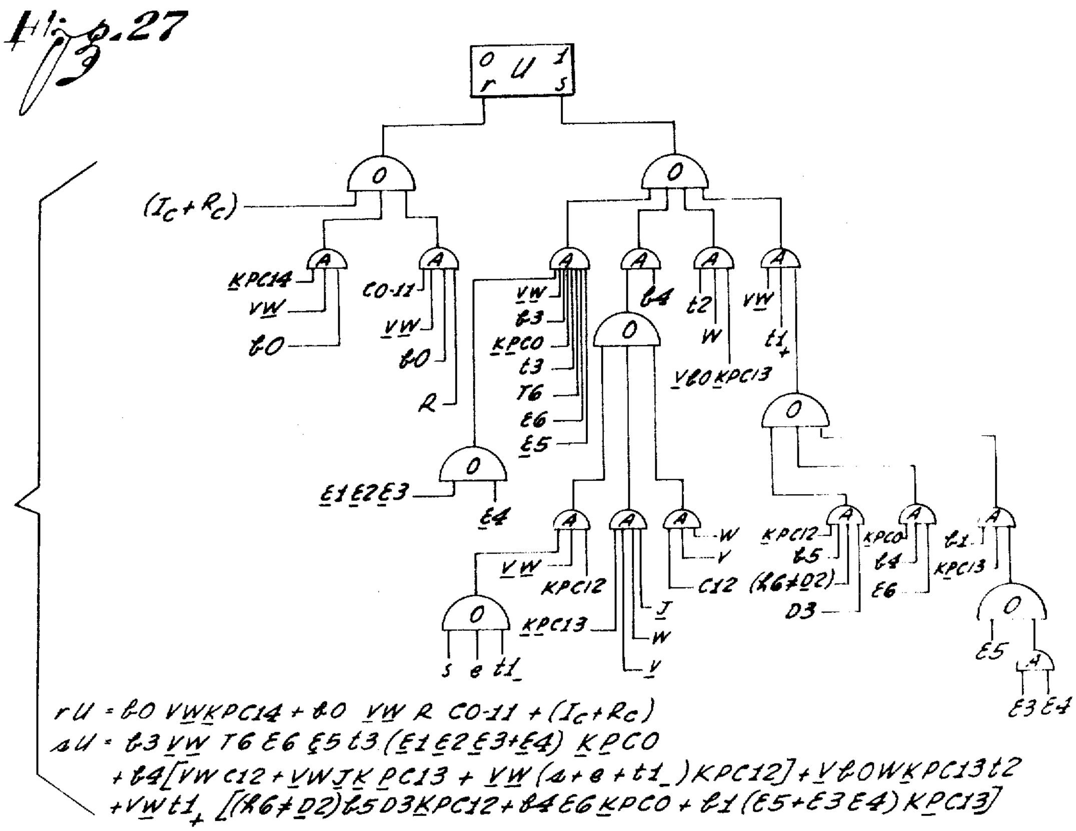
Figure 28:
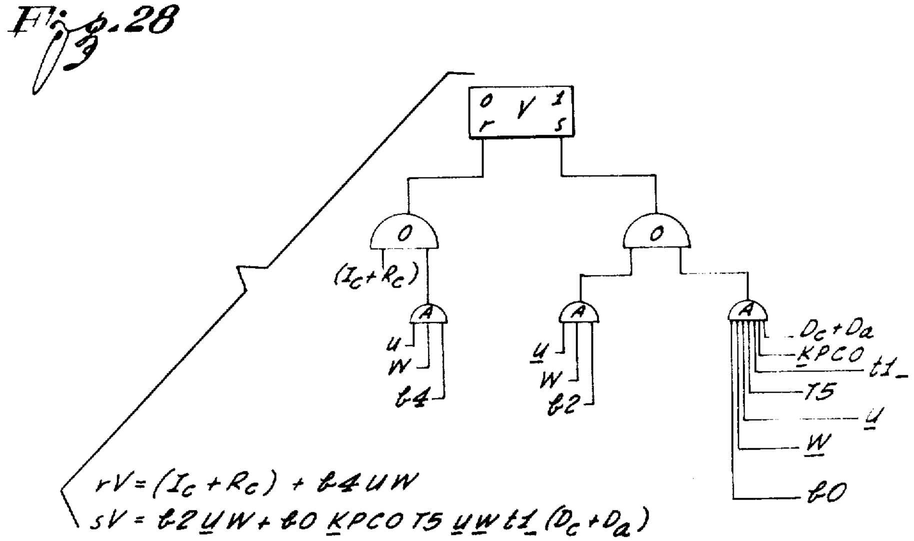

The operation of the desk calculator is controlled by the state of flip-flops U, V, W, X, Y, Z dependent upon signals and flip-flop states which have already been described or will be described in the further explanation of the operation of the desk calculator and as shown in FIGS. 27 to 32. FIGS. 24 and 25(*a*) to (*e*) show the derivation of miscellaneous controlling signals including signals *h*1 to *h*7. FIGS. 26(*a*) to (*m*) illustrate the production of the signals which represent the various inequalities used in the operation of the desk calculator.

*D and E registers.*—A character is presented by memory as four bits held in flip-flop M (shown in FIG. 19) in the four successive bit periods of a character period. The character is typically set into a one-character register, D, which includes four flip-flops D1, D2, D3 and D4 as shown in FIG. 33. The input to the D register is through a fifth flip-flop, $D_e$, and is called *d'*. The output from the D register is called *d*. The four D flip-flops are not connected as a shift register but are individually set and then observed in cyclic succession. For example, a bit presented as *d'* in a *t*1 bit period is placed in flip-flop D1 at the beginning of the following (the *t*2) bit period. The bit is held, meanwhile, in the flip-flop called $D_e$. Similarly, the value of *d'* during the *t*2 bit period is first set into $D_e$, and then set into D2 at the beginning of the *t*3 bit period. Flip-flop $D_e$ is always reset in the third quadrant of a bit period and is then set On if $d'=1$, as shown by $$rD_e=\frac{1}{4}3 \text{ (FIG. 34)};\ sD_e=T6d' \text{ (FIG. 34)}$$

(T6 marks the third and fourth quadrants.) In the first half of a bit period the bit held in $D_e$ is set into one of the four D flip-flops as described by the equations included in FIG. 33.

The values of the bits held in the four D flip-flops are sampled in succession and presented as the signal *d* which is defined as $$d\equiv t1D1+t2D2+t3D3+t4D4 \text{ (FIG. 13)}$$

In each bit period *d* presents the bit which was held as *d'* in the fourth preceding bit period. The full equation for *d'* is described in FIG. 34 which illustrates the control of the flip-flop $D_e$. FIG. 35(*a*) to (*e*) illustrates the derivation of the signals which are used to control the production of *d'*.

Information is presented from the delay line memory in the form of the signal M. Correspondingly, the signal M' carries information being returned to the memory. The signal M' is set into the circulating information pattern so as to be returned from memory after a delay equal to one character period short of a full machine cycle. For example, a bit set into memory as the signal M' in the bit period *t*3KPC8 is returned in the following machine cycle as the signal M at the time *t*3KPC7. In order to recirculate the contents of the working registers unchanged, the signal M must be delayed for one character period before being returned to memory as the signal M'. During the rest state, *ϕ*00, and at various other times, the delay is accomplished by transmitting the working memory through the D register as described by:

$$d'=M;\ M'=d \text{ (normal circulation)}$$

In the following description of the desk calculator it is assumed that *d'* has the value M unless some other value is specified. Similarly, it is assumed that $M'=d$.

An auxiliary register, E, functions in much the same way as the D register. The input to the E register is denoted *e'*, and is set into a flip-flop $E_e$ in the latter part of each bit period, as shown by $$rE_e=\frac{1}{4}3 \text{ (FIG. 33)};\ sE_e=T6e' \text{ (FIG. 33)}$$

The bit is then set into the appropriate one of the four flip-flops, E1, E2, E3 and E4, in the first half of the next bit period. The flip-flops E1, E2, E3 and E4 are shown in FIG. 33. The states of the four flip-flops are presented in succession by an output signal from the E register called *e*. The signal *e* is defined by $$e\equiv t1E1+t2E2+t3E3+t4E4 \text{ FIG. 33)}$$

Figure 36:
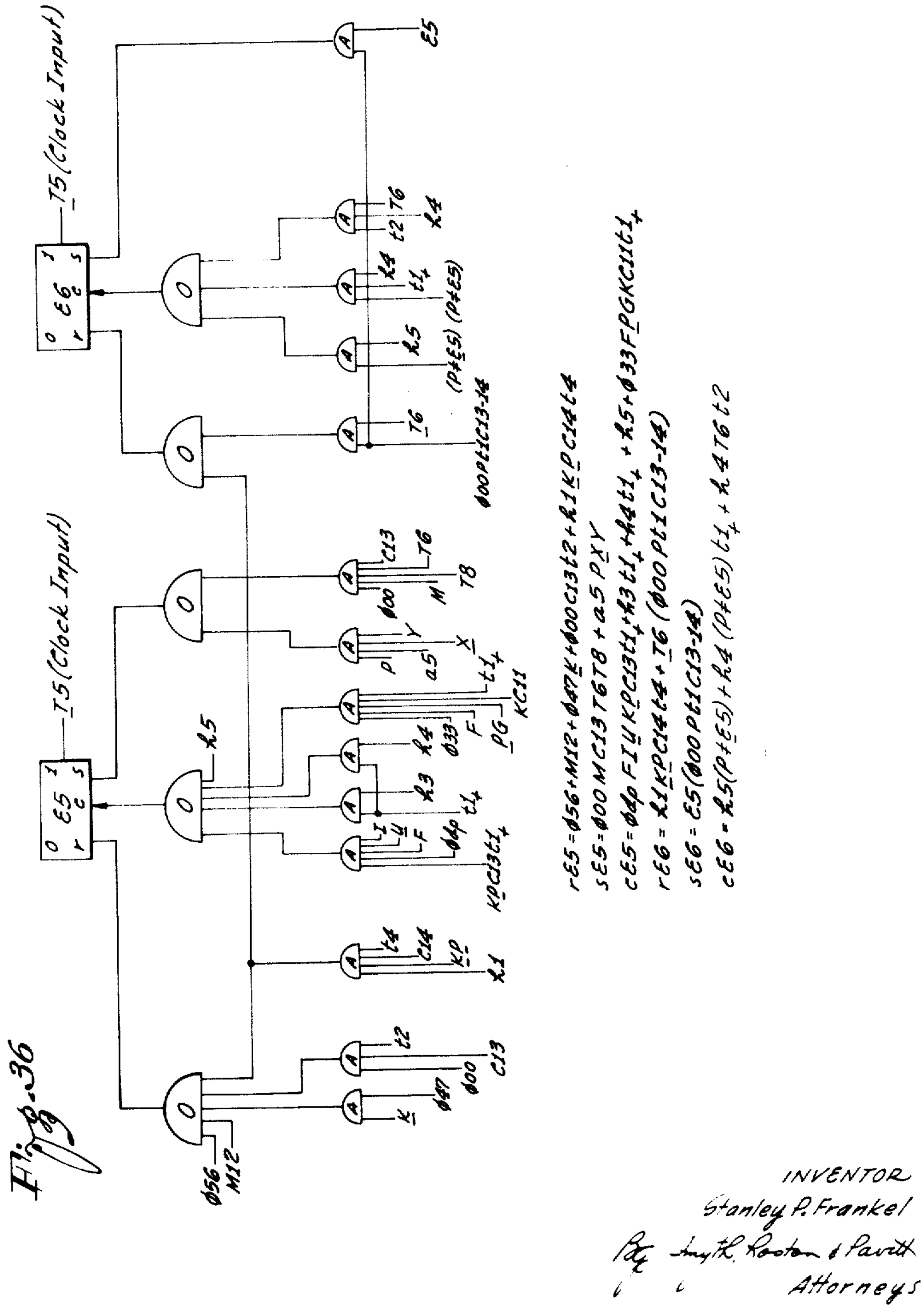
FIG. 36 is a block diagram of the E5 and E6 flip-flops with their associated control circuitry.

The E register also includes two additional flip-flops E5 and E6 as shown in FIG. 36. The E5 and E6 flip-flops are used in manipulation of the decimal indication of the numbers held in the working registers. The formation of the *e'* signal which controls the $E_e$ flip-flop is shown in FIG. 37.

The content of the E register is often held unchanged over long periods of time. Accordingly, the input to the E register is normally expressed as:

$$e'=e \text{ (normal input)}$$

The input to the E register is as above unless some other vallue is specified.

*Number structure.*—The number held in the Q register consists of twelve decimal digits presented by the memory during KPC0–11 and three characters presented by the memory in KPC12–14. The first of the latter three characters, called $S_q$, is presented in KPC12, and represents the signs of the number held in the Q register. $S_q$ usually has one of two normal forms which represent normal positive and negative numbers. When the number in the Q register is changed by a process called "complementing," to be described below, the sign character may become one of two "overdrawn" values. Also in the course of a cumulative division a carry into the sign character may produce one of its two "overflowed" forms. The sign character therefore, may take six forms. These six forms for $S_q$ are also used for the sign characters of the K and P registers, called $S_k$ and $S_p$, respectively as well as a spare sign character, $S_\phi$, presented in KPC12. The six non-decimal forms of the hexadecimal (four-bit) character are used to provide the six forms of the sign character. The hexadecimal character, therefore, represents the decimal digits and the sign character in the following manner:

| Character | t1 | t2 | t3 | t4 |
|---|---|---|---|---|
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| Neg. sign, overdrawn | 0 | 1 | 0 | 1 |
| Neg. sign, normal | 1 | 1 | 0 | 1 |
| Neg. sign, overflowed | 0 | 0 | 1 | 1 |
| Pos. sign, overdrawn | 1 | 0 | 1 | 1 |
| Pos. sign, normal | 0 | 1 | 1 | 1 |
| Pos. sign, overflowed | 1 | 1 | 1 | 1 |

The sign-character $S_q$ is presented as the signal M in KPC12 and recorded as M' in KPC12. $S_k$, the sign character of the K register, is presented in KPC12 and recorded in KPC12. The spare sign characted, $S_\phi$, is presented in KPC12 and recorded in KPC13. Finally, the number held in the P register carries a sign, $S_p$, which is usually presented at the time KPC12 and recorded at time KP13. In the course of an arithmetic operation the sign character $S_p$ may, however, be shifted away from its normal position to any of the positions at which the decimal digits of the P register are usually presented.

The information presented from memory during the character periods C13 and C14 constitute the decimal position indications of the K, Q and P registers. More specifically, the four bits presented in a C13 character period, together with the first two bits of the corresponding C14 character period, form the meaningful part of the decimal indication. No use is made of the bits presented in the last two bit periods of any of the C14 character periods. The six bits presented in $$KP(C13+t12+C14)$$

form the decimal character of the Q register, $D_q$. The six bits presented in $K\overline{P}(C13+t12+C14)$ are called $K_k$, an dindicate the position of the decimal point in the K register. Similarly, in $\overline{KP}(C13+t12+C14)$ there is presented the decimal indication $D_p$ showing the decimal position of the number held in register P. At the times $\overline{K}P(C13+t12+C14)$ a spare decimal indication is presented from memory. Like the spare sign, the spare decimal indication is without meaning.

Since the decimal indications are formed of six bits, 64 different indications of the position of a decimal point are possible. For example, a number $x$ and another number, which is defined as $y=10^{64}x$, differ from each other in that the decimal point of $y$ lies sixty-four places farther to the right. In such a case, the two numbers are indistiinguishable in the desk calculator and are treated in the same way in any arithmetic operation. Similarly, $x$ and a number defined as $z=10^{-64}x$ cannot be distinguished in the desk calculator. No difficulty arises from the above ambiguity so long as none of the numbers used has a decimal point which is extremely far from a "normal position." The normal position for the decimal point in the desk calculator is immediately to the left of the most significant digit. If the operator of the desk calculator avoids numbers, including those derived as products or quotients, which have a decimal point more than fifteen places away from the normal position, then no ill effect of the above ambiguity arises.

The normal vallue for any one of the decimal indications is 63. This is represented by one-bits in all six positions of the decimal indication. For example, if the number +0.123 is held in the K register, then $D_k=63$. The bis presented in $K\overline{P}C13\text{–}14$ are accordingly 1111 11xx (in the order of appearance). The bits marked x are irrelevant. A decrease in the decimal indication signifies a motion to the right of the decimal point. If the number −123.456 is held in the P register then $D_p=60$ and the signal M includes the bits 0011 11$xx$ during the period KPC13–14. Increasing the decimal character past the maximum value of 63 (and therefore, through zero) indicates a leftward motion of the point; thus, if the number +0.000123456 is held in the Q register then $D_q=2$ and the M signal during $\overline{KP}C13\text{–}14$ equals 0100 00$xx$.

Register P holds twenty-four digits, which are presented in PC0–11 in both the K and the $\overline{K}$ half machine cycles. The least significant digit of the P register, denoted $p0$, is normally presented in $\overline{K}PC0$ and the most significant digit, $p23$, is normally presented in KPC11. The sign character, $S_p$, is normally presented in KPC12. The twenty-five characters described as $p0$ to $p23$ and $S_p$, may be cyclically permuted from their normal positions in the course of an arithmetic operation, but are returned to their normal places during a routine called Restore-P to be described later.

The decimal point placement of the number held in the P register is indicated by $D_p$, and is always presented in KPC13 and KPC14. The decimal indication is set to its normal value of 63 when the register is cleared. When the digits and sign character of the P register are precessed leftward during an arithmetic operation, the decimal character $D_p$ is correspondingly increased. Generally the significance of $D_p$ is as follows. When $D_p=63$, this indicates a decimal point in a normal position just to the left of the digit presented at the time KPC11. When $D_p=62$, the decimal point is just to the right of that digit. When $D_p=0$, the decimal point is one place to the left of the normal position. Other values of $D_p$ indicate positions of the decimal point still further from the normal position.

The decimal indication, $D_p$, provides an absolute indication of the position of the decimal point of the P register and is not an indication of the position of the decimal point relative to the sign character. Both the sign character, $S_p$, and the digits of the P register may be shifted from normal position, as mentioned previously. Each time the digits and the sign character of the P register are shifted left, $D_p$ must be increased by one to preserve the meaning of the number held in the P register. The sign character, $S_p$, serves the auxiliary purpose of indicating where the sequence of digits begins and ends.

*Delay-P phases.*—The registers K and a part of P are interdigitated by character. The rest of the P register is interdigitated with the register Q. A digit of K is aligned with a digit of P when the two digits are presented in P and $\overline{P}$ character periods which form a pair. In the performance of an addition or subtraction, a digit of K may only be added to or subtracted from a digit of P aligned with it. Therefore, in many parts of arithmetic routines it is necessary to shift the digits of the P register left so as to bring the 12 digits of the K register into alignment with a desired set of 12 consecutive digits among the 24 digits of the P register. After such a left shift has been performed the most significant digit of the P register is no longer presented at the time KPC11. In order to mark the beginning and end of the series of decimal digits of the P register, the sign character, $S_p$, is shifted along with the decimal digits to serve as a marker for the beginning and end of the series of digits held in the P register. Since the sign character, $S_p$, always has one of the six values which do not represent decimal digits, $S_p$ can be recognized as distinct from the digits of the P register. Therefore, if $S_p$ is presented at the time $\overline{K}PC2$, then the light presented in KPC1 is the most significant digit of the number held in the P register, and the digit presented in $\overline{K}PC3$ is the least significant digit.

Figure 9:
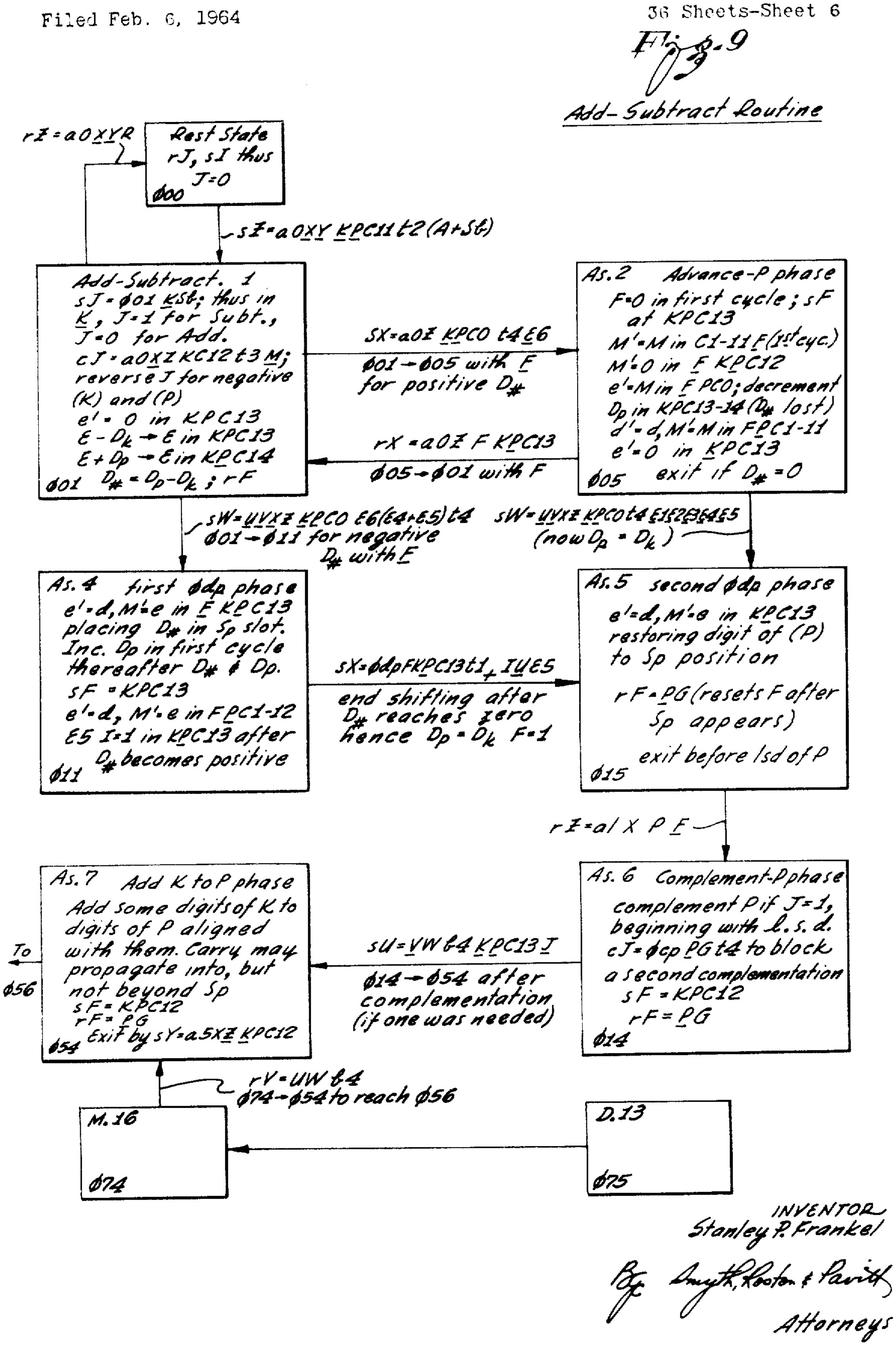
FIG. 9 is a flow chart of the Add-Subtract routine.
Figure 10:
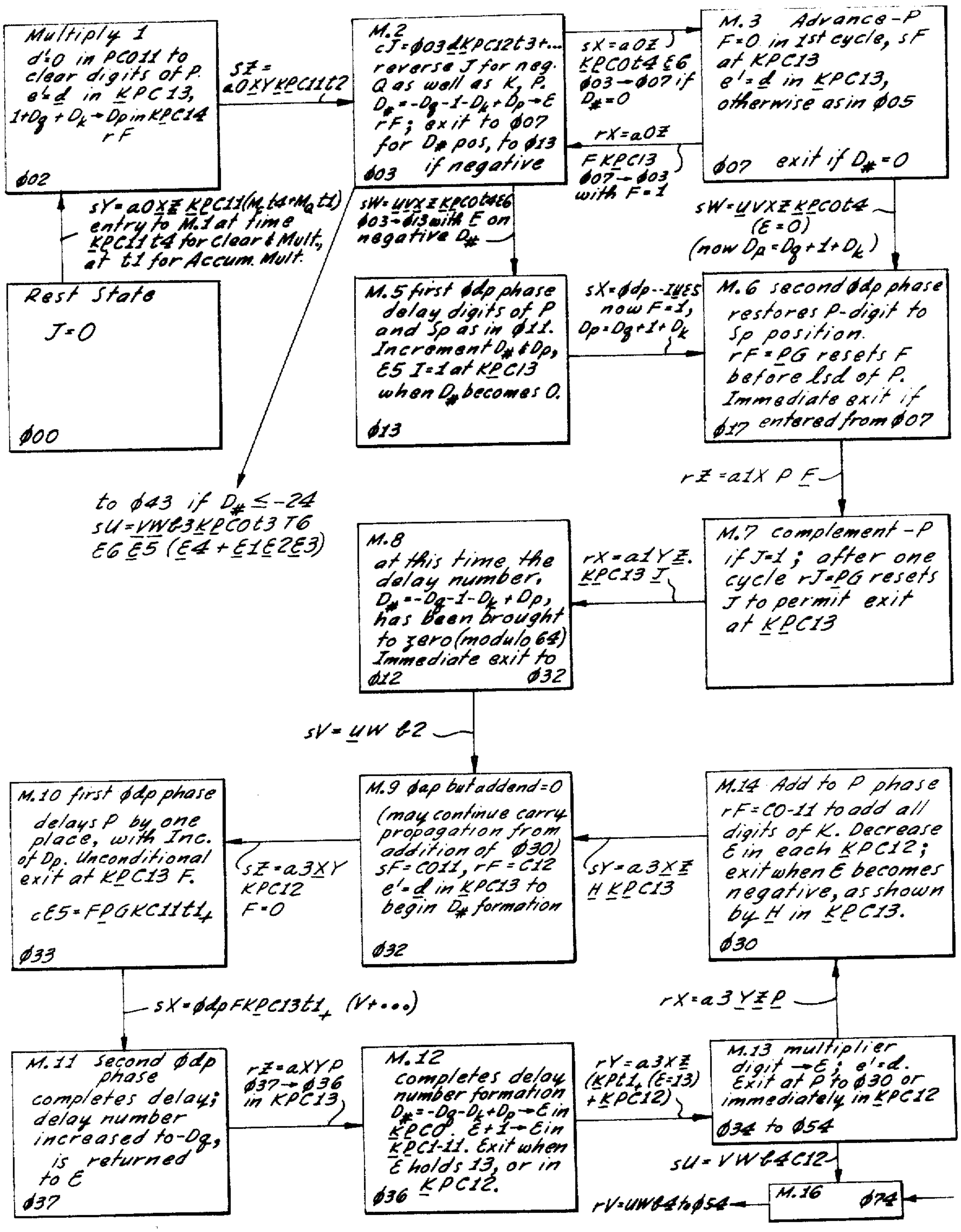
FIG. 10 is a flow chart of the Multiply routine.
Figure 38:
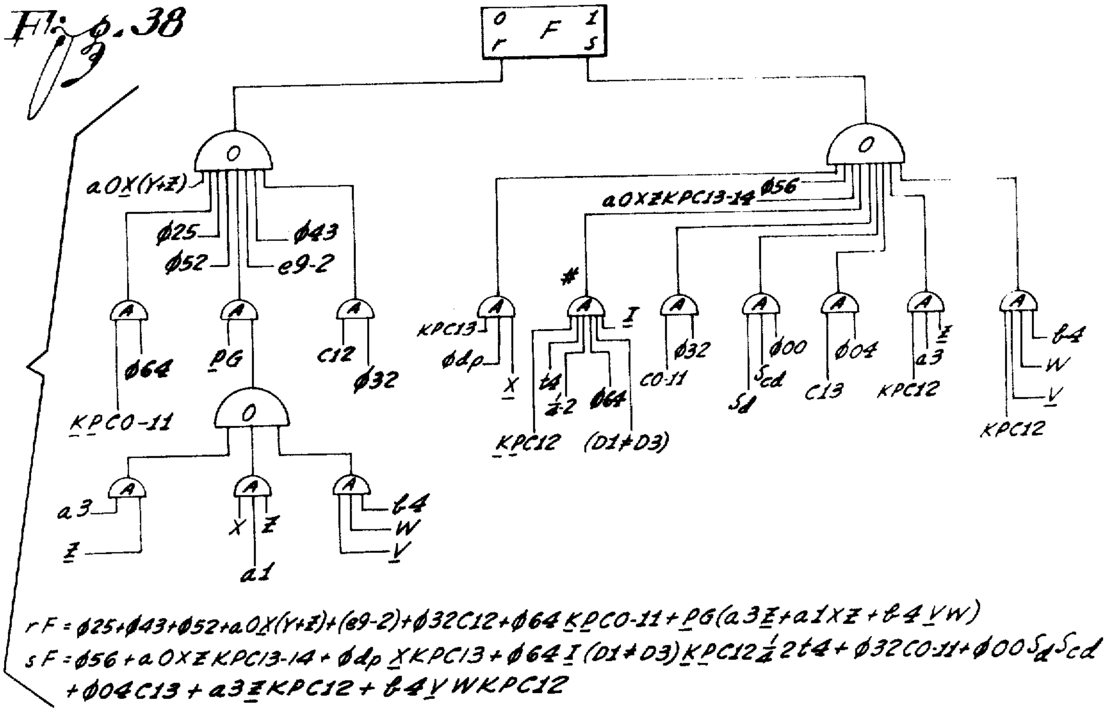
FIG. 38 is a block diagram of the F flip-flop and its associated control circuitry.

The left shift of the P register is performed in a number of pairs of phases which are collectively called $\phi dp$. The two phases of each pair are differentiated by the state of the X flip-flop. When the X flip-flop is "Off" the first phase of the pair is occupied and when the X flip-flop is "On" the second phase is occupied. A flip-flop called F plays an auxiliary role in distinguishing various stages of the $\phi dp$ activity. The complete operation of the flip-flop F is shown in FIG. 38. The flip-flop F must be "Off" in order to enter the first of the $\phi dp$ pair of phases. The entry to this first phase in some cases occurs at a time when the complete E register holds a delay number which indicates the number of steps of left shifting required. The delay number, called $D_{\#}$, is regarded as the negative (modulo 64) of the desired number of shifts. The statement that two numbers are equal (modulo 64) means that their difference is an integral multiple of 64, which may be zero. For example, if $D_{\#}=63$, one left shift is to be done since the number one is the negative of 63 (modulo 64). The number held in the E register has the significance of a delay number during the delay-P phases $\phi 11$ and $\phi 13$ and the phases $\phi 13$ and $\phi 17$. The phases $\phi 11$ and $\phi 15$ are shown in FIG. 9 as part of the Add-Subtract routine and the phases $\phi 13$ and $\phi 17$ are shown in FIG. 10 as part of the multiply routine. In other delay-P phases the number held in the E register does not have the significance of a delay number.

The flip-flop F is set "On" at time KPC13 as shown by $$sF=\phi dpKPC13\overline{X}+\ .\ .\ .\ \text{(FIG. 37)}$$

The first occupied phase of the pair of delay P phases is marked $\overline{X}$, the second is marked X. In the character period preceding the turning on of the flip-flop F the hexadecimal digit held in E is exchanged with the digit of the P register presented by M during KPC12 and by $d$ during KPC13. The digit which is exchanged is called the short delay number. The exchange is described by $$M'=M5e+M0d+\ .\ .\ .\ \text{(FIG. 41)}$$
$$M5=e5\text{–}2+\ .\ .\ .\ \text{(FIG. 41)}$$
$$e5\text{–}2=\phi dpXFKPC13+\ .\ .\ .\ \text{(FIG. 37)}$$
$$M0=\overline{M5}+\ .\ .\ .\ \text{(FIG. 41)}$$

The above notation expresses the fact that during the period of time described by $\phi dpX$FKPC13 the bits sent into memory as the signal M′ are the bits $e$ emerging from the E register rather than the bits $d$ which are the usual source. Similarly, in the same period of time the bits $d$, rather than the usual bits $e$, supply the input to the E register. Here M5 represents the collection of circumstances in which the memory input is drawn from $e$ rather than from the customary source, $d$. (The coefficient M0 becomes false when any one of the other coefficients in the M′ equation, M1, M4, M5 . . . becomes true.) Similarly, the changed source of input to the E register at the same time is shown more formally by the equations $$e'=e5d+e0e+\ \ldots\ \text{(FIG. 37)}$$
$$e5=\phi dpXFKPC13+\ \ldots\ \text{(FIG. 37)}$$
$$e0=\overline{e5}+\ \ldots\ \text{(FIG. 37)}$$

Here, also, $e0$ becomes false whenever one of the other coefficients in the $e'$ equation, $e1$, $e2$ . . . $e9$, becomes true. The equation for the input to the D register, $d'$, has a similar residual term showing its normal source, M, namely:

$$d'=d0M+\ \ldots\ \text{(FIG. 34)}$$

$d0$ becomes false whenever one of the coefficients, $d1$, . . . $d15$ becomes true. In the following, the disappearance of the normal source for M′, $e'$, or $d'$ is implied by each statement of a special source.

If the prior content of the P register was normally situated, its sign character, $S_p$, is brought into the E flip-flops during the above exchange and the four least significant bits of the delay number are recorded into memory in the normal position of $S_p$. In any case the "short delay number" is recorded in such a way as to reappear from memory at KPC12. In the remainder of the $\underline{X}\phi dp$ phase the characters to be shifted are set into D during the character periods in which they appear, PC0–11, and in the character periods $\underline{P}$C1–12 they are exchanged with E as described by $$e'=5d+\ \ldots\ \text{(FIG. 37)}$$
$$e5=\phi dp\underline{X}F\underline{P}C1\text{–}12\ \ldots\ \text{(FIG. 37)}$$
$$M'=M5\overline{e}+\ \ldots\ \text{(FIG. 41)}$$
$$M5=\phi dp\underline{X}F\underline{P}C1\text{–}12+\ \ldots\ \text{(FIG. 41)}$$

Figure 39:
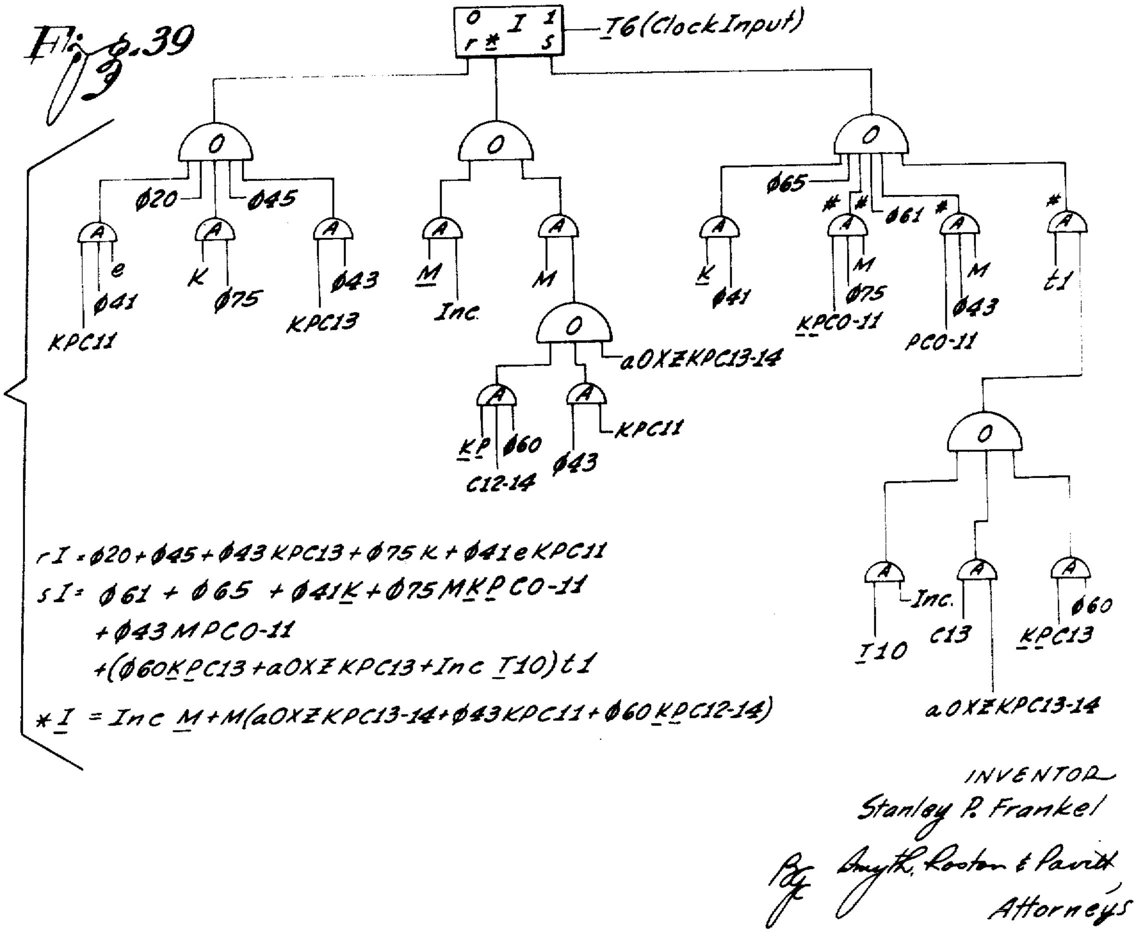
FIG. 39 is a block diagram of the I flip-flop and its associated control circuitry.

(Flip-flop F is "On" after $\phi dp\underline{X}$K$\underline{P}$C13). Other characters held in memory circulate in the normal fashion during $\phi dp\underline{X}$F except for the short delay number, appearing at times KPC12, and the decimal indication $D_p$, appearing at KPC13–14. The first delay P phase may last for many cycles and the delay number and $D_p$ are incremented by unity during each cycle. A flip-flop, I, shown in FIG. 39, is used in the incrementation. A similar incrementation of one or two characters is performed in other phases and the character periods in which the incrementation occurs are collectively denoted as a signal Inc. The Inc. signal is defined in FIG. 40 and includes a specification of character periods as well as of phases.

The incrementing process for $\phi dp$ is described by:

$$\text{Inc.}=\phi dpF\underline{X}KPC12\text{–}14+\ \ldots\ \text{(FIG. 40)}$$
$$d'=d5(M\neq I)+\ \ldots\ \text{(FIG. 34)}$$
$$d5=\text{Inc.}+\ \ldots\ \text{(FIG. 35)}$$
$$sI=\text{Inc. } t1\underline{T}10+\ \ldots\ \text{(FIG. 39)}$$
$$*I=\text{Inc.}\underline{M}+\ \ldots\ \text{(FIG. 39)}$$

These equations describe two separate incrementations. One, at the KPC12, acts on the short delay number which is circulating in the position normally occupied by $S_p$. The other, performed in the two noncontiguous character periods KCP13 and KPC14, acts on $D_p$. The above equations show that flip-flop I is set on in the $t1$ bit period at the beginning of each of these incrementations, and is reset following the appearance of any zero bit in the number being incremented. (The symbol $*\underline{I}$ indicates a resetting signal which takes effect at the end of the bit period in which the signal has the value One. Similarly, a clocked setting input for flip-flop I which takes effect following the bit period in which it is true is denoted *I. A similar notation is used for clocked inputs to other flip-flops.) So long as the flip-flops I remain "On," each bit of the incremented number, $d'$, has the opposite value from the corresponding bit of the unincremented number, M. After flip-flop I has been reset, $d'$ and M are alike. The two situations together are expressed by $$d'=\underline{M}I+M\underline{I}\ \text{in Inc. (FIG. 34)}$$

The right member of this equation is expressed by the symbol $(M\neq I)$. In the expression for $s$I, Inc.$t1\underline{T}$10, the factor $\underline{T}$10 serves to prevent the setting of flip-flop I at the time $t1$ of KCP14 since the character presented at that time is not a number to be incremented separately but is rather a continuation of the number whose presentation began at the time KPC13. The same is true for other situations in which the signal Inc. covers a pair of character periods in C13 and C14. Carry from the short delay number into the flip-flop E5 is shown by $$cE5=\phi dpFK\underline{P}C13t1+\underline{U}I+\ \ldots\ \text{(FIG. 36)}$$

Carry into the flip-flop E6 is not needed.

During the character period K$\underline{P}$C13 of the phases $\phi$11 and $\phi$13 the state of the flip-flops $\overline{I}$ and E5 is examined to determine whether the delay number has just been brought up to a zero value. If a zero value is found, the flip-flop X is set "On" to end the left shifting. The termination of phases $\phi$11 and $\phi$13 is indicated by $$sX=\phi dpFK\underline{P}C13tI+(\underline{U}IE5)+\ \ldots\ \text{(FIG. 30)}\ (\phi 11\rightarrow\phi 15,\ \phi 13\rightarrow\phi 17)$$

The conditions for termination in other $\phi dp$ phases are discussed with the routines which use them.

At the time of entry to $\phi dp$ X one of the characters of the P register is in E while D holds the incremented short delay number. In the first character period of $\phi dp$ X that character of the P register held in E is restored to memory in the $S_p$ position and the short delay number is set back into E. This is shown by $$e'=e5d+\ \ldots\ \text{(FIG. 37)}$$
$$e5=e5\text{–}2+\ \ldots\ \text{(FIG. 37)}$$
$$e5\text{–}2=\phi dpXK\underline{P}C13+\ \ldots\ \text{(FIG. 37)}$$
$$M'=M5e+\ \ldots\ \text{(FIG. 41)}$$
$$M5=e5\text{–}2+\ \ldots\ \text{(FIG. 41)}$$
$$e5\text{–}2=\phi dpXK\underline{P}C13+\ldots\ \text{(FIG. 37)}$$

Exit from the second delay phase marked $\phi dp$ X may occur at any time following K$\underline{P}$C13, and each exit is described separately in the description of the individual delay-P phases.

*Advance-P Phases.*—In the early parts of the Add-Subtract and Multiply routines, it is sometimes necessary to shift the digits of the P register to the right rather than to the left in order to bring the digits into a proper alignment with the digits of the K register. The right-shifting is performed in phases $\phi$05 (Add-Subtract) and $\phi$07 (Multiply). Each of the phases $\phi$05 and $\phi$07 is subdivided into two sub-phases by the flip-flop F. The flip-flop F is "Off" at the time of entry into the advance-P phases and is turned "On" at a later time. The two advance-P phases are marked $a$0 XZ and are entered from phases $\phi$01 and $\phi 0z$ at the time $\underline{KP}$C0 which is the time when the formation of the delay number has just been completed. The phases $\phi$01 and $\phi$03 are marked $a$0 $\underline{XZ}$. Entry to the advance-P phases depends on the positiveness of the delay number which is held in the complete set of E flip-flops. In the earliest part of $\underline{KPC}$0 the most significant bit of $D_\#$ is held in E6. If E6$=$0, hence $D_\#$ is positive, phases $\phi$05 and $\phi$07 are entered from $\phi$01 and $\phi$03. If $E6(E4+E5)=1$, which indicates that the delay number is negative but not more negative than $-23$, phases $\phi$11 and $\phi$13 are entered from phases $\phi$01 and $\phi$03. The above phase changes are described by $sX=a0Z\underline{K}\underline{P}C0\underline{E}6t4+\ \ldots$ (FIG. 30) ($\phi$01, 03→405, 07)

Figure 30:
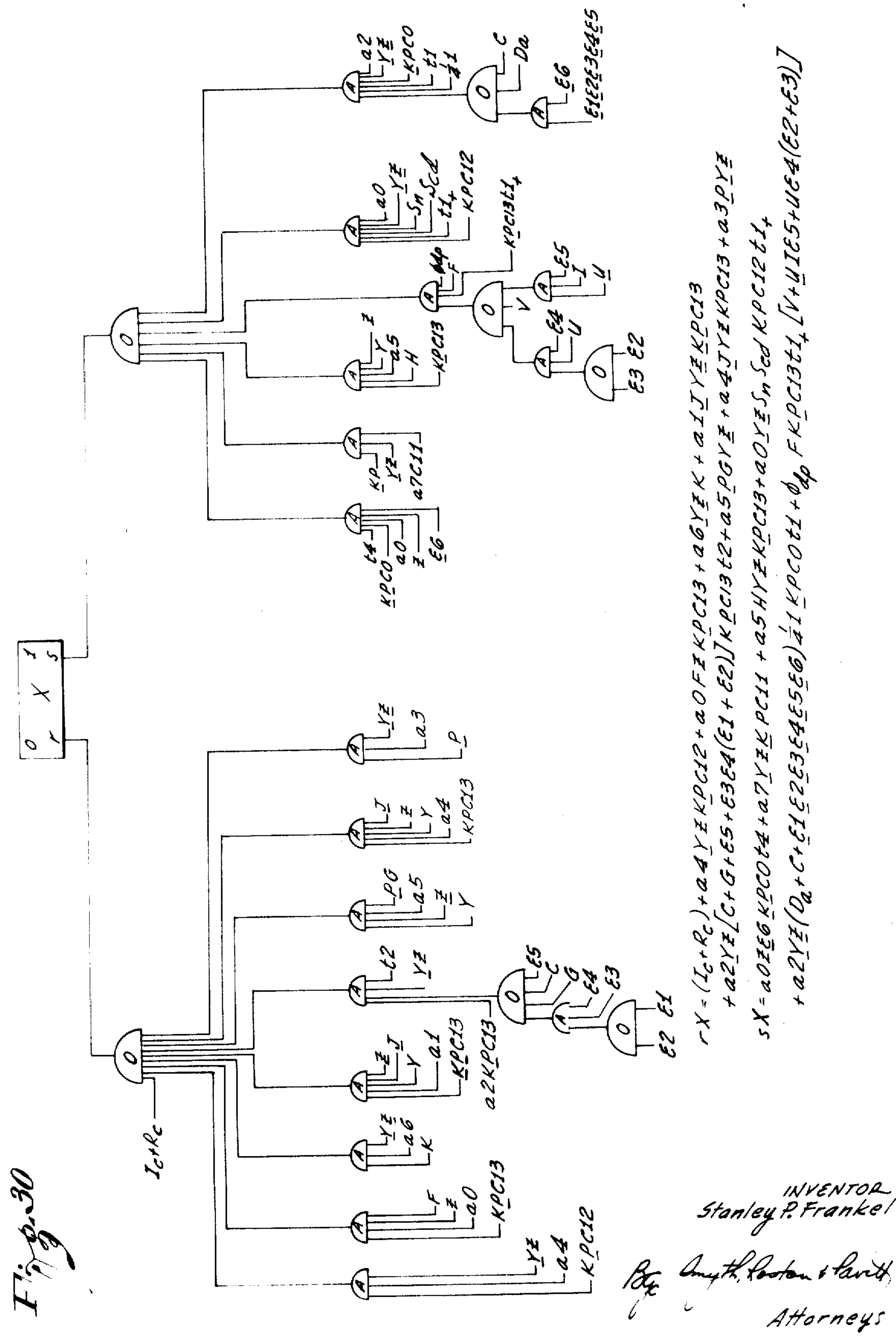
Figure 32:
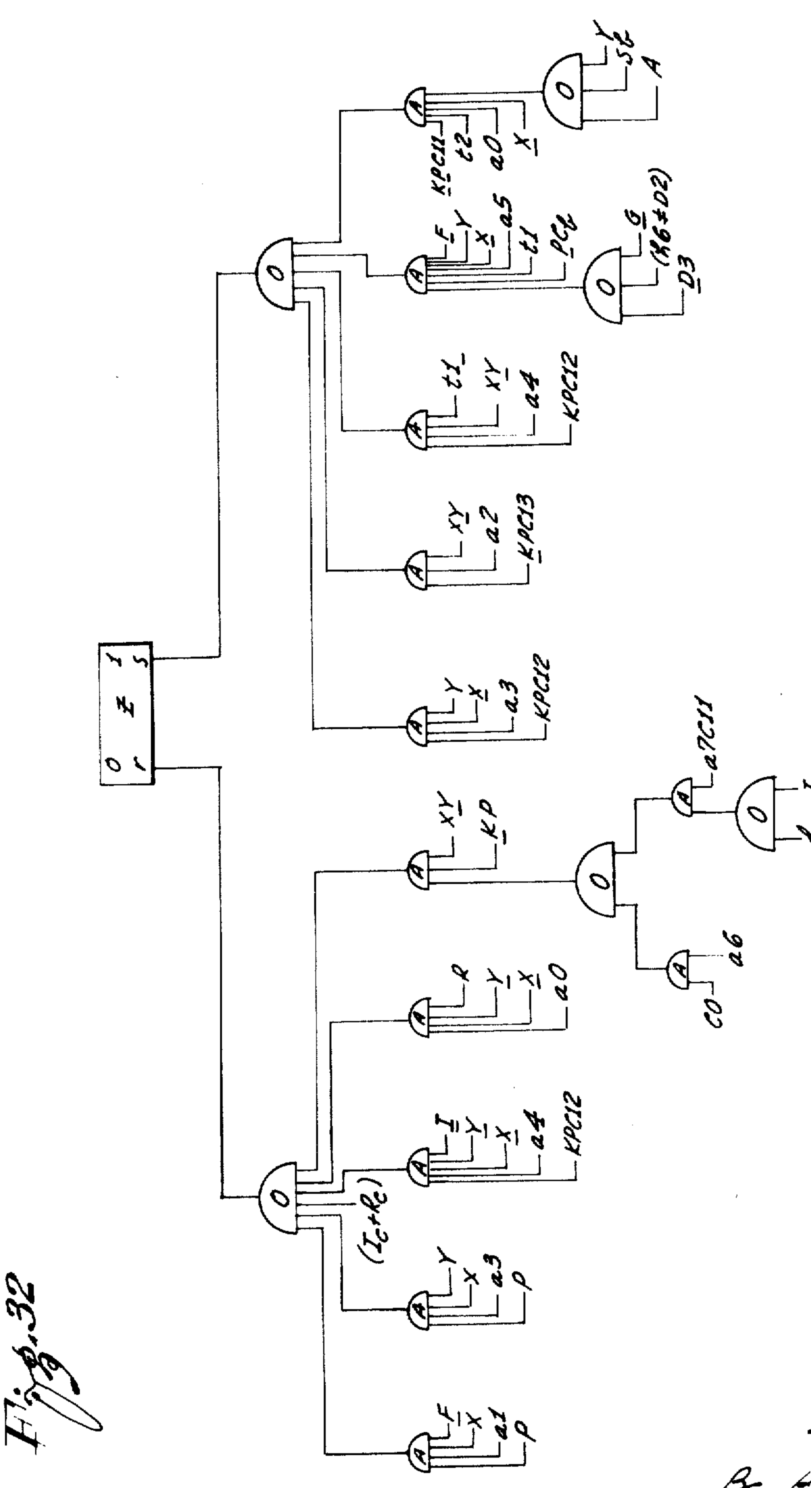

$sX=a0Z\underline{K}\underline{P}C0\underline{E}6t4+\ \ldots$ FIG. 30) ($\phi$01, 03→$\phi$05, 07)

A special case occurs in the multiply routine when $D_{\#}\leq$-24. A delay number of this nature indicates that a multiplication is senseless since the product would be a very small number. Moreover, if the P register is shifted in accordance with a $D_{\#}\leq$-24, an error would be introduced since it is impossible to distinguish between large and small number once the P register has been shifted more than 24 places. The desk calculator, therefore, bypasses the multiply routine and goes directly to $\phi$43 of the restore-P routine which leads to a return to the rest state via phases $\phi$41 and $\phi$40. Entry to $\phi$43 is described by $sU=b3\underline{V}\underline{W}\underline{K}\underline{P}C0T6E6t3(\underline{F}1\underline{E}2\underline{E}3+\underline{E}4)+\ \ldots$ (FIG. 27) ($\phi$03→$\phi$43)

In the advance-P phases, only the decimal digits of the P register are shifted. The decimal position character, $D_p$, and the sign $S_p$ are left in their normal positions. The sign $S_p$ is a normal positive or negative sign and is neither overdrawn nor overflowed. The most significant digit position, KPC11, is set to zero as all the other digits are shifted to the right. The least significant digit of the P register which was presented in $\underline{K}$PC0, is lost in the shift.

The advance-P phase is occupied for nearly two machine cycles in which one step of right shifting is performed. After each right shift there is a return to phases $\phi$01, 03 for completion of a new calculation of the delay number, after which the advance-P phase is entered again. If the new delay number is still greater than zero there is another right shift. If the new delay number is zero, as indicated by $\underline{E}1\underline{E}2\underline{E}3\underline{E}4\underline{E}5$ at the time of entry to the advance-P phase, there is an immediate departure, via phase $\phi$15 or $\phi$17, for phase $\phi$14 or $\phi$16. This is described by $sW=\underline{U}\underline{V}XZ\underline{K}\underline{P}C0t4\underline{E}1\underline{E}2\underline{E}3\underline{E}4\underline{E}5+\ \ldots$ (FIG. 29) ($\phi$05, 07→$\phi$15, 17)

$rZ=a1XP\underline{F}+\ \ldots$ (FIG. 32) ($\phi$15,17→$\phi$14,16)

As mentioned above, flip-flop F is "Off" at the time of entry to the advance-P phases as assured by the term, $rF=a0\underline{X}(Z+Y)+\ \ldots$ (FIG. 38)

In $\phi$15,17 flip-flop F is reset on the appearance of the sign character $S_p$.

In the first cycle of the advance-P phases all of the digits presented by M in the character periods C1–11 of both half-cycles are advanced by one character period. The advancement is accomplished by recording the digits as M′ immediately on presentation of the digits from memory. This is described by the portion of the expression for M′ shown in FIG. 41 as $M'=M6M+\ \ldots$ ; $M6=a0XZ\underline{F}C1\text{–}11+\ \ldots$ (First advance-P cycle)

The least significant digit of the more significant half of P is captured in E at the time KPC0 as shown by $e'=e7M+\ \ldots$ (FIG. 37);

$e7=a0XZ\underline{F}PC0+\ \ldots$ (FIG. 37)

The delay number is lost in the above process.

In the first cycle of the advance-P phases all of the decimal digits of the Q, K and P registers, except the least significant of each half-cycle, are advanced in position by one character period. The least significant digit of P presented in the first half-cycle is lost, while that of the second half-cycle is captured in the E flip-flops. The most significant digit of each half of the P register is recorded in duplicate.

Figure 34:
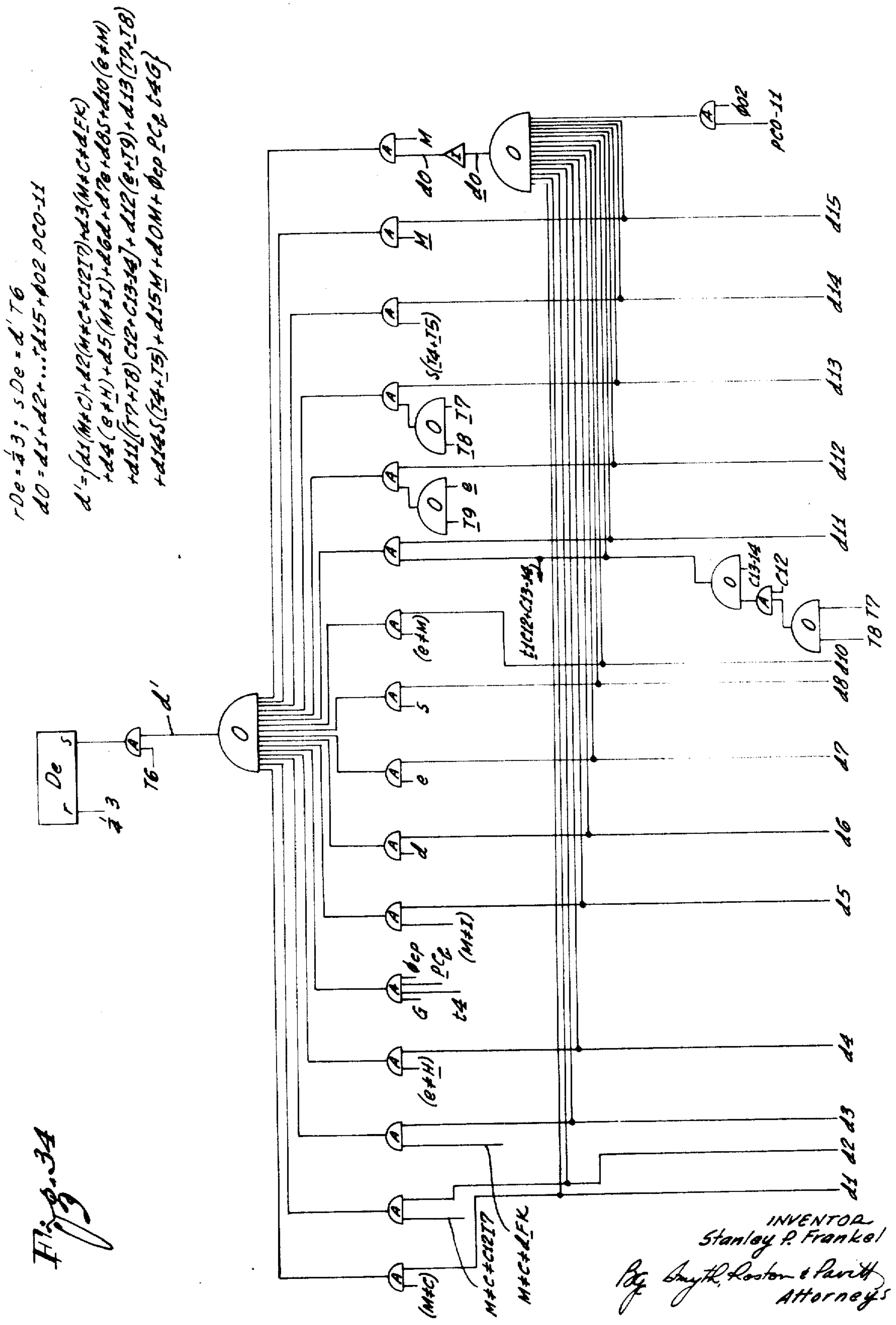
FIGS. 34 and 35(*a*) to (*l*) are block diagrams of the circuitry used to produce the *d'* signal.
Figure 35:
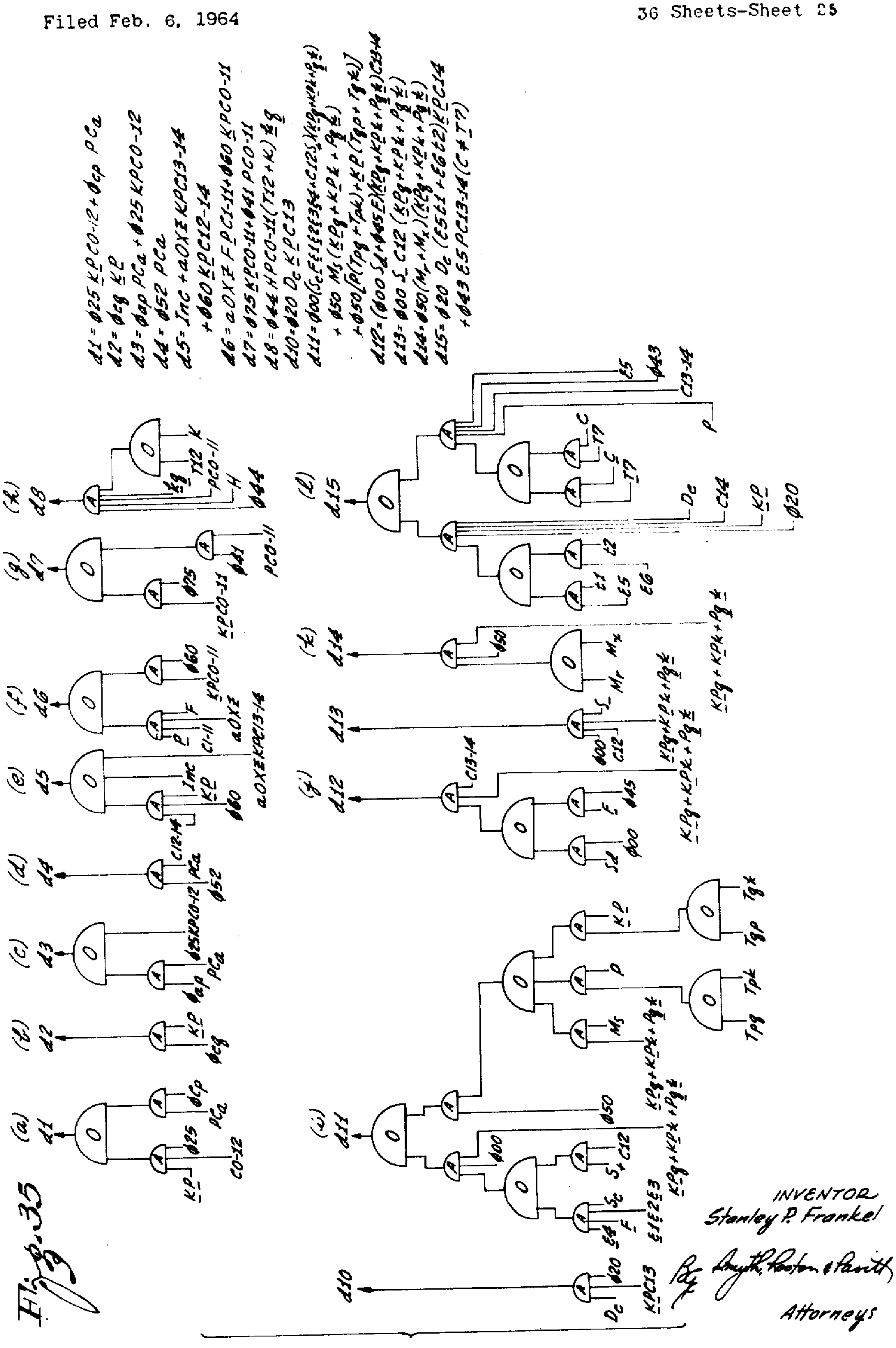

At the end of the first advance-P phase the decimal indication of P is decremented by one as described by $d'=d5(M\neq I)+\ \ldots$ (FIG. 34); $d5=a0XZKPC13\text{–}13+\ \ldots$ (FIG. 35) (First advance-P)

$sI=t1d5C13+\ \ldots$ (FIG. 39) (First advance-P)

$*\underline{I}=Md5+\ \ldots$ (FIG. 39) (First advance-P)

When the decimal indication is decremented, flip-flop F is set "On" to distinguish the second cycle from the first.

$sF=d5+\ \ldots$ (FIG. 38)

In the second cycle of the advance-P phase the advanced decimal digits of the Q and K registers appear and are set into the D flip-flops at the times PC0–10. The advanced digits of Q and K are not recorded in the following character periods $\underline{P}$C1–11, but are held for an additional character period in the D flip-flops to permit the recording of these digits in their proper positions. This is described by $d'=d6a+\ \ldots$ (FIG. 34); $d6=a0XZF\underline{P}C1\text{–}11+\ \ldots$ (FIG. 35) (Second advance-P cycle)

Figure 41:
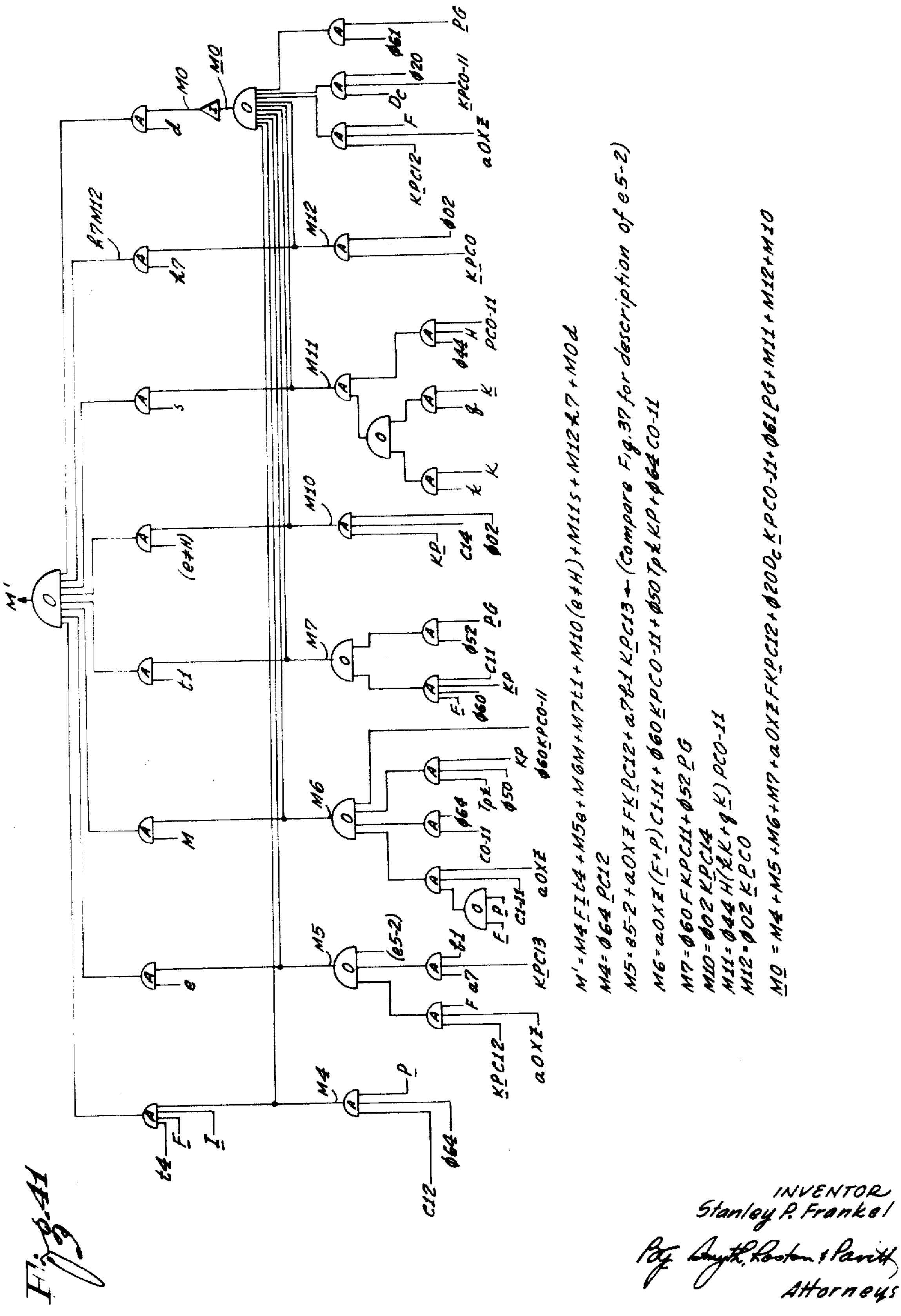
FIG. 41 is a block diagram of the circuitry used to produce the memory input signal M'.

Also at the times $\underline{P}$C1–11 the once-advanced digits of the P register presented in M are again advanced by being immediately recorded as shown in the expression for M′ illustrated in FIG. 41 as $M'=M6M+\ \ldots$ ; $M6=a0XZF\underline{P}C1\text{–}11\ \ldots$ (Second advance-P cycle The least significant digit of the more significant half of the P register which was saved in the E flip-flops is recorded in the last decimal digit position of the first half of the P register. Also a zero is placed in the most significant digit position in the second half of the P register. These operations are described by $M'=M5e+\ \ldots$ (FIG. 41); $M5=a0XZ\underline{K}\underline{P}C12+\ \ldots$ (FIG. 41) (Second advance-P cycle)

$\underline{M}0=a0XZFK\underline{P}C12+\ \ldots$ (FIG. 41)

At the time $\underline{K}$PC13–14 in the second cycle of the advance-P phase, a number is set into the E register, including the flip-flops E5 and E6, to begin the formation of a delay number. This capture of a number by the E register is also carried out in a number of other phases, as well as the second advance-P phases, and is described here for all of these phases. The phases to which this description applies are the advance-P phases $\phi$05 and $\phi$07, phase $\phi$01 in the Add-Subtract routine, phases $\phi$02, $\phi$03, and $\phi$32 in the Multiply routine, and $\phi$20 in the Divide routine. For convenience the same capture is carried out in phases $\phi$06, $\phi$36, and $\phi$60. The number set into the E register is zero for phases $\phi$01 and $\phi$05 of the Add-Subtract routine. In all of the other phases mentioned the number is the complement of the decimal character of the Q register, represented by the signal $\underline{d}$ at the times $\underline{K}$PC13 and the first two bit periods of $\underline{K}$PC14. All of the circumstances in which the above setting of the E register is performed are denoted $h$1; thus $h1\equiv a0(Y+Z)+V\underline{W}b0+a3Y\underline{Z}$ (FIG. 24)

The two phases, $\phi$01, $\phi$05, in which zero is set into the E register are distinguished from the rest of the signal $h1$ by having $V+Y=0$. Accordingly, the quantity to be set into the E flip-flops may be described as $\underline{d}(V+Y)$, and its insertion into E is described by the equations, $e'=e4d(V+Y)+\ \ldots$ (FIG. 37); $e4=h1\underline{K}\underline{P}C13+\ \ldots$ (FIG. 37) (Sets first four bits into E1, E2, E3, E4)

$rE5=h1\underline{K}\underline{P}C14t4+\ \ldots$ (FIG. 36) (preparatory resetting of E5)

$rE6=h1\underline{K}\underline{P}C14t4+\ \ldots$ (FIG. 36) (preparatory resetting of E6)

$cE5=h3t1_{+}+\ \ldots$ (FIG. 36) (sets fifth bit into E5)

$cE6=h3t2_{+}+\ \ldots$ (FIG. 36) (sets sixth bit into E6)

where $h3\equiv h1\underline{K}\underline{P}C14\underline{d}(V+Y)$ FIG. 24)

At the time K$\underline{P}$C13 of the second advance-P phase the advance-P activity has been completed and there is a return to phase $\phi$01 or $\phi$03 as shown by $rX=a0Z\underline{F}K\underline{P}C\mathbf{13}+\ \ldots$ (FIG. 30) ($\phi$05, 07$\rightarrow\phi$01, 03)

After the resetting of the X flip-flop, the flip-flop F is reset as described earlier. The formation of the delay number is then completed as is described later.

During the first occupancies of phases $\phi$01 and 03 flip-flop J may or may not have been set to indicate the necessity of complementing the P register. The temporary reoccupancy of phases $\phi$01 and $\phi$03 for the completion of the reformation of the delay number does not disturb the previous setting of the flip-flop J.

*Advance-Q phases.*—In the Divide routine it may become necessary to advance or right shift the digits of the Q register. The advancement of the Q register is accomplished in phases $\phi$64 and $\phi$60 in much the same manner as the advancement of the P register. However, in the advance-Q two separate phases are used for the two cycles of activity rather than one phase subdivided by the flip-flop F. Also the advancement of Q may be necessitated by an overflow into the sign character, $S_q$. When $S_q$ is overflowed it must be decreased by one to correct the overflow. At the same time, the place vacated by the most significant digit of the Q register is to be filled with a one digit rather than with a zero digit. Flip-flop I is used to signal the overflowed condition for the sign character by giving the flip-flop I the value $I=1$ at the time of entry to $\phi$64. At the time of entry to $\phi$64 it may also happen that $S_q$ is overdrawn as a consequence of having complemented a non-zero number held in the Q register. If $S_q$ is overdrawn the digit Nine is to be set into the place vacated by the most significant digit of the Q register. In that situation no change is made in the overdrawn sign character itself, $S_q$. Flip-flop F is used, together with flip-flop I, in distinguishing the various conditions of $S_q$ as described below.

Entry to the first advance-Q phase, $\phi$64, is from phases $\phi$24 or from $\phi$65. The entry occurs at the time $\underline{K}$PC0$t$1. In the first phase of advance-Q all of the digits of the Q register except the least significant and all of the digits of the less significant half of the P register are advanced by one position. This is described by $M'=M\mathbf{6}M+\ \ldots$ (FIG. 41); $M\mathbf{6}=\phi\mathbf{64}\ C\mathbf{0\text{–}11}+\ \ldots$ (FIG. 41) (first advance-Q phase)

The least significant digit of the Q register, which was held in the D flip-flops at the time of entry to phase $\phi$64, is lost in the first advance-Q phase.

At the time $\underline{K}$PC12 a part of the character which becomes the most significant digit of the Q register is recorded in M'. Ordinarily, a zero is recorded, but if $S_q$ is overdrawn a one-bit is provided in the $t$4 or most significant bit position. The overdrawn situation of $S_q$ is recognized at the time $\underline{K}$PC12 by the circumstance $\underline{\text{IF}}$, and the recording of the $t$4 bit is described by $M'=M\mathbf{4}\underline{I}\underline{F}t\mathbf{4}+\ \ldots$ (FIG. 41); $M\mathbf{4}=\phi\mathbf{64}\underline{P}C\mathbf{12}+\ \ldots$ (FIG. 41) (first advance-Q phase)

Prior to this time, flip-flop F has been reset. It is then set at the time $\underline{K}$PC12$t$4 if $S_q$ is a normal sign character. During $\underline{\text{KPC12}t\text{4}}$, the last bit of $S_q$ is being set into the D flip-flops. If $S_q$ is normal the flip-flop F is set early enough in the bit period to suppress the recording of the one-bit in the $t$4 position. Two requirements for setting the F flip-flop may be described. One is that $S_q$ is not overflowed, as is indicated by the signal $\underline{I}$. The second requirement is that the $S_q$ non-overflowed represents either a positive or a negative normal sign as is characterized by unequal values of the bits which are held in D1 and D3 as shown by a condition ($D1\neq D3$). Therefore, flip-flop F is set "On" at the time $\phi$64 $\underline{K}$PC12$t$4 on the condition $\underline{I}$ ($D1\neq D3$). To guard against notching in the F-setting signal resulting from slowness in the formation of the inequality ($D1\neq D3$), the setting of the flip-flop F is limited to the second quadrant of the bit period. The flip-flop F is therefore controlled in the following manner:

$rF=\phi\mathbf{64}\underline{KP}C\mathbf{0\text{–}11}+\ \ldots$ (FIG. 38) (resets F prior to C12)

$sF=\phi\mathbf{64}\underline{KP}C\mathbf{12}t\mathbf{4}\ (D1\neq D3)\ \underline{I}\tfrac{1}{4}2+\ \ldots$ (FIG. 38 (sets $F$ for normal $S_q$)

In the second half of the machine cycle the second advance-Q phase is entered as described by $rX=a\mathbf{6}\underline{YZ}K+\ \ldots$ (FIG. 30) ($\phi$64$\rightarrow\phi$60)

In $\phi$60 the digits of the Q register, including the partially formed most significant digit, appear in M in the character periods $\underline{K}$PC0–11. These digits are immediately rerecorded, which advances them by a second character period. The digits of the less significant half of the P register appear and are set into the D register at the times $\underline{\text{KP}}$C0–11. These digits are restored to their original positions by being held in the D-flip-flops for an additional character period before recording. These actions are described by the equations $M'=M\mathbf{6}M+\ \ldots$ (FIG. 41); $M\mathbf{6}=\phi\mathbf{60}\ \underline{KP}C\mathbf{0\text{–}11}+\ \ldots$ (FIG. 31) this expression is modified below)

$d'=d\mathbf{6}d+\ \ldots$ (FIG. 34); $d\mathbf{6}=\phi\mathbf{60}\underline{KP}C\mathbf{0\text{–}11}+\ \ldots$ (FIG. 35)

At the time $\underline{K}$PC11 the partially formed most significant digit of Q is completed by inserting a one-bit at the time $t$1 if $S_q$ is either overflowed or overdrawn. These two conditions of $S_q$ are indicated by $\underline{F}$. The addition of the one-bit changes the most significant digit from zero to one if $S_q$ is overflowed, and from eight to nine if $S_q$ is overdrawn. Thus the M' term includes the factor $M'=M\mathbf{7}t\mathbf{1}+\ \ldots$ (FIG. 41); $M\mathbf{7}=\phi\mathbf{60}\underline{FK}PC\mathbf{11}+\ \ldots$ (FIG. 41)

The advance-Q phases require two further steps. First: if $S_q$ had been overflowed, as indicated by $I=1$ in the early part of $\phi$60, the sign character must be reduced by one to restore it to the normal form. Second: the decimal position character $D_q$, must be reduced by one to indicate that the decimal point, like the digits, has been moved one place to the right. Flip-flop I is used in the reductions of the sign and decimal indication presented by M in the character periods $\underline{\text{KP}}$C12–14. The first reduction, that of $S_q$, is contingent on the condition $I$=1. The second reduction, that of $D_q$, is made unconditional by setting I "On" at the time $\underline{\text{KP}}$C13$t$1. The reductions are shown by $d'=d\mathbf{5}(M\neq\mathbf{5})+\ \ldots$ (FIG. 34)
$d\mathbf{5}=\phi\mathbf{60}\underline{KP}C\mathbf{12\text{–}14}+\ \ldots$ (FIG. 35)
$^{*}\underline{I}=\phi\mathbf{60}\underline{KP}C\mathbf{12\text{–}14}M+\ \ldots$ (FIG. 39)
$sI=\phi\mathbf{60}\underline{KP}C\mathbf{13}t\mathbf{1}+\ \ldots$ (FIG. 39)

Departure from phase $\phi$60 occurs immediately following the reduction of $D_q$, with an entry to phase $\phi$20, as shown by $rU=V\underline{W}b\mathbf{0}\underline{K}PC\mathbf{14}+\ \ldots$ (FIG. 27)($\phi$60$\rightarrow\phi$20)

*Add-to-P phases.*—In a number of phases, collectively called $\phi ap$, the number held in the register K is added to the content of the register P. The decimal digits of the K register appearing at the times $\underline{K}$PC0–11 are added to the content of the P register. The digit of the K register presented in the $\underline{K}$PC0 period is added to the digit of the P register presented in the KPC0 period. The addition continues until the most significant digit of the K register, appearing in the $\underline{K}$PC11 period, is added to the digit of the P register presented in the KPC11 period. If the P register is normally placed the most significant digit appears in the KPC11 period. If, however, the P register has been shifted left before the addition there are one or more further digits of the P register which appear in later character periods. If the addition of the two digits appearing in the two character periods, KC11, produces a carry, that carry is taken into account in handling the later digits of the P register. The carry may propogate as far as, but not beyond, the sign character, $S_p$. Carry propagation into $S_p$ converts an overdrawn sign, either positive or negative, into a normal sign, or a normal sign into an overflowed sign.

If the P register is shifted left by 12 places or less, $S_p$ appears in the $\underline{K}$ half-cycle and each digit of the K register is aligned with a digit of the P register. If, however, the P register is shifted left more than 12 places, $S_p$ appears in the K half-cycle, aligned with one of the digits of the K register. The addition process starts only with the least significant digit of the P register which appears after $S_p$. Flip-flops G, illustrated in FIG. 42, and F, illustrated in FIG. 38, are used to distinguish digits appearing before and after $S_p$. Flip-flop F is set "On" to block the addition process, but not a carry propagation, prior to the appearance of $S_p$. The Flip-flop F is turned "Off" to permit the addition. Therefore, the digits added to the P register are described, as they appear from memory, by $K\underline{P}C\mathbf{0}-\mathbf{11}M\underline{F}$. The addition is actually performed in the following character periods, PC0—11, and makes use of the digits of the K register at the time at which they emerge from the D flip-flops. The added digits are therefore described by $KPC\mathbf{0}-\mathbf{11}d\underline{F}$. The flip-flop F is turned "On" in KPC12, which further ensures that the sign character of the K register plays no part in the addition process. The carry propagation continues after the F flip-flop is set to One. The carry propagation may continue into the $\underline{K}$ half of the following cycle and in some cases even into the K half. In no case, however, does a carry propagate beyond the sign character $S_p$, wherever it appears.

The character periods in which digits of the P register, including $S_p$, may appear are called $PC_a$ where $PC_a$ is defined by $$PC_a \equiv P(C\mathbf{0}\text{–}\mathbf{11}+KC12) \text{ (FIG. 18)}$$

The primary addition process takes place in the character periods $PC_a$. In the immediately succeeding character periods, called $\underline{P}C_b$, a decimal correction process may be required. $\underline{P}C_b$ is defined by $$\underline{P}C_b \equiv \underline{P}(C\mathbf{1}\text{–}\mathbf{12}+KC\mathbf{13}) \text{ (FIG. 18)}$$

Flip-flop G is used to detect the appearance of $S_p$, which differs from the other characters presented at the times $PC_a$ by having a numerical value in excess of 9. $S_p$, therefore, has a one-bit at the time $t\mathbf{4}$ and also a one-bit either at the time $t\mathbf{2}$ or at $t\mathbf{3}$ or both. Accordingly, flip-flop G is reset at the time $t\mathbf{1}$ of a P-character period, set by a one-bit presented in either $t\mathbf{2}$ or $t\mathbf{3}$, and then reset at the time $t\mathbf{4}$ if the bit presented at that time is a zero. If the G flip-flop remains "On" into the succeeding character period this shows that a non-decimal character has been received. These activities are described by $$sG = MPC_aT\mathbf{7} + \ldots \text{ (FIG. 42) } (S_p \text{ detection})$$
$$rG = P(\underline{M}t\mathbf{4}c_+ + t\mathbf{1}_+) + \ldots \text{ or } PT\mathbf{6}\underline{T}\mathbf{7}(\underline{M}+\underline{T}\mathbf{8}) + \ldots \text{ (FIG. 42) } (S_p \text{ detection})$$

The subscripts + used in the $rG$ equation guard against a change of M early in the bit period. Since the setting of the G flip-flop is limited to the character periods $PC_a$ and the character periods $PC_a$ do not include the decimal position characters, the signal $\underline{P}G$ indicates that $S_p$ has been found. In some of the phases $\phi ap$ the signal $\underline{P}G$ is used to turn "Off" the F flip-flop. The F flip-flop is then set "On" at the time KPC12. The handling of the F flip-flop is described later in connection with the individual add-to-P phases.

In the character periods $PC_a$ digits of the P register are presented by M. A simple binary addition of the addend digit, $d\underline{F}K$, is performed at the times $PC_a$ with the help of a carry flip-flop, C. The flip-flop C is shown in FIG. 43. The binary addition is described by $$d' = d\mathbf{3}(M \neq C \neq d\underline{F}K) + \ldots \text{ (FIG. 34)}; \quad d\mathbf{3} = \phi apPC_a + \ldots \text{ (FIG. 35)}$$

$$*C = \phi apPC_aMd\underline{F}K + \ldots \text{ (FIG. 43) (modified below)}$$

$$*\underline{C} = \phi apPC_a\underline{M}(\underline{d}+F) + \ldots \text{ (FIG. 43) (modified below)}$$

When the binary addition leads to the production of a non-decimal sum character, for example, a sum digit exceeding 9 but not exceeding 15, two additional steps are required. First, it is necessary to have a carry into the next digit position and, second, it is necessary to have a decimal correction consisting of the addition of 6 to the sum. If the sum is greater than 15 the interdigit carry is already present and the interdigit carry indicates the need for decimal correction. When the addition produces a nondecimal sum, flip-flop C is set "On" at the end of the $PC_a$ character period.

The circumstance calling for this induced carry is that a decimal digit of the P register has, as a result of the process of addition, been brought into nondecimal form. After the end of a $PC_a$ character period that circumstance is recognizable by the signal $(D\mathbf{2}+D\mathbf{3})D\mathbf{4}\underline{G}$. The first two factors of this expression indicate that a nondecimal character has been set into the D register. The factor $\underline{G}$ shows that the expression is not the result of an addition to the sign character $S_p$. During the $t\mathbf{4}$ bit period of the $PC_a$ character period the fourth bit of the new character is being presented as the signal $d'$ and has the value $(M \neq C \neq d\underline{F}K)$. The appearance of $S_p$ may be recognized at that time by the signal MG, its absence by $(\underline{M}+\underline{G})$. Accordingly, the carry flip-flop, C, must be set on following the bit period $PC_at\mathbf{4}$ under the condition $(D\mathbf{2}+D\mathbf{3})(M \neq C \neq d\underline{F}K)(\underline{M}+\underline{G})$. This is accomplished by adding to the above expression for *C a term showing the circumstances in which flip-flop C, though off at the time $PC_at\mathbf{4}$, is to be set "On," and by qualifying the above term for *C with a factor which suppresses its resetting in the circumstances in which flip-flop C is on at the time $PC_at\mathbf{4}$ and an induced carry is desired. The modified expressions are $$*C = \phi apPC_a[Md\underline{F}K + t\mathbf{4}(D\mathbf{2}+D\mathbf{3})(M\underline{G}+d\underline{F}K)]$$

$$*C = \phi apPC_a\underline{M}(\underline{d}+F)(t\mathbf{4}+\underline{D}\mathbf{2}\underline{D}\mathbf{3})$$

In the following bit period, $\underline{P}C_bt\mathbf{1}\phi ap$, a decimal correction for addition is performed on the content of the D register if $C=1$. The correction has the effect of adding 6 to the number held. It is performed by complementing flip-flop D2, by complementing flip-flop D3 if $D2=0$, and by resetting flip-flop D4 if it is "On," and setting flip-flop D4 if it is "Off" and $D2=1$. These changes are shown by $$cD\mathbf{2} = \phi apC\underline{P}C_bt\mathbf{1} + \ldots \text{ (FIG. 33)}$$
$$c\underline{D}\mathbf{3} = \phi apC\underline{P}_bt\mathbf{1}\underline{D}\mathbf{2} + \ldots \text{ (FIG. 33)}$$
$$*D\mathbf{4} = \phi apC\underline{P}C_bt\mathbf{1}\underline{D}\mathbf{4} + \ldots \text{ (FIG. 33)}$$
$$*\underline{D}\mathbf{4} = \phi apC\underline{P}C_bt\mathbf{1}D\mathbf{2}\underline{D}\mathbf{4} + \ldots \text{ (FIG. 33)}$$

*Subtract K from P phase*.—In phase $\phi\mathbf{25}$ shown in FIG. 7, the number held in the K register is subtracted from the digits of the P register appearing at times KPC0–12. If a borrow is developed it is not propagated past KPC12 since phase $\phi\mathbf{25}$ is terminated at the time K$\underline{P}$C13 if $C=\mathbf{1}$. The subtraction in phase $\phi\mathbf{25}$ is performed in the same way as additions except that $C=\mathbf{1}$ now represents a borrow. The initial binary subtraction is described by $$*C = d\underline{FM}\ \mathbf{25}KPC_a + \ldots \text{ (FIG. 43)}$$
$$*\underline{C} = (\underline{d}+F)M\phi\mathbf{25}KPC_a + \ldots \text{ (FIG. 43)}$$
$$d' = d\mathbf{3}(M \neq C \neq d\underline{F}K) + \ldots \text{ (FIG. 34)}$$
$$d\mathbf{3} = \phi\mathbf{25}KPC_a + \ldots \text{ (FIG. 35)}$$

The qualifying factor K in the C-equations is needed since an addition is performed in the $\underline{K}$ half of phase $\phi 25$. All of the digits of the K register are used in the subtraction, as allowed by $$rF=\phi 25+\ldots \text{ (FIG. 38)}$$

An interdigit borrow also requires the performance of a decimal correction. The decimal correction consists of the subtraction of 6. The borrow is always present when the correction is needed and no induced borrow corresponding to the induced carry of $\phi ap$ is required. The decimal correction is performed at the time $K\underline{P}C_b t1$ under the condition $C=1$ and consists of the subtraction of 6 from the uncorrected number then held in the flip-flops D1, D2, D3, D4 which constitute the D register. The uncorrected number may have any value from 6 to 15, inclusive. Values below 6 cannot occur with $C=1$. The correction is performed by complementing flip-flop D2, and also flip-flop D3 if $D2=1$, and resetting flip-flop D4 under the condition $(\underline{D}2+\underline{D}3)$. These changes are shown by $$cD2=(\phi 25K\underline{P}C_b t1C)+\ldots \text{ (FIG. 33)}$$
$$cD3=(\phi 25K\underline{P}C_b t1C)D2+\ldots \text{ (FIG. 33)}$$
$$*\underline{D}4=(\phi 25K\underline{P}C_b 1C)(\underline{D}2+\underline{D}3)+\ldots \text{ (FIG. 33)}$$

Figure 44:
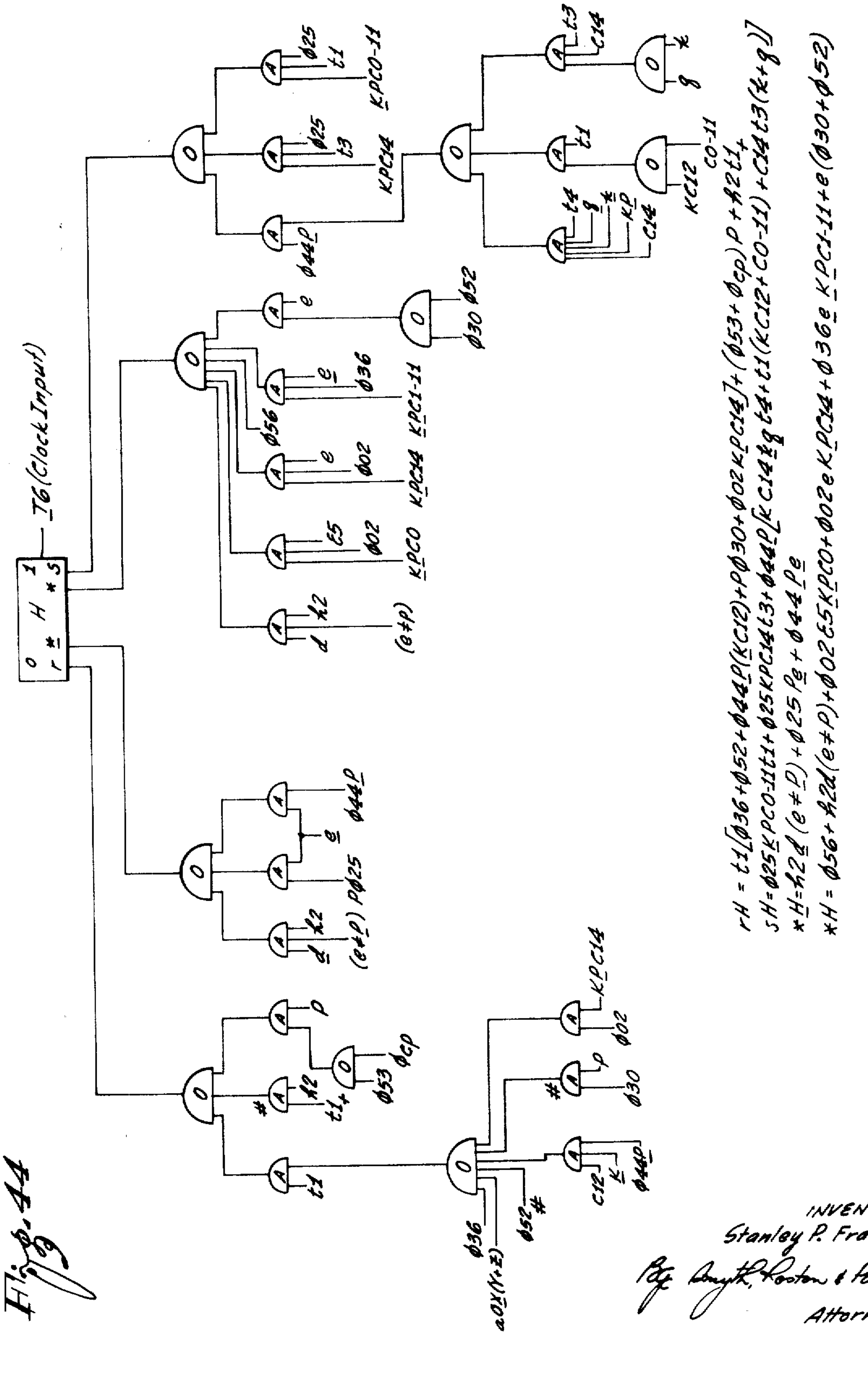
FIG. 44 is a block diagram of the H flip-flop and its associated control circuitry.

*Augment Q phase.*—If the P register contains a negative number as the result of a subtraction, phase $\phi 25$ is left at the time $K\underline{P}C13$, otherwise phase $\phi 25$ continues for another cycle. In the $\underline{K}$ half of the further cycle of phase $\phi 25$ one of the digits of the Q register is augmented by one, with a decimal correction and a carry propagation similar to that described for the phases $\phi ap$. The digit position in which the Q register is augmented is determined by the number held in the E flip-flops shortly before the beginning of the new cycle. The initial content of the E flip-flops is increased by 4 during KPC14, and by 1 in each of the 12 character periods $\underline{K}$PC0–11. Flip-flop H shown in FIG. 44 is used in the incrementation as described by $$sH=\phi 27KPC14t3+\phi 25\underline{K}PC0\text{–}11t1+\ldots \text{ (FIG. 44)}$$
(increments E before KPC0–11)
$$*\underline{H}=\phi 25e\underline{P}+\ldots \text{ (FIG. 44) (increments E before KPC0–11)}$$
$$e'=e1(e\neq H)+\ldots \text{ (FIG. 37)};\quad e1=\phi 25P+\ldots \text{ (FIG. 37)}$$
(increments E before KPC0–11)

After the E flip-flops have increased from 15 to 0, flip-flop H remains "On" during the $\underline{P}$ character period. The condition $H=1$ is used to add one to the digit of the Q register appearing during the $\underline{P}$ character period. The addition to the Q register and a correction when a non-decimal character is produced, is described by $$*C=\phi 25\underline{K}P(C14+C0\text{–}11)Het4+\phi 25\underline{K}\underline{P}C0\text{–}11t4D2M+\ldots \text{ (FIG. 43)}$$
$$*\underline{C}=\phi 25\underline{K}P\underline{M}+\ldots \text{ (FIG. 43)}$$
$$d'=d1(\underline{M}\neq \underline{C})+\ldots \text{ (FIG. 34)};\quad d1=\phi 25\underline{K}\underline{P}C0\text{–}12+\ldots \text{ (FIG. 35)}$$

In the presence of $C=1$ at the times $\phi 25\underline{K}$PCO–11$t1$ the non-decimal digit, which will in this case have the value ten, is to be increased by six, thus bringing it to the value zero, as described by $$cD2=(\phi 25\underline{K}PC0\text{–}11t1C)+\ldots \text{ (FIG. 33)}$$
(decimal correction of Q)
$$*\underline{D}4=(\phi 25\underline{K}PC0\text{–}11t1C)D4+\ldots \text{ (FIG. 33)}$$
(decimal correction of Q)

Two additional correction expressions are introduced for the sake of uniformity of the demical correction equations, though they are not needed in this case. They are $$cD3=(\phi 25\underline{K}PC0\text{–}11t1C)\underline{D}2+\ldots \text{ (FIG. 33)}$$
(introduced for convenience)
$$*D4=(\phi 25\underline{K}PC0\text{–}11t1C)D2\underline{D}4+\ldots \text{ (FIG. 33)}$$
(introduced for convenience)

When a carry results in an overthrow of $S_q$ the cyclic part of the division process is interrupted and the overflow is corrected. This prevents a carry from being propagated beyond $S_q$.

*Complement-Q phases.*—In two phases, collectively denoted $\phi cq$, the number held in the Q register is complemented by subtracting it from zero. The sign digit $S_q$ is subtracted from 9, and may be modified by a borrow from the earlier stages. There will be a borrow from $S_q$ unless all of the digits, $q0$ to $q11$, are zero. The subtraction involving $S_q$ is a simple binary subtraction without decimal correction and with the disregard of any borrow propagated beyond $S_q$. The negative and positive normal signs are represented by the hexadecimal digits, 11 and 14 respectively. The sum of the negative and positive normal signs is, therefore, equal to 25, which is congruent to 9 in a four bit (modulo 16) system. Therefore, subtracting either the negative or positive normal sign from 9, without a borrow from earlier stages, yields the other. If there is a borrow from earlier stages, as is the case if the digits are not all zero, then the subtraction of a normal sign yields the overdrawn form of the other sign, and vice versa. Therefore, if the number held in the Q register is not equal to zero, the complementation of the Q register either produces or corrects an overdraft. Overflowed forms of the sign do not occur in the complement Q phases.

The minuend in the subtraction performed in the complement Q phases is represented as $\underline{T}7C12$. This represents a zero in digits C0–11 and a 9 in C12. The subtrahend is the number held in the Q register as presented by M during $\underline{K}\underline{P}$C0–12. After any required decimal corrections are performed for digits held in positions C0–11, the result is recorded in M′ during the time KPC0–12. The complement Q phases are described by the following equations:

$$*C=\phi cq\underline{K}PM(C0\text{–}11+C12T7)+\ldots \text{ (FIG 43)}$$
(Primary subtraction in $\phi cq$)
$$*\underline{C}=\phi cq\underline{K}\underline{P}C12(\underline{M}t1+t4)+\ldots \text{ (FIG. 43)}$$
(Primary subtraction in $\phi cq$)
$$d'=d2(M\neq C\neq C12\underline{T}7)+\ldots \text{ (FIG. 34)}$$
$$d2=\phi cq\underline{K}\underline{P}+\ldots \text{ (FIG. 35)}$$
(Primary subtraction in $\phi cq$)
$$cD2=(\phi cq\underline{K}PC0\text{–}11t1C)+\ldots \text{ (FIG. 33)}$$
(dec. corr. in $\phi cq$)
$$cD2=(\phi cq\underline{K}PC0\text{–}11t1C)D2+\ldots \text{ (FIG. 33)}$$
(dec. corr. in $\phi cq$)
$$*\underline{D}4=(\phi cq\underline{K}PC0\text{–}11t1C)(\underline{D}2+\underline{D}3)+\ldots \text{ (FIG. 33)}$$
(dec. corr. in $\phi cq$)
$$rJ=\phi 22C12+\ldots \text{ (FIG. 45)}$$

The resetting of J serves to permit departure from phase $\phi 22$. The form of the $*\underline{C}$ expression shown above ensures that the C flip-flop is set "Off" at the end of $\underline{K}\underline{P}$C12.

*Complement-P phases.*—In a plurality of phases indicated by $\phi cp$, the content of the P register is complemented in approximately the same manner as described for the complementation of the Q register. All 24 of the decimal digits of the P register are subtracted from zero, and the sign, $S_p$, is subtracted from 9. A borrow initiated by the subtraction from zero of the first non-zero decimal digit is propagated through the remaining digit subtractions and into the sign character. The complement-P procedure is somewhat different from that of the complement-Q phases since the sign $S_p$ may appear in any one of the 25 character periods, $PC0\text{–}12+KPC13$. Therefore, the minuend digit 9 cannot be supplied at a definite time but rather is introduced after the recognition of the appearance of $S_p$. The $\phi cp$ phase is entered after the appearance of $S_p$, thereby permitting the complementation of the P register to commence with the least significant digit. All 24 digits and $S_p$ are first subtracted from zero, with the subtraction of 6 when needed for decimal correction of the digits but not of $S_p$. After $S_p$ has been subtracted from zero, a nine is added to $S_p$ in a similar manner to the performance of a decimal correction to a digit. The nine is added by subtracting seven (modulo 16)

rather than the usual six to form the new $S_p$. The time of this special correction is recognized by the signal $\underline{P}G$. The entire complementation process of the P register is made contingent on the signal $J=1$ by the factor J in the definition of $\phi cp$. After the character period marked $\phi p\,\underline{P}G$ flip-flop J is reset to prevent further complementing activity.

The initial subtraction from zero is described by $*C=\phi cpMPC_a+\ldots$ (FIG. 43) (Primary subtraction in $\phi cp$)

$d'=dl\ (M\neq C)+\ldots$ (FIG. 34); $dl=\phi cpPC_a+\ldots$ (FIG. 35) (Primary subtraction in $\phi cp$)

The decimal correction for the decimal digits of the P register consists of the subtraction of 6 from the number held in the D register at the times $\underline{P}Cbt1\phi cp$ when $C=1$. The subtraction of 6 is also a part of the correction applied to the sign, $S_p$. The subtraction of 6 is described by $cD2=(\phi cp\underline{P}C_bt1C)+\ldots$ (FIG. 33) (subtraction of six in $\phi cp$)

$cD3=(\phi cp\underline{P}C_bt1C)+\ldots$ (FIG. 33) (subtraction of six in $\phi cp$)

$*\underline{D}4=(\phi cp\underline{P}C_bt1C)(\underline{D}2+\underline{D}3)+\ldots$ (FIG. 33) (Subtraction of six in $\phi cp$)

The sign character, $S_p$, should not be subtracted from zero but from nine. Since it has in fact been subtracted from zero and, as described above, corrected by the subtraction of six—which is equivalent (modulo 16) to the addition of ten—it requires a further correcting diminution by one. This is performed at the time at which the receipt of $S_p$ is first recognized, marked $\phi cpPC_at4MG$ That subtraction of one, except for its effect on the bit being placed in flip-flop D4 is described by $cD1=(\phi cpPC_at4MG)+\ldots$ (FIG. 33) [subtraction of one (mod. 8)]

$cD2=(\phi cpPC_at4MG)\underline{D}1+\ldots$ (FIG. 33) [subtraction of one (mod. 8)]

$cD3=(\phi cpPC_at4MG)\underline{D}1\underline{D}2+\ldots$ (FIG. 33) [subtraction of one (mod. 8)]

The eights-bit of the new sign character necessarily has the value One. The equations given above for the subtraction of six and for the subtraction of one make no provision for the turning on of flip-flop D4. To repair that defect the recording of a one-bit in the most significant bit position of $S_p$ is assured by the following term in $d'$.

$d'=\phi cp\underline{P}C_bt4G+\ldots$ (FIG. 34) (eight-bit for new $S_p$)

Figure 45:
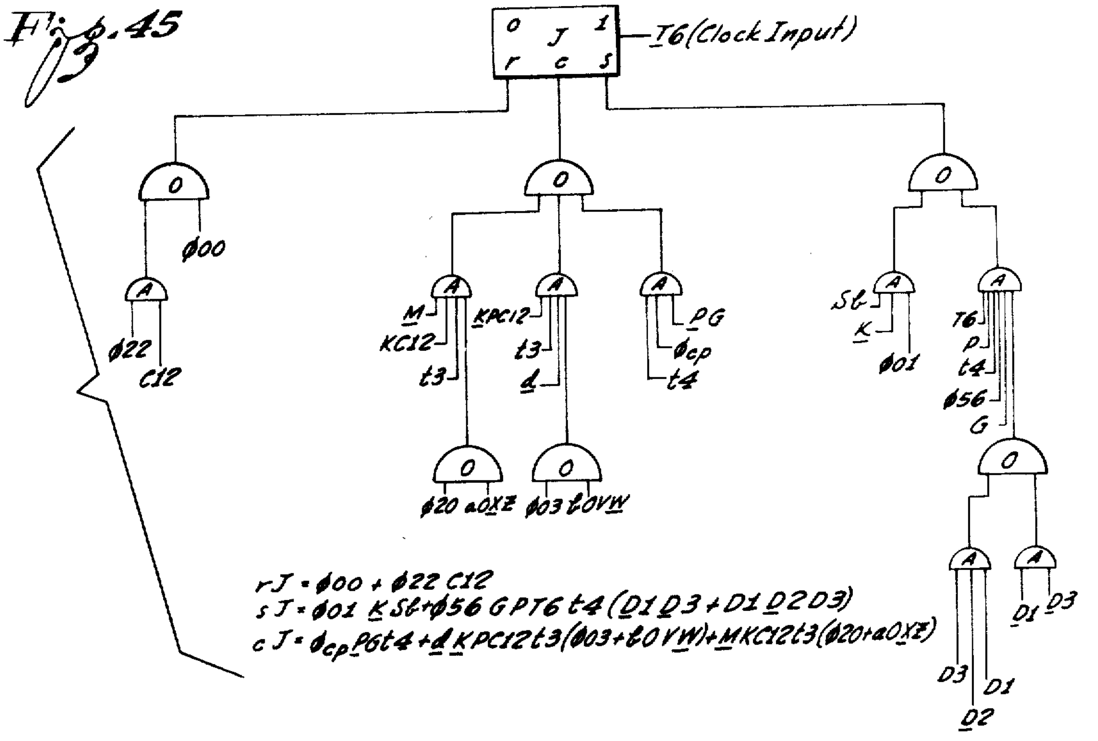
FIG. 45 is a block diagram of the J flip-flop and its associated control circuitry.

After the complementation is completed, flip-flops C and J are reset as shown by $cJ=\phi cp\underline{P}Gt4+\ldots$ (FIG. 45)

$*\underline{C}=\phi cp\underline{P}Gt4+\ldots$ (FIG. 43)

*Add-subtract routine.*—The structure of the Add-Subtract routine is shown in FIG. 9. The Add-Subtract routine is entered at $\phi 01$ from the rest state, $\phi 00$, by closure of either the A or the S*b* key contact. Entry to the routine is a time $\underline{K}\underline{P}C11t2$ as described by $sZ=a0\underline{X}Y\underline{K}\underline{P}C11t2(A+Sb)+\ldots$ (FIG. 32) ($\phi 00\rightarrow\phi 01$)

The Add and Subtract processes are distinguished by setting flip-flop J to one for subtract, zero for add, during $\phi 01\underline{K}$.

$sJ=\phi 01\underline{K}Sb+\ldots$ (FIG. 45) (subt. setting)

$rJ=\phi 00+\ldots$ (FIG. 45) (preliminary resetting)

The flip-flop J is provided with a complement input as well as set and reset inputs. A signal delivered to *cJ* reverses the state of the J flip-flop. The reversal is performed on finding a negative sign for either the K or P registers. $S_k$ and $S_p$ are normal signs, and negative values are, therefore, indicated by a zero-bit presented by memory at time *t*3 in $K\underline{P}C12$ and KPC12, respectively. The same reversal of the J flip-flop for negative numbers held in the K and P registers is performed for $\phi 03$ of the Multiply routine and for $\phi 20$ of the Divide routine, as described by $cJ=\underline{M}KC12t3(a0\underline{X}Z+\phi 20)+\ldots$ (FIG. 45) (reverse J on neg. (K) and (P))

The reversals of the J flip-flop leave $J=0$ after KC12 if the K and P registers are of the same sign in an addition or of opposite signs in a subtraction. In either an addition or subtraction the operation is performed by adding some or all of the digits *k*0 to *k*11 of the K register to the P register without changing the sign character of the P register except as a result of a carry. In the opposite circumstances when a flip-flop J is left at One at the time KC13, a complementation of the P register is required to permit the addition or subtraction to be accomplished by adding the digits of K to those of P. The complementation of the P register is performed in a later phase, $\phi 14$, as described below. A very similar manipulation of the J flip-flop is carried out in the early phases of the Multiply and Divide routines.

Another activity in $\phi 01$ is the formation in the E flip-flops of a delay number $D_{\#}=D_p-D_k$. At the time $\underline{K}PC13$–14 zero is set into the flip-flops, E1, E2, E3, E4, E5 and E6. At the end of the machine cycle in phase $\phi 01$ the decimal character, $D_k$, is subtracted from the content of the E flip-flops and the decimal character $D_p$ is added to the result. This completes the formation of the delay number, $D_{\#}$. The first four bits of the decimal characters are presented by *d* in the character periods KPC13 and $K\underline{P}C14$ and are subtracted from, or added to, the short delay number held in flip-fiops E1, E2, E3 and E4. A borrow or carry out of the short delay number is carried over into the two most significant bits of the delay number held in flip-flops E5 and E6. The formation of the short delay number is described by:

$e'=h2(e\neq H\neq d)+\ldots$ (FIG. 37)

$h2=h1(\underline{X}+\underline{Z})[KPC13+KPC14(V+Z)]$ (FIG. 24)

$*H=dh2(e\neq P)+\ldots$ (FIG. 44)

$*\underline{H}=\underline{d}h2(e\neq P)+\ldots$ (FIG. 44)

$rH=t1_+h2+\ldots$ (FIG. 44)

The signal *h*2 (FIG. 24) is true during the character periods KPC13 and KPC14 in phase $\phi 01$.

The deferral of the resetting of the H flip-flop to the time $t1_+$ permits the use of the carry or borrow bit held in the H flip-flop in the first half of the *t*1 bit period following the addition or subtraction. The bit held in the H flip-flop in the first half of the *t*1 bit period introduces the carry or borrow into E5 and E6 as described by $cE5=h5+\ldots$ (FIG. 36) where $h5\equiv Ht1\_h1KC14(\underline{P}+V+Z)+\ldots$ (FIG. 24)

$cE6=h5(P\neq E5)+\ldots$ (FIG. 36)

The reversals of the states of the E5 and E6 flip-flops take place at the middle of the *t*1 bit period, that is, at the end of $t1\_$. A further reversal of the E5 and E6 flip-flops may be performed at the end of the *t*1 bit period as required by the subtraction or addition of the two most significant bits of the decimal characters. The complementing inputs of the flip-flops E5 and E6, *c*E5 and *c*E6 respectively, take effect at the end of any half bit period for which these signals are true.

The two most significant bits of the decimal character $D_k$ are presented by *d* in *t*1 and *t*2 of KPC14. The subtraction of the bits from the flip-flops E5 and E6 is described by $cE5=h4t1_++\ldots$ (FIG. 36)

$h4=h1dKPC14+\ldots$ (FIG. 24)

$cE6=h4[(P\neq E5)t1_++t2_+]+\ldots$ (FIG. 36)

$h4=h1dKPC14+\ldots$ (FIG. 24)

Similarly, the two most significant bits of the decimal character $D_p$ are added in $\overline{K}PC0$ as described by $$cE5=h4t1_{+}+\ \ldots\ \text{(FIG. 36)}$$
$$h4=h1d\overline{KP}C0+\ \ldots\ \text{(FIG. 24)}$$
$$cE6=h4[(P\neq E5)t1_{+}+t2_{+}]+\ \ldots\ \text{(FIG. 36)}$$
$$h4=h1d\overline{KP}C0+\ \ldots\ \text{(FIG. 24)}$$

If the bit left in E6 after the time $\overline{K}PC0$ is a one, the delay number is regarded as negative. If the bit is a zero, the delay number is positive. For a negative delay number, but not more negative than −24, a left shift of the P register is required and phase $\phi$11 is entered at $\overline{K}PC0$ to perform the left shift, as has been described earlier.

If the delay number is more negative than −24, no addition is possible and the entry to $\phi$11 is blocked as was described earlier, and a return to the rest state occurs after the key release as shown by $$rZ=a0\overline{XY}R+\ \ldots\ \text{(FIG. 32)}\ (\phi01\rightarrow\phi00)$$

After the completion of the necessary number of cycles in $\phi$11, the flip-flop X is turned on as shown by the term $\overline{U}IE5$ in the *s*X equation as discussed earlier with the delay-P phases. Departure from the second of the delay-P phases follows at the time $\overline{K}PC0$ or in some later P-character period as shown by $$rZ=a1XP\overline{F}+\ \ldots\ \text{(FIG. 32)}\ (\phi15{,}17\rightarrow\phi14{,}16)$$

The above equation also describes the corresponding exit from the delay-P phase in the early part of the Multiply routine. The equation also serves to describe the exit from phases $\phi$15 and $\phi$17 after a skip-out from the advance-P phase as described earlier. The F flip-flop is reset in $\phi$15 and $\phi$17 after the appearance of $S_p$ as shown by $$rF=a1XZ\overline{P}G+\ \ldots\ \text{(FIG. 38)}$$

If the most significant bit of the delay number, completed in $\overline{K}PC0$ in phase $\phi$01, is zero then the advance-P phase, $\phi$05, is entered as described earlier. If not only the most significant bit but all bits of the delay number are zero the skip-out occurs and $\phi$14 is entered at the time KPC0 as indicated above. If the delay number is positive but not zero the advance-P operation is carried out, as described earlier, with a return to $\phi$01 to repeat the formation of the delay number. In all cases, following occupancy of the advance-P phase, $\phi$05, phase $\phi$14 is entered in a character period marked KPC0. At this time, $J=1$ if a complementation of the P register is required, and $J=0$ if the complementation is not required. Similarly, in the Multiply routine, $\phi$16 is entered to produce a complementation if it is needed.

Departure from $\phi$14 occurs at the time $\overline{K}PC13$ as shown by $$sU=\overline{Y}Wb4\overline{K}PC13\overline{J}+\ \ldots\ \text{(FIG. 27)}\ (\phi14\rightarrow\phi54)$$

The factor $\overline{J}$ shown above makes the departure contingent on the completion of the complementation, if one was needed.

In phases $\phi$14 and $\phi$54 flip-flop F is used to mark the period in which the adding process is carried out in the add-to-P phase, $\phi$54. Following the departure from the $\phi$54 phase, $\phi$56 is occupied until the appearance of $S_p$. Phase $\phi$56 is also one of the add-to-P phases, and permits the progation of a carry which started in $\phi$54. However, flip-flop F is held "On" to prevent further adding.

$$\phi ap=\phi56+\ \ldots\ \text{(FIG. 7)}$$

In both $\phi$14 and $\phi$54, flip-flop F is set "On" at the time KPC12 and is reset after the appearance of $S_p$, as decribed by $$sF=\overline{Y}Wb4KPC12+\ \ldots\ \text{(FIG. 38)}$$
$$rF=\overline{Y}Wb4\overline{P}G+\ \ldots\ \text{(FIG. 38)}$$

Entry to $\phi$56 of the Restore-P routine takes place at the time $\overline{K}PC12$ as shown by $$sY=a5X\overline{ZK}PC12+\ \ldots\ \text{(FIG. 31)}\ (\phi54\rightarrow\phi56)$$

and flip-flop F is then held on as shown by $$sF=\phi56+\ \ldots\ \text{(FIG. 38)}$$

Figure 2:
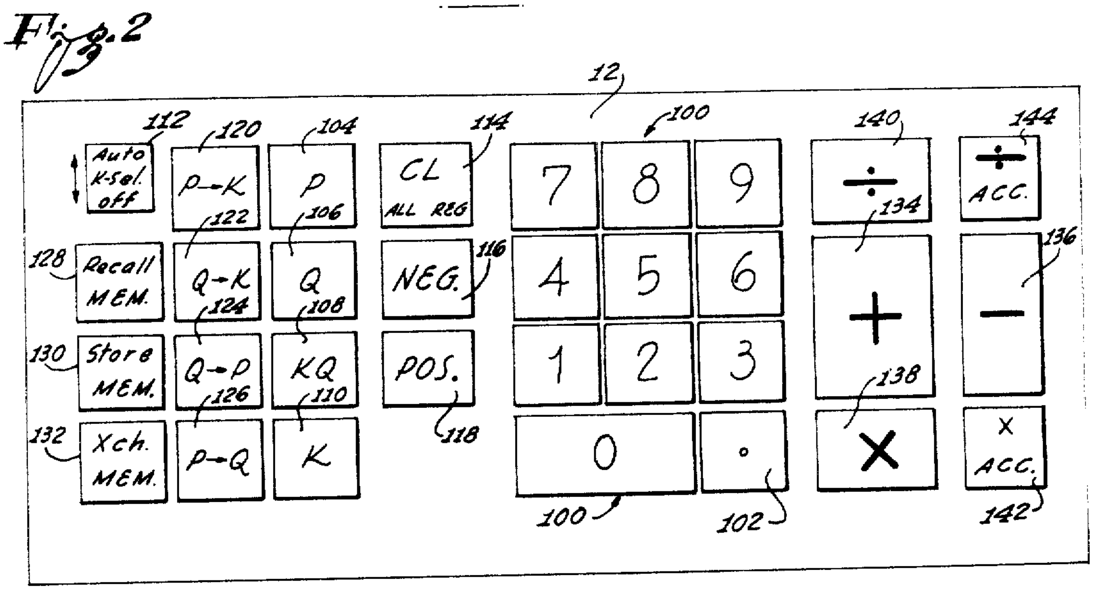
FIG. 2 is an expanded view of the keyboard of the desk calculator.

*Multiply routine.*—The Multiply routine as shown in FIG. 10 is entered by closure of either of the two keys 142 and 138 shown in FIG. 2 to produce signals called Accumulative Multiply ($M_a$) and Clear and Multiply ($M_c$) as illustrated in FIG. 4. In each case phase $\phi$02 is entered as the first phase of the routine, but entry is at different times for the two signals.

The Clear and Multiply operation is initiated by the signal $M_c$ which serves to permit entry to phase $\phi$02 at the time $\overline{K}PC11t4$. The occupancy of phase $\phi$02 continues for almost a full machine cycle, with a departure into phase $\phi$03 at the time $\overline{K}PC11t2$. The Accumulative Multiply operation is initiated by the signal $M_a$ with an entry to phase $\phi$02 at the time $\overline{K}PC11t1$. The two modes of entry are shown by $$sY=a0\overline{XZKP}C11(M_ct4+M_at1)+\ \ldots\ \text{(FIG. 31)}\ (\phi00\rightarrow\phi02)$$

In either case departure from phase $\phi$02 occurs at the time $\overline{K}PC11t2$ and, therefore, the time of occupancy of $\phi$02 after the signal $M_a$ is very short. The departure from phase $\phi$02 is described by $$sZ=a0\overline{X}Y\overline{K}PC11t2+\ \ldots\ \text{(FIG 32)}\ (\phi02\rightarrow\phi03)$$

The clearing of the P register is accomplished in phase $\phi$02, in part by setting the decimal digits of the P register to zero. This is shown by $$d'=0\ \text{in}\ PCO\text{–}11\phi02\ \text{(FIG. 34)}$$

The clearance of the P register which is required by the Clear and Multiply order also includes a setting of the decimal character $D_p$ to a value which yields a delay number of zero in the subsequent phase $\phi$03. The decimal character $P_p$ is formed by a procedure similar to the formation of a delay number in phase $\phi$03. At the time $\overline{K}PC13$–14 the complement of the decimal character $\overline{D}_q$ is set into the E flip-flops, in $\phi$02 as well as in $\phi$03, as described previously. At the end of the machine cycle, the decimal character $D_k$ is subtracted from the value held in the E flip-flops. At the time $\overline{K}PC14$ and $\overline{K}PC0$ the negative of the final quantity now held in the $\overline{E}$ flip-flops is recorded as the new value of $D_p$. The above activity is shown by $$M'=M10\ (e\neq H)+\ \ldots\ \text{(FIG. 41)}$$
$$M10=\phi02\ \overline{K}PC14+\ \ldots\ \text{(FIG. 41)}$$
$$*H=e\phi02\overline{K}PC14+E5\phi02\overline{K}PC0+\ \ldots\ \text{(FIG. 44)}$$
$$rH=\phi02\ \overline{K}PC14\ t1+\ \ldots\ \text{(FIG. 44)}$$
$$M'=(E5\neq H)\ \text{in}\ \phi02\ \overline{K}PC0\ t1\ \text{(FIG. 41)}$$
$$M'=(E6H)\ \text{in}\ \phi02\ \overline{K}PC0\ t1\ \text{(FIG. 41)}$$

If phase $\phi$02 is entered at the time $\overline{K}P11t4$ by the application of the signal $M_c$, the phase is occupied for a full memory cycle except for a part of the character period $\overline{K}PC11$. Since the process of seting zero in place of the decimal digits of the P register is carried out in P-character periods the omission of the above mentioned part of a character period does not interfere with the clearing process.

In phase $\phi$03, flip-flop J is set "On" to indicate the necessity for a complementation of the P register in a similar manner to the complementation performed in the Add-Subtract routine. However, in the Multiply routine there is no presetting "On" of the J flip-flop corresponding to that done in the subtract operation. Flip-flop J is always reset in the rest phase, as shown by $$rj=\phi00+\ \ldots\ \text{(FIG. 45)}$$

Flip-flop J is therefore "Off" at the time of entry to phase φ03. In phase φ03 flip-flop J is complemented on the appearance of a negative sign in the K, Q or P registers. The complementation for a negative sign in the K or P registers has been described previously. The complementation for a negative sign in the Q register is shared with phase φ20 of the Divide routine, and is shown by $cJ=(\phi03+\phi20)dKPC12t3+\ldots$ (FIG. 45)

The formation of the delay number, which for the Multiple and Divide routines is defined by $$D_{\#}=-D_q-1-D_k+D_p$$

in the E flip-flops has been described previously. Departure from phase φ03 occurs immediately after the completion of the delay number at the time $\underline{K}$PC0. In a similar manner to the Add-Subtract routine, an advance-P phase is entered if the delay number is positive, a delay-P phase is entered if the delay number is negative but not more negative than −23.

The activities in phases φ13 and φ07 exactly parallel those of the corresponding phases in φ11 and φ05 Add-Subtract routine and reference is made to the description of these phases. After the advance-P and delay-P phases, φ16 is entered where a complementation of the P register is performed if $J=1$. After the complementation is completed, departure from φ16 into φ12 takes place as shown by $rX=a1Y\underline{Z}\underline{K}P\underline{C}13\underline{J}+\ldots$ (FIG. 30) (φ16→φ12)

There is an immediate exit from phase φ12 to phase φ32 as shown by $s\underline{Y}=\underline{U}Wb2+\ldots$ (FIG. 28) (φ12→φ32)

Phase φ32 is one of the phases included in the cyclic part of the Multiply routine. In the character period following the time of entry from φ12, the complement of the decimal character $D_q$ is set into the E flip-flops from the D flip-flops as described earlier with reference to the advance-P activity.

In the character period KPC12, phase φ33 is entered and a single stage of delay of the P register is produced. The entry to phase φ33 is described by $sZ=a3\underline{X}YKPC12+\ldots$ (FIG. 32) (φ32→φ33)

Occupancy of the first of the delay phases, φ33, lasts only for one cycle with a subsequent entry to φ37. The entry to phase φ37 occurs by turning on the X flip-flop. The factor V in φ33 is used to turn on the X flip-flop as described by $sX=dpFK\underline{P}C13t1_{+}(V+UIE5+\ldots)+\ldots$ (FIG. 30)(φ33→φ37)

The entry to φ37 occurs at the time $K\underline{P}C13t1_{+}$ and in that character period the partially formed delay number, now increased to $-D_q$, is recaptured in the E flip-flops. The entry to phase φ36 occurs at the beginning of the next character period, KPC13, as shown by $rZ=a3XYP+\ldots$ (FIG. 32)(φ37→φ36)

In the four following character periods, KPC13 to K$\underline{P}$C0, $D_k$ is subtracted from the contents of the E flip-flops and $D_p$ added to the contents of the E flip-flops in the same manner as in phases φ01 and φ03. This reconstituted delay number is larger, because of the increase in $D_p$, in each successive traversal of the phase loop, φ32 to φ33 to φ37 to φ36 to φ34 to φ30. In the first traversal of the loop, the delay number has the value 2 since both $-D_q-1$ and $D_p$ have been augmented by one after the delay number was brought to zero in phase φ07 or in phases φ13 and φ17. In later traversals of the loop, the delay number has values equal to 3, 4 . . . , and so on until it equals 14 in the thirteenth occupancy of φ36. In the $\underline{P}$ character periods of φ36 the short delay number, held in the E flip-flops, is incremented by the use of the flip-flop H until the value 13 is reached. At that time φ34 is entered. The above operation is described by $e'=e2(e\neq H)+\ldots$ (FIG. 37); $e2=\phi36\overline{K}\underline{P}C1\text{–}11+\ldots$ (FIG. 37) ($E+1$ to $E$ in φ36$\underline{PC}$1–11)

$rH=\phi36\ t1+\ldots$ (FIG. 44) ($E+1$ to E in φ36$\underline{PC}$1–11)

$*H=\phi36KPC1-11e+\ldots$ (FIG. 44) ($E+1$ to E in φ36$\underline{PC}$1–11)

$rY=a3X\underline{Z}\underline{K}Pt1_{+}E1\underline{E}2E3E4\underline{E}5+\ldots$ (FIG. 31) (φ36→φ34; to continue)

On the first traversal of the loop, the entry to φ34 occurs at the time $\underline{K}$PC11. On the second traversal the entry occurs at $\underline{K}$PC10 and so on to the twelfth traversal when φ34 is entered at the time $\underline{K}$PC0. In the thirteenth traversal of the loop there is no entry to φ34 prior to the time $\underline{K}$PC12.

In the delay-P phase, φ33, the sign of the P register $S_p$ appears in M in any one of the 25 character periods $PC_a$. The sign $S_p$ is then delayed by being held in the E flip-flops and is recorded in M' in the second of the subsequent character periods of those marked $\underline{P}$C1–12. If $S_p$ appears at the time KPC10, it is recorded, at the time K$\underline{P}$C12, in the time-slot normally associated with the most significant digit of the P register. At this time the multiplication process is terminated since no further addition of digits held in the K and P registers can be performed. The appearance of $S_p$ at the time KPC10 is recognized by the signal $\underline{P}$G at the time K$\underline{P}$C11, which is used to reverse the state of E5 as described by $cE5=\phi33\ F\ \underline{P}G\ KC11\ t1_{+}+\ldots$ (FIG. 36)

The complementation of the flip-flop E5 results in a change by 16 in the value of the delay number and prevents the transition from φ35 to φ34 before the time $\underline{K}$PC12. As described earlier, the same failure to enter φ34 before the time $\underline{K}$PC12 occurs in a thirteenth traversal of the loop, after all digits of the multiplier have been used. The failure to enter φ34 before the time $\underline{K}$PC12 is used to permit breakout from the loop as described by $rY=a3\ X\underline{Z}\ \underline{K}P\ C12+\ldots$ (FIG. 31) (φ36→φ34; terminal)

$sU=VW\ b4\ C12+\ldots$ (FIG. 27) (φ34→φ74; breakout)

Phase φ74 leads to the Restore-P routine via phase φ54 of the Add-Subtract routine.

When the breakout from the loop does not occur, the digit of the Q register which is being returned to memory in the single character period of occupancy of φ34 is copied into E, as shown by $e'=e5d+\ldots$ (FIG. 37); $e5=\phi34+\ldots$ (FIG. 37)

In the following $\underline{P}$ character period, φ30 is entered as shown by $rX=a3\ \underline{YZ}\ \underline{P}+\ldots$ (FIG. 30) (φ34→φ30)

At the time of departure from the delay-P phases, flip-flop F is left "On." In the succeeding phases, φ36, φ34, φ30 and φ32 flip-flop F is turned "Off" to mark the appearance of $S_p$ as shown by the equations $sF=a3\underline{Z}\ KPC12+\ldots$ (FIG. 38)

$sF=a3\ \underline{Z}\ \underline{P}G+\ldots$ (FIG. 38) (permit add-K-to-P)

If the sign character, $S_p$, appears in the $\underline{K}$ half cycle, all of the digits of the K register are added to the P register in φ30. If a sufficient amount of left shifting has occurred so that $S_p$ does not appear until some time in the K half cycle some of the digits of the K register are omitted from the addition process during φ30, by reason of the condition $F=1$.

The addition performed in φ30 begins no sooner than the time KPC0. Somewhat before that time the number held in the E flip-flops is decremented by one. If the number is brought below zero, $\phi30$ is terminated. If the number is not brought below zero, $\phi30$ is continued for one or more full cycles until a number of additions equal to the digit of the Q register originally set into the E flip-flops is performed. The decrementation of the number held in the E flip-flops is described by $rH=\phi30t1P+\ \ldots$ (FIG. 44) (decrements E in $\phi30$)

$*H=\phi30\ e+\ \ldots$ (FIG. 44) (decrements E in $\phi30$)

$e'=2\ \ (e\neq H)+\ \ldots$ (FIG. 37); $e2=\phi30\ \ \underline{K}PC12$ (decrements E in $\phi30$)

The reduction of the number held in the E flip-flops below zero is indicated by $\underline{H}$ at the time $\underline{KP}C13$. This factor $\underline{H}$ initiates entry to $\phi32$ for another cycle of the routine as shown by $sY=a3\ \ \underline{XZ}\ \ \underline{H}\ \ \underline{K}PC13+\ \ldots$ (FIG. 31) ($\phi30\rightarrow\phi32$)

Since the carry propagation of the addition performed in $\phi30$ may or may not be completed at the time $\underline{KP}C13$, the carry propagation is allowed to continue into $\phi32$. Therefore, $\phi32$ as well as $\phi30$ is included in the definition of $\phi ap$. However, the F flip-flop is held "On" during the time $\phi32$ C0–11.

$\phi ap\equiv\phi54+\phi21+a3\ \ \underline{XZ}+\phi56$ (FIG. 7) ($\phi ap$ defined)
$sF=\phi32\ C0\text{–}11+\ \ldots$ (FIG. 38)

At the time KPC12, departure from $\phi32$ and entry to $\phi33$ occurs, as described above. In preparation for the entry to the delay-P pair of phases, flip-flop F is reset as described by $$rF=\phi32\ C12+\ \ldots\ \text{(FIG. 38)}$$

After completion of the multiplication, $\phi34$ is entered at $\underline{K}$PC12 as described above. Departure from $\phi34$ occurs immediately, with an entry to $\phi54$ of the Add-Subtract routine. That phase change is described by $$r\underline{V}=\underline{UW}b4+\ \ldots\ \text{(FIG. 28)}\ (\phi74\rightarrow\phi54)$$

From $\phi54$ the Restore-P routine is entered as described earlier.

*Divide routine.*—The Divide routine is shown in FIG. 11. The Divide routine is entered at phase $\phi20$ from the rest state, $\phi00$, by closure, of either of the two keys 140 and 144 shown in FIG. 2 to produce signals called Clear and Divide signal ($D_c$) and Accumulative Divide signal ($D_a$), as illustrated in FIG. 4. With the appearance of the signal $D_c$, the Q register is cleared in the first cycle of occupancy of $\phi20$. Phase $\phi20$ is therefore entered almost at the beginning of a machine cycle at the time $$\underline{K}PCOt1\frac{1}{4}2$$

$sV=\underline{UW}b_J\ (D_c+D_a)\ \underline{K}PC0\ t1\text{–}T5$
$+\ \ldots$ (FIG. 28) ($\phi00\rightarrow\phi20$)

A part of the clearing activity is described by $M'=0$ in $\phi20\ \underline{K}PC0\text{–}11D_c$ (FIG. 41) ($0\rightarrow$digits of Q)

The time of entry to $\phi20$ is early enough so that all of the decimal digits of the Q register are set to zero in the first cycle.

Flip-flop J is reset in $\phi00$, as discussed earlier, and remains "Off" in $\phi20$ until the time $\underline{K}$PC12. At the time $\underline{K}$PC12 flip-flop J is complemented and therefore is "On" if the sign character of the Q register is negative. This operation is the same as described under the Multiply routine. Flip-flop J is also complemented for a negative sign in the K and P registers as discussed under the Add-Subtract routine. At the time $\underline{KP}$C13 if $J=1$, there is an excursion into phase $\phi22$, lasting for one cycle. The entry to and exit from $\phi22$ is described by $sY=a2\ \underline{XZ}\ \underline{K}PC13J+\ \ldots$ (FIG. 31) ($\phi20\rightarrow\phi22$)
$rY=a2\ \underline{XZ}\ \underline{KP}C13J+\ \ldots$ (FIG. 31) ($\phi22\rightarrow\phi20$)

Phase $\phi22$ is a complement-Q phase, the activity of which, including the resetting of the J flip-flop, has been described previously. When phase $\phi20$ is entered on the signal $D_c$ all digits of the Q register are set to zero before the complementation. Therefore, the reversed sign character is either normal positive or normal negative. If phase $\phi20$ is entered on the signal $D_a$ and if the number held in the Q register is not zero, the sign character after complementation is either positive or negative overdrawn.

Departure from $\phi20$, excluding the one-cycle excursion into $\phi22$, may occur at the time $$KPCOt1\frac{1}{4}1$$

This time is almost one machine cycle, or two if an excursion into $\phi22$ took place, after the time of entry to $\phi20$. Departure from $\phi20$ occurs at this time if the signal $D_a$ is present. Departure from $\phi20$ at this time also occurs if the delay number is zero. Also departure occurs from $\phi20$ if the flip-flop C is set, for reasons described below. The equation which defines the entry to $\phi24$ is $sX=a2YZKPCOt1\frac{1}{4}1\ (D_a+E1E2E3E4E5E6+C)$
$+\ \ldots$ (FIG. 30) ($\phi20\rightarrow\phi24$)

In phase $\phi20$ a delay number is formed in the same manner as in phase $\phi03$ of the Multiply routine. In the Clear and Divide operation, it is desired that the delay number be made equal to zero. This obviates the necessity of shifting the digits of the Q register which are all zeros and ensures that a full twelve digits of the quotient are formed. Accordingly, if $\phi20$ is entered on the signal $D_c$ and the value for the delay number is not zero, the occupancy of $\phi20$ continues for one or more machine cycles in which successive changes are made in the value of $D_q$ as described by $d'd10(e\neq M)+\ \ldots$ (FIG. 34)
$d10=\phi20\underline{KP}C13D_c+\ \ldots$ (FIG. 35)
$d'=d15\underline{M}+\ \ldots$ (FIG. 34)
$d15=\phi20\underline{KP}C14D_c(E5t1+Et2)+\ \ldots$ (FIG. 35)

The above equations describe a reversal of each bit of $D_q$ which corresponds to a one-bit in the delay number or a reversal in the first cycle of $\phi20$ of the irrelevant number held in the E flip-flops at the time of entry to $\phi20$. After no more than seven cycles, a zero delay number is produced and departure to $\phi24$ occurs. The $D_c$ signal is transmitted through a resistor-capacitor circuit which ensures that the signal lasts for a sufficient period of time to complete the above process.

When the divide routine is initiated by an Accumulative Divide signal the delay number may be negative at the time of entry to $\phi24$. If the delay number is negative phase $\phi64$ is entered to begin the advancement of the digits of the Q register. The advance-Q activity has already been described and takes place in $\phi64$ and $\phi60$. Entry to $\phi64$ is shown by $sU=V\underline{W}b4\underline{K}PCOt1_{\frac{1}{4}}E6+\ \ldots$ (FIG. 27) ($\phi24\rightarrow\phi64$)

If entry to the advance-Q phases takes place as described above, the sign of the Q register may be normal or overdrawn, but is not overflowed. To indicate the condition of the sign during these advance-Q phases, flip-flop I is reset before entry to those phases. The resetting of the I flip-flop is shown by $$rI=\phi20+\ \ldots\ \text{(FIG. 39)}$$

The return to $\phi20$ from $\phi60$ takes place at the beginning of the character period $\underline{K}$PC14. At the time $\underline{K}$PC14, a part of the new decimal indication, $D_q$, has been returned to memory and the last two bits of $D_q$ are held in the D flip-flops. In phase $\phi20$ a new delay number is formed. To form the delay number correctly in $\phi20$ following entry from $\phi60$ the complement of $D_q$ is placed in the E register during $\phi$60 as well as during $\phi$20 as described under the Advance-P activity.

In $\phi$20, following entry from $\phi$60, the formation of a new delay number, larger by unity than the previous value, is completed. If the new delay number is still negative another entry to phases $\phi$64 and $\phi$60 takes place, until the delay number reaches zero.

In the later occupancies of $\phi$20, flip-flop J is again complemented on the appearance of negative signs in the K and P registers. To guard against an undesired entry to phase $\phi$22 and an unwanted complementation of the Q register, flip-flop J is set "On" in phase $\phi$60 if $S_q$ is negative. Since flip-flop J was zero prior to the entry to $\phi$60 the full equation describing the complementation of the J flip-flop when $S_q$ is negative is $cJ=(\phi 03+\phi 20+\phi 60)d\underline{K}PC12t3+$ . . . (FIG. 45)

The observation of $S_q$ is made with the use of the signal $\underline{d}$ rather than the signal $\underline{M}$ to allow time for the reduction of an overflowed sign. The positive and negative overflowed signs are not distinguishable by the $t$3-bit as are the normal and overdrawn signs.

If the delay number is positive at the time of occupancy of $\phi$24, phase $\phi$25 is entered at the time $\underline{K}$PC13, as indicated by $sZ=a2\ XY\underline{K}PC13+$ . . . (Fig. 32) ($\phi$24$\rightarrow\phi$25)

The main activity of the division routine, which is the reduction of the remainder held in the P register by successive subtraction of the content of the K register, is carried out in $\phi$25. A second activity performed in phase $\phi$25 is the addition of unity to an appropriate digit of the Q register together with any necessary carries and decimal corrections. These changes in the content of the Q register may lead to an overflow of the sign, $S_q$. Such an overflow is indicated by the presence of an overflowed sign character in the D flip-flops at the time $\underline{K}$PC12$t$1, as shown by the signal $(D1=D2)D3$. If that happens phase $\phi$65 is entered, as shown by $sU=V\overline{W}b5\underline{K}PC12t1_{+}(D1=D2)D3$ . . . (FIG. 27) ($\phi$25$\rightarrow\phi$65)

Shortly after the entry to phase $\phi$65, phase $\phi$64 is entered to advance the digits of the Q register and thereby to relieve the overflow. Before that, however, while still in $\phi$65, flip-flops I and C are both set "On" to serve as signals which indicate the presence of the overflow. The settings of the I and C flip-flops and the entry to $\phi$64 are shown by $sI=\phi 65+$ . . . (FIG. 39)
$*C=\phi 65+$ . . . (FIG. 43) (overflow signals)
$rU=a6\ XY\underline{K}C0+$ . . (FIG. 32) ($\phi$65$\rightarrow\phi$64)

The use of the I flip-flop in the advance-Q phase has been described earlier. Flip-flop C remains "On" through phases $\phi$64, $\phi$60, $\phi$20, and into $\phi$24. Maintaining flip-flop C "On" permits entry to $\phi$24 from $\phi$20 as described earlier. Flip-flop C is reset after entry to $\phi$24 as shown by $*\underline{C}=\phi 24PC12t4+$ . . . (FIG. 43)

Flip-flop C is also turned on in $\phi$24 at the time $\underline{K}$PCO to insure later re-entry to $\phi$24 following an advance-Q as shown by $*C=\phi 24CO$ In the K half cycle of $\phi$25 the digits of the K register are subtracted from the content of the P register as described previously. In the first occupancy of $\phi$25, the sign of the P register is in its normal position, appearing at the time KPC12. In the second occupancy of $\phi$25, $S_p$ appears at the time $\underline{K}$PC0 since one left shift has been performed. In the third occupancy, $S_p$ appears at the time $\underline{K}$PC1, and so on for a maximum of twelve occupancies. Each occupancy may last for many machine cycles, the twelve occupancies correspond to the twelve digits of the quotient which are generated in the divide routine. In an accumulative division when the delay number initially formed is greater than zero, or when an overflow occurs, there are fewer than twelve occupancies. Therefore, $S_p$ is not shifted so far as to appear in a digit position on the K half-cycle and all of the digits of the K register are used in the subtraction process.

If the subtraction of the content of the K register from the P register leaves the content of the P register overdrawn, an exit from $\phi$25 is made at the time $\underline{K}$PC13$t$2. If the exit from $\phi$25 does not occur, which indicates that the subtraction is successful, occupancy of $\phi$25 continues at least through the first half of the following machine cycle. In the $\underline{K}$ half-cycle an augmentation of the Q register is performed, as described earlier. The delay number held in the E flip-flops serves to select the digit position of the Q register to which the Unit increment is applied. If the incremented digit previously had the value 9, the incrementation brings the digit to a non-decimal value of ten. The non-decimal digit is detected by the signal $(D2+D3)D4$. That signal initiates a carry to the next digit position and a decimal correction brings the incremented dgit to the value zero. A possible consequence of the augmentation of Q is an increase by one in its sign, $S_q$. That can happen either because the augmentation is applied to $S_q$ itself, or by reason of carry propagation into $S_q$. If $S_q$ was previously overdrawn that increase changes $S_q$ to a normal form, which does not require any special action. If $S_q$ was previously normal that increase changes $S_q$ to an overflowed form and it is then necessary to interrupt the division process to perform a right shift of the Q register. The right shift is effected by an entry to phase $\phi$65 at the time $\underline{K}$PC12$t$1$_{+}$ as described earlier.

If $S_q$ is not overflowed, the occupancy of phase $\phi$25 continues into the second half-cycle for another subtraction of the K register from the P register.

After a sufficient number of subtractions of the K from the P register and corresponding augmentations of the Q register, the numerical part of the P register becomes negative and departure from $\phi$25 is required. The part of the P register which takes part in each subtraction consists of the twelve decimal digits presented at the times KPC0–11 together with any digits which have been shifted either into or beyond the sign character position, KPC12. After each occupancy of $\phi$25 and $\phi$21, except the last, a digit of the remainder, which has any decimal value, is shifted into the sign position. The character previously held in the sign position, which is either a normal sign character or a zero, is shifted left out of the sign position. It is possible to determine whether or not the subtraction being performed is successful at the time $\underline{K}$PC13, which is immediately after the reception of the sign or digit occupying the sign position. If a borrow is being propagated at the time $\underline{K}$PC13 the subtraction is unsuccessful since only zero digits can be met before $S_p$ is reached. Accordingly, an overdrawn sign would be produced if the subtraction process were completed. In the first occupancy of $\phi$25 an overdrawn $S_p$ may be present in the D flip-flops at the time $\underline{K}$PC13, and this also indicates an unsuccessful subtraction. In either of the above cases the subtraction is terminated and phase $\phi$21 is entered for the performance of a correcting addition to restore the P register to a normal form. Since the borrow propagation is not carried past the time KC12, the carry propagation in the correcting addition in phase $\phi$21 is also stopped at that time.

Entry to phase $\phi$21 is described by $xX=a2\underline{Y}Z\underline{K}PC13t2[C+G+E5+E3E4(E1+E2)]$ + . . . (FIG. 30) ($\phi$25$\rightarrow\phi$21)

Figure 42:
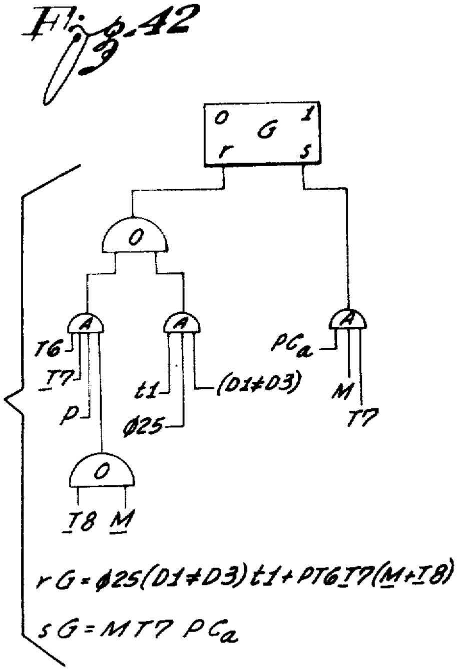
FIG. 42 is a block diagram of the G flip-flop and its associated control circuitry.

The term C in (C+G+ . . .) shows the presence of a borrow. The term G in the factor $(C+G+$ . . .) usually indicates that a sign character of any kind has been received. The term G indicates only overdrawn signs at this time since it is reset in the bit period KPC13t1 if the flip-flops D hold a normal sign. This is shown by $rG=\phi 25t1\ (D1\neq D3)+$ . . . (FIG. 42)

The sign $(D1 \neq D3)$ serves to mark normal, as distinct from overdrawn signs. The additional terms in $$(C+G+ \ldots)$$

indicate that $D_{\#}>12$ which indicates that the division is to be terminated.

Phase φ21 is one of the Add-to-P phases, *φap*, and an addition is performed in φ21 which restores the P register to its condition before the unsuccessful subtraction. Carry propagation in φ21 continues only until the time $\underline{K}PC13t1$ when departure from φ21 occurs. Flip-flop C is also reset at that time as shown by $$^{*}\underline{C}=\phi 21 PC12t4+ \ldots \text{ (FIG. 43)}$$

As indicated in the discussion of the Augment-Q phase, the short delay number held in the E flip-flops during phase φ25 controls the selection of the digit position in the Q register to which the augmentation is applied. The short delay number is first incremented by four before the appearance of any digits of the Q register. Then the short delay number is incremented by one after each of the twelve digits has appeared, thus restoring the short delay number to its original value. The digit of the Q register, including $S_q$, which appears after the short delay number had advanced from 15 to 0 is the digit which is augmented. For example, when the decimal point positions of the K and P registers are initially the same $(D_k=D_p)$, and $D_q$ is, or by advancement of the Q register is brought to, the value 63, then the short delay number is zero in the first occupancy of φ25. The first subtraction, if successful, represents a contribution of value unity to the quotient. The successful subtraction requires a unit augmentation of the digit immediately to the left of the decimal point in the Q register, namely, the sign character. Following the successful subtraction the short delay number which at this time has a value of zero, is increased by four in KPC14, and by one more in each of the twelve character periods $\underline{K}$PC0–11. After the last increase the short delay number advances from 15 to 0, thus permitting the augmentation of $S_q$, which may or may not leave it overflowed. The overflow of $S_q$ leads to the right shifting of the Q register by one place, with a corresponding decrease by one in the value of $D_q$, which increases the short delay number to one. In the next occupancy of φ25 the short delay number starts with the value one. If the subtraction is successful, the short delay number is raised to five in KPC14, and advances from 15 to 0 in $\underline{K}$PC10, which permits the augmentation of the digit of the Q register appearing in $\underline{K}$PC11. In later occupancies of φ25 the short delay number is initially larger, and therefore passes from 15 to 0 sooner so as to permit augmentation of successively less significant digit positions in the Q register. When the short delay number reaches the value 12, each successful subtraction is followed by an increase by four of the short delay number at the time KPC14. The short delay number is therefore immediately returned to the value 0 which holds the flip-flop H "On," and permits augmentation of the least significant digit of the Q register while the later increments bring the short delay number back to the value 12.

After an unsuccessful subtraction phase φ21 is entered to restore the previous value of the P register, as mentioned above. If the short delay number is less than 12, as indicated by the signal $(\underline{E}3+\underline{E}4(\underline{E}5$, phase φ31 is entered from phase φ21 to produce a single-stage delay of the P register. If the short delay number is 12 or more, as indicated by $E3E4+E5$, the main part of the division process is complete and phase φ61 is entered from phase φ21 to finish the division routine. The two modes of exit from φ21 are described by $$sW=UVb1\underline{K}PC13t1_{+}(E3+E4)E5+ \ldots \text{ (FIG. 29) } (\phi 21 \rightarrow \phi 31)$$

$$sU=V\underline{W}b1\underline{K}PC13t1_{+}(E3E4+E5+ \ldots \text{ (FIG. 27) } (\phi 21 \rightarrow \phi 61)$$

Flip-flop I is set "On" in φ61, as described by $$sI=\phi 61+ \ldots \text{ (FIG. 39)}$$

Phase φ31 is the first of a pair of delay-P phases in which the remainder of the P register is shifted left one step. The termination of left shifting is described by the following expression which has been discussed before under Delay-P, $$sX=\phi dpFKPC13t1_{+}[V+IUE5+UE4(E2+E3)] + \ldots \text{ (FIG. 30) } (\phi 31 \rightarrow \phi 35)$$

Since V=1 in φ31 there is only one step of delay. Exit from the second phase, φ35, of the pair of delay-P phases is to φ25 as shown by $$rW=UVb5KPC13+ \ldots \text{ (FIG. 29) } (\phi 35 \rightarrow \phi 25)$$

In phase φ61 the quotient or accumulated quotient, held in the Q register, is complemented whether it needs it or not. Phase φ61 and φ22 are the two complement-Q phases.

$$\phi cq \equiv \phi 22+\phi 61 \text{ (FIG. 7) } (\phi cq \text{ defined})$$

After completion of the complementation, at the time KPC12t1, phase φ71 is entered if the sign of the Q register is normal rather than overdrawn. The normal sign is indicated by the signal $(D1 \neq D3)$. The entry to phase φ71 is shown by $$sw=UVb1KPC12t1(D1 \neq D3)+ \ldots \text{ (FIG. 29) } (\phi 61 \rightarrow \phi 71)$$

If the complementation described above produces rather than cures an overdraft, phase φ61 is occupied for another cycle to recomplement the Q register. After the recomplementation, phase φ71 is entered in the same manner as described above. Occupancy of φ71 continues until the time KPC11 of the following machine cycle at which time phase φ75 is entered, as shown by $$sX=a7YZKPC11+ \ldots \text{ (FIG. 30) } (\phi 71 \rightarrow \phi 75)$$

Exit from phase φ75 to φ74 occurs during character period KPC11. That phase change occurs if there is a nonzero bit in the most significant digit of the Q register, indicated by $d=\mathbf{1}$, or if $I=\mathbf{0}$ .The entry is shown by $$rU=a7X\underline{Y}\underline{K}PC11(d+1)+ \ldots \text{ (FIG. 32) } (\phi 75 \rightarrow 74)$$

If there is no escape from φ75 in its first character peior, the most significant digit of the Q register is a zero. The digits of the Q register are therefore delayed for the purpose or normalizing the Q register by occupying φ75 for another cycle. During the K half-cycle flip-flop I is reset as shown by $$rI=\phi 75K+ \ldots \text{ (FIG. 39)}$$

Flip-flop I is set again by the appearance of any nonzero digit in the Q register in the following cycle as shown by $$sI=\phi 75M\underline{K}PC0\text{–}11+ \ldots \text{ (FIG. 39)}$$

The setting of the I flip-flop permits escape from φ75 after one additional cycle of occupancy if all the digits of the Q register are zero and normalizing is thus impossible. If not all the digits of the Q register are zero, occupancy of φ75 continues until a non-zero digit is brought into the most significant digit position.

In φ75 the digits of the Q register are delayed, with a concomitant incrementation of $D_q$. The incrementation of $D_q$ occurs at the time $\underline{K}$PC13–14 as described by $$\text{Inc.}=\phi 75\underline{K}PC13\text{–}14 \rightarrow \ldots \text{ (FIG. 40)}$$

The delaying of digits of the Q register, with the setting of zero into the least significant digit position is effected by transmitting the digits of the Q register from M to $d'$ via the E flip-flops. The E flip-flops are set to zero in the K half cycle. These activities are shown by $$e'=e7M+\ \ldots\ \text{(FIG. 37)};\ e7=\phi75\underline{KP}+\ \ldots\ \text{(FIG. 37)}$$

$$d'=d7e+\ \ldots\ \text{(FIG. 34)};\ d7=\phi75K\underline{P}C0\text{–}11\ \ldots\ \text{(FIG. 35)}$$

In this way the Q register is normalized or else the attempt is abandoned after one cycle.

Phase $\phi74$, which is also entered after completion of the Multiply process, leads into $\phi54$ of the Add-Subtract routine and then to the Restore-P routine described below.

After completion of the main part of the division process the remainder is held in the P register. The numerical part of the remainder is smaller in magnitude than the divisor held in the K register. The sign of the remainder is not in its normal position but has been shifted leftward by a number of places, not more than 12. The sign, therefore, appears during one of the character periods $\underline{K}$PC0–11. Zeros occupy the digit positions of the P register which precede the appearance of $S_p$ in the $\underline{K}$ half-cycle and in the normal $S_p$ position. Therefort, the remainder sign, $S_p$, is returned to a normal position without making any other change in the P register, consistent with keeping the correct value for the remainder. The sign character is returned to its normal position in phases $\phi61$, $\phi71$ as follows:

In the $\underline{K}$ half-cycle of $\phi61$, $S_p$ is set into the D flip-flops during one of the character periods $\underline{K}$PC0–11. The presence of $S_p$ in the D flip-flops is announced by the signal G during one of the following character periods, $\underline{K}$PC1–12. During one of the times $\underline{K}$PC1–12, $S_p$ is captured in the E flip-flop and erased from the position in which it had been found as described by $$e'=e5d+\ \ldots\ \text{(FIG. 37)};\ e5=\phi61\underline{P}G+\ \ldots\ \text{(FIG. 37)}$$

$$M'=0 \text{ in } \phi61\underline{P}G+\ \ldots\ \text{(FIG. 41)}$$

The sign of the remainder is recorded in its normal position at the time K$\underline{P}$C13 in $\phi71$, as shown by $$M'=M5e+\ \ldots\ \text{(FIG. 41)};\ M5-\phi71\underline{P}C13+\ \ldots\ \text{(FIG. 41)}$$

The restoration of $S_p$ to the normal position as shown above shortens the time required for the Restore-P routine.

*Restore-P routine.*—The structure of the Restore-P routine is shown in FIG. 12. Entry to the Restore-P routine is from $\phi54$ of the Add-Subtract routine. Phase $\phi54$ also serves as an avenue into the Restore-P routine at the ends of the Multiply and Divide routines. The purpose of Restore-P is to correct any abnormalities of form of the P register following one of the arithmetic operations. Specifically, the sign character $S_p$ sometimes is left in an overflowed or overdrawn condition or away from its normal position after Add-Subtract or Multiply. Moreover, the digit immediately preceding $S_p$ sometimes is a zero, or a nine if $S_p$ is overdrawn, and this is permitted in the normalized form only if all digits of the P register are zero. The various possible defects are checked and corrected in succession in the Restore-P routine.

Phase $\phi56$ is entered at $\underline{KP}$C12 as described in the Add-Subtract routine. Phase $\phi56$ is occupied until the appearance of $S_p$ at which time phase $\phi52$ is entered as shown by $$rX=a5Y\ \underline{Z}\ \underline{P}G+\ \ldots\ \text{(FIG.30)}\ (\phi56\rightarrow\phi52)$$

The presence of $S_p$ is recognized slightly before departure from $\phi56$ by the fact that flip-flop G is "On" in the fourth bit period of a P character period. Since, if $S_p$ were not present, flip-flop G would be in the process of being reset, the recognition is made with confidence only somewhat after the beginning of the bit period. At that time flip-flop J is set "On" if $S_p$ is overdrawn, as indicated by $\underline{D}1\underline{D}3+D1\underline{D}2D3$. The setting of flip-flop J serves to cause the complementation of the P register at a later time, and is shown by $$sJ=\phi56PT6t4G\ (\underline{D}1\underline{D}3+D1\underline{D}2D3)+\ \ldots\ \text{(FIG. 45)}$$

Phase $\phi52$ serves to correct an overflow in $S_p$. If $S_p$ is not overflowed, departure from $\phi52$ occurs immediately, with entry to $\phi53$. Sign characters which are not overflowed, and therefore are either normal or overdrawn, are characterized by $[\underline{D}3+(D1\neq D2)]$. If $S_p$ is overflowed occupancy of $\phi52$ continues until one decimal digit of the P register is received. Occupancy of $\phi52$ therefore continues until the time $\underline{P}C_b t1\underline{G}$. In $\phi52$, flip-flop F is reset in preparation for the delay-P phases, $\phi53$ and $\phi57$.

$$rF=\phi52+\ \ldots\ \text{(FIG. 38)}$$

Departure from $\phi52$, after the resetting of the flip-flop F, is described by $$s\underline{Z}=a5\ \underline{X}Y\ \underline{P}C_b\ t1[(\underline{D}3+(D1\neq D2)+\underline{G})]\underline{F}+\ \ldots\ \text{(FIG. 32)}\ (\phi52\rightarrow\phi53)$$

If $S_p$ is overflowed, the decimal digit One rather than $S_p$ is recorded in M' in the first character period of $\phi52$. Meanwhile $S_p$ is placed in the E flip-flops for temporary storage. In the next character period in which a digit of the P register is presented, $S_p$ is reduced by one to correct the overflow, and put into the D register in place of the newly presented digit. The overflowed sign is therefore replaced by a One and the corresponding normal sign, and one digit at the least significant end of the P register is lost. The reduction of $S_p$ is performed with the help of flip-flop H. The flip-flop H is controlled to ensure that it is "On" at the time of departure from $\phi52$, as shown by $$M'=M7t1+\ \ldots\ \text{(FIG. 41)};\ M7=\phi52\ \underline{P}G+\ \ldots\ \text{(FIG. 41)}$$

$$e'=e5d+\ \ldots\ \text{(FIG. 37)};\ e5=\phi52\ \underline{P}G+\ \ldots\ \text{(FIG. 37)}$$

$$d'=d4\ (e\neq\underline{H})+\ \ldots\ \text{FIG. 34)};\ d4=\phi52\ PC_a\ \text{(FIG. 35)}$$

$$rH=\phi52t1+\ \ldots\ \text{(FIG. 44)}$$

$$*H=\phi52e+\ \ldots\ \text{(FIG. 44)}$$

At the time $PC_a t4$ the fourth bit of $S_p$, presented by $e$, is necessarily a One. Therefore, flip-flop H is necessarily One when $\phi53$ is entered in the next bit period. In the case of a normal or overdrawn sign, phase $\phi52$ is occupied too briefly to assure the setting "On" of flip-flop H, and the term $$*H=\phi56+\ \ldots\ \text{(FIG. 44)}$$

is used to complete the assurance that flip-flop H is "On" at entry to $\phi53$.

Phases $\phi53$ and $\phi57$ are among $\phi dp$ phases and they delay the P register sufficiently to restore $S_p$ to its normal position. At the time of entry to $\phi53$, $S_p$ stands in the D flip-flops ready to be recorded as M' in the first character period. If this first character period occurs at the time K$\underline{P}$C13, no delaying is needed and the condition $H=1$ is used to permit skipping out of the $\phi dp\underline{X}$ phases as shown by $$sX=a5YZK\underline{P}C13H+\ \ldots\ \text{(FIG. 30)}\ (\phi53\rightarrow\phi57)$$

$$rW=U\underline{V}b7\underline{H}K\underline{P}C13+\ \ldots\ \text{(FIG. 29)}\ (\phi57\rightarrow\phi47)$$

To prevent the skipping-out if $\phi53$ is entered at any other time, thereby requiring a delay of the P register, flip-flop H is reset in any P character period of $\phi53$. If the skip-out does occur flip-flop H is reset in $\phi47$ as shown by $$rH=P\phi53+P\phi cp+\ \ldots\ \text{(FIG. 44)}$$

When a shifting is performed it is terminated by setting flip-flop X "On" at the time K$\underline{P}$C13$t1_+$ in $\phi53$F. At this time the sign, $S_p$, is held in the E flip-flops and is about to be recorded in its proper position. The presence of the sign is indicated by $(E2+E3)E4$. Therefore, the termination condition is $$sX=\phi dpK\underline{P}C\mathbf{13}_{+}UF(E\mathbf{2}+E\mathbf{3})E\mathbf{4}+\ldots \text{ (FIG. 30) } (\phi\mathbf{53}\rightarrow\phi\mathbf{57})$$

Departure from $\phi$57, with entry to $\phi$47, occurs after one character period in which $S_p$ is recorded in its proper place. This is shown by $$rw=U\underline{V}b\mathbf{7}+\ldots \text{ (FIG. 29) } (\phi\mathbf{57}\rightarrow\phi\mathbf{47})$$

In phase $\phi$47 the P register is complemented if $J=1$, as described earlier. After the completion of the complementation, indicated by $J=0$, phase $\phi$43 is entered at the time KPC13, as shown by $$rX=a\mathbf{4}YZKPC\mathbf{13}J+\ldots \text{ (FIG. 30) } (\phi\mathbf{47}\rightarrow\phi\mathbf{43})$$

At the time of entry to $\phi$43, $S_p$ is in its proper position and is a normal positive or negative sign. In order to complete the restoration of the P register there remains the task of ensuring that the most significant digit of the P register leftward. If, however, all of the digits of the P register are zero this attempt to normalize the P register must be abandoned. Phase $\phi$43 is used to detect the need for, and possibility of, normalizing the P register. The detection is performed with the help of flip-flop I. Flip-flop I is reset in the first character period, KPC13, and then set "On" on finding a non-zero digit in any but the most significant digit position of the P register. This indicates that normalization is possible. Flip-flop I is then reset on finding that the most significant digit is non-zero, which indicates that the P register is already in normanized form. These above actions are described by $$rI=\phi\mathbf{43}KPC\mathbf{13}+\ldots \text{ (FIG. 39)}$$
$$sI=\phi\mathbf{43}PC\mathbf{0\text{–}11}M+\ldots \text{ (FIG. 39)}$$
$$*I=\phi\mathbf{43}KPC\mathbf{11}M+\ldots \text{ (FIG. 39)}$$

At the time KC12 phase $\phi$41 is entered as described by $$ry=a\mathbf{4}\underline{X}ZKC\mathbf{12}+\ldots \text{ (FIG. 31) } (\phi\mathbf{43}\rightarrow\phi\mathbf{41})$$

If flip-flop I is "Off" departure from $\phi$41 occurs almost immediately, with entry to $\phi$40 as shown by $$rZ=a\mathbf{4}\underline{XY}KPC\mathbf{12}\underline{I}+\ldots \text{ (FIG. 32) } (\phi\mathbf{41}\rightarrow\phi\mathbf{40})$$

If flip-flop $I=1$ at the time of entry, $\phi$41 is occupied for one or more cycles in which the digits of the P register, excluding $S_p$ are passed through the E flip-flops enroute to the D flip-flops. To ensure that a zero is set into the least significant digit position, the E flip-flops are cleared during occupancy of $\phi$43. These actions are shown by $$e'=\mathbf{0} \text{ in } \phi\mathbf{43} \text{ (FIG. 37)}$$
$$e'=e\mathbf{7}M+\ldots \text{ (FIG. 37)}$$
$$e\mathbf{7}=\phi\mathbf{41}PC\mathbf{0\text{–}11}+\ldots \text{ (FIG. 37)}$$
$$d'=d\mathbf{7}e+\ldots \text{ (FIG. 34)}$$
$$d\mathbf{7}=\phi\mathbf{41}PC\mathbf{0\text{–}11}+\ldots \text{ (FIG. 35)}$$

The decimal position character is increased by one for each stage of shifting as described by $$\text{Inc.}=\phi\mathbf{41}KPC\mathbf{13\text{–}14}+\ldots \text{ (FIG. 40)}$$

After a sufficient number of cycles in $\phi$41, a non-zero digit is brought into the most significant digit position by being set into the D flip-flops during a KPC11 character period. When a non-zero digit is brought into the most significant digit position, flip-flop I is reset, thus permitting escape from $\phi$41 in the next character period. The setting and resetting of the I flip-flop is shown by $$sI=\phi\mathbf{41}\underline{K}+\ldots \text{ (FIG. 39)}$$
$$rI=\phi\mathbf{41}\overline{K}PC\mathbf{11}e+\ldots \text{ (FIG. 39)}$$

The escape to $\phi$40 has been described above.

From $\phi$40 there is a return to the rest state provided all keys are released as shown by $$ru=\underline{VW}b\mathbf{0}C\mathbf{0\text{–}11}+\ldots \text{ (FIG. 27) } (\phi\mathbf{40}\rightarrow\phi\mathbf{00})$$

At the end of an arithmetic operation the sign of the P register may be left in a position other than the normal place as a result of left shifting of the P register. In the Restore–P routine shown in FIG. 12 a further left shifting of the P register is performed possibly after the correction of an overflow in $S_p$, to bring $S_p$ back to its normal place. The initial removal of $S_p$ from, together with the later shifting to restore $S_p$ to, the normal position is called a shift-around. Since $D_p$ is increased by unity with each step of left shifting, the net effect of a shift-around is to leave the value of $D_p$ too large by the amount 25. The amount is 25 since 24 decimal digits and the sign character are shifted a total of 25 steps to bring $S_p$ back to its original position. Also, one of the 25 steps of shifting may be replaced by the delay of $S_p$ in $\phi$25 in correcting an overflow. In that case $D_p$ actually is increased by 24 while a decrease by one was desired, thus in that case also $D_p$ is left too large by 25.

After a division the sign of the P register is necessarily normal and has been returned to its normal position in phase $\phi$71. The left shifting performed in the course of the division process increases $D_p$. The increase, however, is proper, corresponding to the fact that the remainder is smaller than the dividend, and does not require any correction. There is also no need for a correction of $D_p$ after an addition or subtraction if the initial decimal point position in the P register is not to the right of that in the K register and no overflow in $S_p$ is produced. In the cases in which no shift-around occurs, departure from $\phi$56 in the Restore–P routine takes place at the time K$\underline{\text{P}}$C13 and phases $\phi$52, $\phi$53 are skipped through without effecting any delay. In those cases in which a correction of $D_p$ is required either $\phi$52 or $\phi$53 or both are occupied for one or more character periods marked P. Flip-flop E5 marks the cases in which the correction to $D_p$ is required, as described by $$rE\mathbf{5}=\phi\mathbf{56}+\ldots \text{ (FIG. 36)}$$
$$sE\mathbf{5}=P(\phi\mathbf{52}+\phi\mathbf{53})+\ldots=Pa\mathbf{5}\underline{X}Y+\ldots \text{ (FIG. 36)}$$

The condition $E\mathbf{5}=\mathbf{1}$ following departure from $\phi$53 indicates that the correction is required.

The subtraction of 25 from $D_p$ is performed in phase $\phi$43 at the times KPC13–14, on the condition $E\mathbf{5}=\mathbf{1}$. The number 25 is represented (modulo 64) in the character periods KPC13–14 by $$(t\mathbf{1}+t\mathbf{4})C\mathbf{13\text{–}14}=\underline{T}\mathbf{7}C\mathbf{13\text{–}14}$$

The subtraction of 25 is described by $$d'=d\mathbf{15}\underline{M}+\ldots \text{ (FIG. 34)}$$
$$d\mathbf{15}=\phi\mathbf{43}E\mathbf{5}PC\mathbf{13\text{–}14}(C\neq\underline{T}\mathbf{7})+\ldots \text{ (FIG. 35)}$$
$$*C=\underline{MT}\mathbf{7}\phi\mathbf{43}PC\mathbf{13\text{–}14}+\ldots \text{ (FIG. 43)}$$
$$*\underline{C}=\overline{MT}\mathbf{7}\phi\mathbf{43}PC\mathbf{13\text{–}14}+\ldots \text{ (FIG. 43)}$$

To prevent a repetition of the correction, flip-flop E5 is reset in the $\underline{\text{K}}$ half-cycle as shown by $$rE\mathbf{5}=\underline{K}\phi\mathbf{43}+\ldots \text{ (FIG. 36)}$$

Since flip-flop C may be left "On" by the above operation it is reset in the rest state as shown by $$*C=\phi\mathbf{00}+\ldots \text{ (FIG. 43)}$$

Some auxiliary activities are performed in a late part of the Restore–P routine, as described later. Phase $\phi$43 is used for these activities which include the resetting of the F flip-flop and the selection of register K as permitted by the Automatic-K-Select switch.

Figure 46:
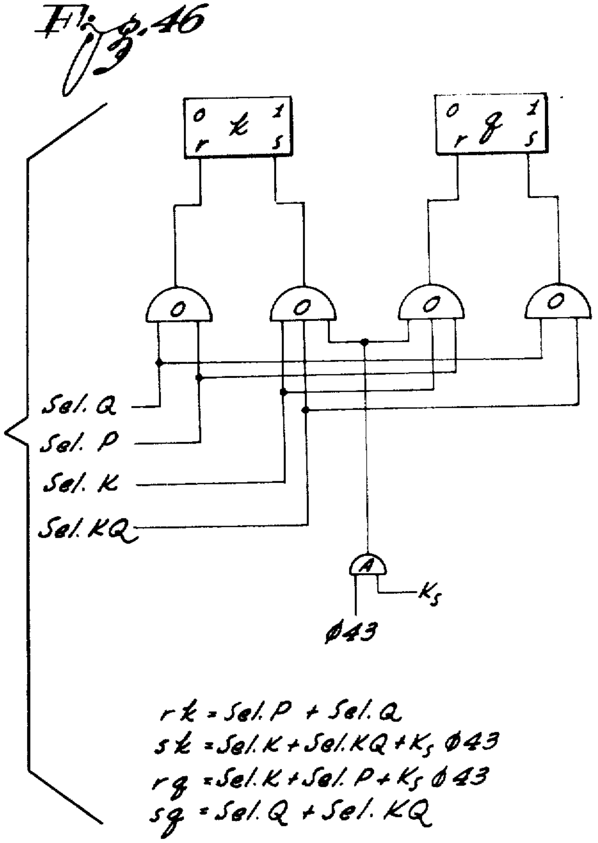
FIG. 46 is a block diagram of the *k* and *q* flip-flops and their associated control circuitry.

*Number entry processes.*—The ten-key keyboard 100, shown in FIGS. 1 and 2, is used in setting numbers into any of the working registers. The working registers are the K, Q, and P registers. An eleventh key, 102, the Decimal Point key, is used to place the decimal point at the desired position within the number. Four Register-Selection keys 104, 106, 108 and 110 are used in determining the register into which a number is placed. Any one of the three registers K, Q, or P, may be chosen by pushing keys 104, 106 or 110. Also, the pair of registers, K and Q, may be chosen by pushing key 108. When key 108 is pushed a number set in through the keyboard enters both the K and Q registers. The flip-flops, shown in FIG. 46, called $k$ and $q$, store the keyboard selection of the register. The flip-flops $k$ and $q$ follow a code as shown below.

| | | | | |
|---|---|---|---|---|
| k= | 0 | 1 | 0 | 1 |
| q= | 0 | 0 | 1 | 1 |
| Register | P | K | Q | K&Q |

The register selection keys 104, 106, 108 and 110 not only choose the register to be entered, but also set up a preclearance condition in the desk calculator. When any one of the register selection keys is operated the preclearance condition modifies the effect of a later operation of one of the digit keys 100 or decimal point key 102. Specifically, when the pre-clear condition exists, the operation of any digit key or the decimal point key clears the selected regster. After the clearance the activity specific to the operated key takes place. An arithmetic operation also produces a Pre-clear condition, in the same manner as the operation of the Register Select keys. The Pre-clear condition makes it unnecessary to clear a register before beginning the process of setting a number into it since clearance automatically accompanies the first operation.

In some operations of the desk calculator it is desired to place most numbers into the K register. Setting the Automatic K-Select switch 112 "On" permits use of the Register Select keys only in the exceptional cases. In the "Off" position the circuits associated with the switch 112 have no effect. In the "On" position each arithmetic operation automatically selects the K register as well as producing a Pre-clear condition. The automatic selection of the K register may be overridden by the operation of any Register Select key other than that for the K register. The "On" state of the switch 112 is indicated by the signals $K_s$ shown in FIG. 4. The signal $K_s$ sets the $k$ flip-flop "On" and the $q$ flip-flop "Off" in phase $\phi 43$ near the end of the Restore-P routine, as shown by $$sk=\phi 43\ K_s+\ .\ .\ .\ \text{(FIG. 46)};\ rq=\phi 43 K_s+\ .\ .\ .\ \text{(FIG. 46) (Auto-K-select)}$$

At the same time the flip-flop F and all of the E flip-flops are reset. The resetting of the F flip-flop and the E flip-flops is also done in $\phi 00$ on operation of any one of the register selection keys. The control of the flip-flops is shown by $$rF=\phi 43+\phi 00(\text{Sel. }K+\text{Sel. }Q+\text{Sel. }P+\text{Sel. }KQ)+\ .\ .\ .\ \text{(FIG. 38)}$$

$$e'=0 \text{ in } \phi 00(\text{Sel. }K+\text{Sel. }Q+\text{Sel. }P+\text{Sel. }KQ)\ \text{(FIG. 37)}$$

Sel. K is a key signal produced by the key 110 which serves to select the K register. The key signals Sel. Q, Sel. P and Sel. KQ are produced by the operation of the keys 106, 104 and 108. All the above key signals are shown in FIG. 4. The key signals also determine the states of the flip flops $k$ and $q$ as shown by $$sk=\text{Sel. }K+\text{Sel. }KQ+\ .\ .\ .\ \text{(FIG. 46)};\ rk=\text{Sel. }Q+\text{Sel. }P\ \text{(FIG. 46)}$$

$$sq=\text{Sel. }Q+\text{Sel. }KQ\ \text{(FIG. 46)};\ rq=\text{Sel. }K+\text{Sel. }P+\ .\ .\ .\ \text{(FIG. 46)}$$

The four E flip-flops E1, E2, E3, and E4 are used in counting the digits which are placed in a register by use of the keyboard 100. The number of digits which can be placed in a register is thus limited to 16. In particular, the P register which has a capacity of 24 digits cannot be completely filled from the keyboard. Only the sixteen most significant digits of the P register may be filled from the keyboard. The remaining eight digits of the P register can be affected by the arithmetic operations: Add, Subtract and Multiply.

When a register is cleared by operation of the clear key 114, all of the decimal digits are set to zero, the sign is made normal positive, and the decimal position character is given the value 63, to place the decimal point just to the left of the most significant digit position. The display unit 12 illustrated in FIG. 1 shows four permanent zeros to the left of the twelve digits of the K and Q registers. The P register is shown with four zeros to the left of the leftmost twelve of its 24 digits. The remaining twelve digits of the P register are shown below in a separate line with no additional zeros. The extra zeros are not to be confused with the genuine digits of the register. The extra zeros are presented to make the display easier to read in case the decimal point is moved leftward by one to four places from the normal position.

If the first key used after the Pre-clear condition is established is a non-zero decimal digit, the entire register in which the number is being inserted is first cleared, which includes bringing the decimal point to the normal position. The non-zero decimal digit is then placed in the leftmost digit position and the decimal point moved one place rightward so that the decimal point stands to the right of the digit just placed. With further digit key operations additional digits are placed in positions progressively farther to the right, replacing the zeros which formerly stood there. Also, the decimal point is moved successively rightward so that it stands just to the right of the last digit entered. The E flip-flops are used in keeping track of the position next to be filled.

If the decimal position key is operated after one or more significant digits have been set into the register there is no immediately visible effect. However, the insertion of additional digits thereafter does not result in further rightward motion of the decimal point. Therefore, the effect of the decimal position key 102 is to fix the decimal point position. As an example, we may consider the process of inserting the number +12.3405 into the K register. We also assume that the K register is selected automatically after the last arithmetic process with the help of the Automatic K-Select switch, and that a number remains in the K register as the result of a prior operation in the desk calculator. The keys are operated in the following sequence: One, Two, Point, Three, Four, Zero, Five. The appearance of the K-register display after each operation is as follows:

| Key operated | K-Register display |
|---|---|
| (Prior operation) | + 0 0.0 0 2 3.4 0 0 0 0 0 0 0 0 0 |
| 1 | + 0 0 0 0 1.0 0 0 0 0 0 0 0 0 0 0 |
| 2 | + 0 0 0 0 1 2.0 0 0 0 0 0 0 0 0 0 |
| . | + 0 0 0 0 1 2.0 0 0 0 0 0 0 0 0 0 |
| 3 | + 0 0 0 0 1 2.3 0 0 0 0 0 0 0 0 0 |
| 4 | + 0 0 0 0 1 2.3 4 0 0 0 0 0 0 0 0 |
| 0 | + 0 0 0 0 1 2.3 4 0 0 0 0 0 0 0 0 |
| 5 | + 0 0 0 0 1 2.3 4 0 5 0 0 0 0 0 0 |

In the example given above, the first key operated was a non-zero decimal digit. If, however, the first key operated is Zero, the register is cleared and the decimal point is moved one place to the left of the normal location. Additional zero-key operations move the decimal point farther left. If a non-zero digit key is then operated the digit is placed in the most significant digit position and the decimal point remains fixed in position. Later digit key operations fill positions progressively rightward, with no further change in the decimal point position. Therefore, in the example shown above, the number shown as left by a "prior operation" can be placed in the register by operating the keys in the following sequence: 0, 0, 2, 3, 4. The use of the decimal position key is not needed since the decimal point is moved left, and its position fixed, by the introduction of the non-significant zeroes. It is also not necessary to use the decimal position key in inserting an integer into a register. As each digit is set in, starting with the most significant digit, the decimal point moves rightward and when the integer has been completely set in the decimal point is to the right of the least significant digit.

*Preclearance.*—Flip-flop F and the four E flip-flops E1, E2, E3 and E4 are used in the Enter Digit process. The E flip-flops indicate the particular order of the selected register which is to be filled upon the activation of a decimal digit key. $E=0$ indicates the leftmost digit, $E=1$ the second from leftmost, $E=2$ the next, etc., where E represents the number held in the four E flip-flops. The major distinction to be made is between $E=0$ and the other fifteen conditions, $E\neq 0$. The signal $E=0$ indicates that no significant digits have been set into the register, although some zeroes following the decimal point may have been set into the register. The signal $E\neq 0$ indicates that one or more significant digits have been set into the register. The positive number represented by the four bits of the four E flip-flops is equal to the number of significant digits which have been placed in the register. The P register can accept 16 significant digits, but the K or Q register can only accept 12 significant digits.

The condition $F=0$ indicates that the position of the decimal point has not been indicated in the entry process. If, after the selection of a register or completion of an arithmetic operation, the Zero key is operated, the decimal point moves one place leftward from the normal position. At the same time the operation of the Zero key sets flip-flop F "On" to show the departure from the virgin condition, $E=F=0$. The operation of the Zero key does not change the E flip-flops since the leftmost digit position is still ready for the receipt of the digit next presented. Although a decimal position is indicated by setting flip-flop F "On," the decimal point is not irrevocably fixed. Further operations of the Zero key shift the decimal point farther left, or operation of the Decimal key 102 after entry of one or more significant digits may move the decimal point to the right.

The signal $E=0$ indicates that no significant digits have been entered. Initial zeros are not significant digits. The first non-zero digit set into a register is a significant digit and so are all subsequent digits, including later zeros. If a key indicating a non-zero digit is operated after the selection of a register or after an arithmetic operation the non-zero digit is placed in the leftmost digit posiiton of the register and the signal E is increased to 1. The decimal point is also moved one place to the right. Operating any other digit key sets in another digit and again moves the decimal point rightward. At this time the signal E is again increased by one. If the Decimal Key is then operated, flip-flop F is set "On." The effect of setting flip-flop F "On" is to prevent further automatic rightward motion of the decimal point as further digits are inserted in the register. The fixing of the decimal point, however, is not irrevocable. If, after additional digits are inserted, the decimal key is then operated, the decimal point is moved to the position just to the right of the digit last inserted.

As mentioned previously, the preclearance of the selected register consists of the replacement of all of the digits of the register by zeroes, the setting of the sign to positive normal and the setting of the decimal character to indicate the position just to the left of the most significant digit. The preclearance takes place following the operaiton of any digit key or the decimal key, if $E=F=0$. The preclearance precedes the performance of the activity demanded by the key which has been operated. Only one preclearance as described above takes place in the course of setting a number into a register. The preclearance is performed in the rest state as an effect of the common switch signal, $S_c$ shown in FIG. 3. The common switch signal $S_c$ indicates operation of any digit key ($S_n$) or the decimal key ($S_d$) as illustrated in FIG. 3. The preclearance is described by $d'=d\mathbf{11}(t\mathbf{1}C\mathbf{12}+C\mathbf{13\text{–}14})+\ldots$ (FIG. 34)

$d\mathbf{11}=\phi\mathbf{00}(KPk+PKq+KPq)S_cFE\mathbf{1}E\mathbf{2}E\mathbf{3}E\mathbf{4}+\ldots$ (FIG. 35)

The common switch signal $S_c$ is delayed in a passive network as shown in FIG. 3 to provide the signal denoted $S_{cd}$. The delayed signal $S_{cd}$ permits the setting of the F flip-flop if the decimal key is operated. The signal $S_{cd}$ also permits entry to phase $\phi 04$ of the enter Digit routine by setting the X flip-flop if a digit key is operated. The setting of the F or X flip-flop occurs after a delay of at least one full memory cycle to permit the clearance of the selected register. The settings of the flip-flops are described by $sF=\phi\mathbf{00}S_{cd}S_d+\ldots$ (FIG. 38)

$sX=a\mathbf{0}YZS_{cd}S_nKPC\mathbf{12}t\mathbf{1}_{+}+\ldots$ (FIG. 30) ($\phi\mathbf{00}\rightarrow\phi\mathbf{04}$)

The signal of the decimal key, $S_d$, additionally is used to copy *e* into the first character of the decimal point indication and one bits into the second character of the decimal point indication of the selected register. This is described by $d'=d\mathbf{12}(e+T\mathbf{9})+\ldots$ (FIG. 34)

$d\mathbf{12}=S_dC\mathbf{13\text{–}14}(KPk+Pkq+KPq)\phi\mathbf{00}+\ldots$ (FIG. 35)

The decimal point is therefore placed at the extreme left position of the register if $E=0$, and placed to the right of the last digit inserted if $E\neq 0$.

*Register sign placement.*—The two keys 116 and 118 set the sign of the selected register. The keys 118 and 116 produce signals, $S_+$ and $S_-$, illustrated in FIG. 4, which set a positive or negative sign into the selected registers in the rest state. The settings of the sign are described by $d'=d\mathbf{11}\underline{t}\mathbf{1}+\ldots$ (FIG. 34)

$d\mathbf{11}=\phi\mathbf{00}C\mathbf{12}S+(K\underline{P}k+P\underline{kq}+\underline{KP}q+\ldots$ (FIG. 35)

$d'=d\mathbf{13}\underline{t}\mathbf{3}+\ldots$ (FIG. 34)

$d\mathbf{13}=\phi\mathbf{00}C\mathbf{12}\underline{S}(K\underline{P}k+P\underline{kq}+\underline{KP}q)+\ldots$ (FIG. 35)

Figure 40:
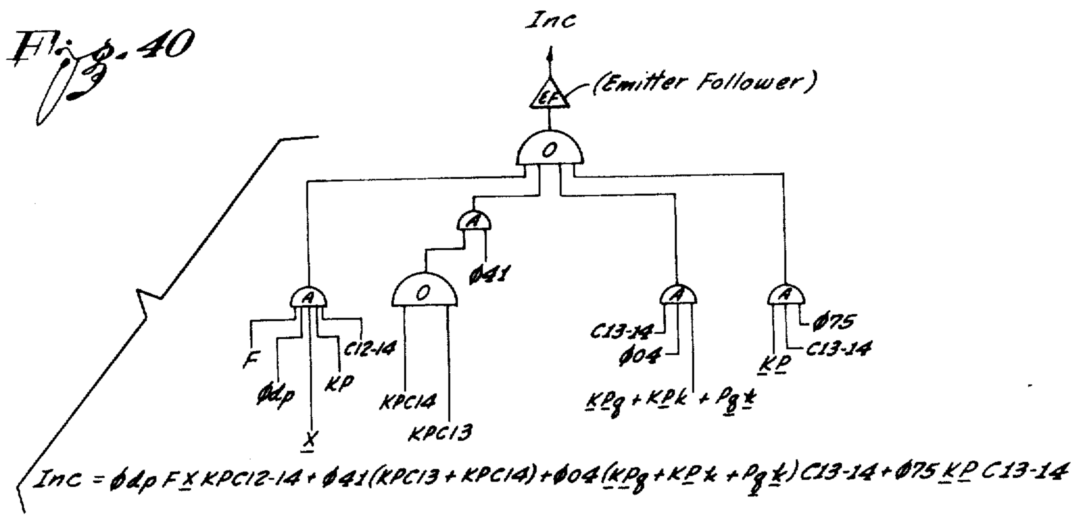
FIG. 40 is a block diagram of the circuitry used to produce the Inc. signal.

*Enter digit routine.*—The Enter Digit routine as shown in FIG. 13 has two active phases, $\phi\mathbf{04}$ and $\phi\mathbf{44}$. Approximately one full machine cycle is spent in these two phases together, namely from the time $KPC\mathbf{12}t\mathbf{1}_{+}$, when $\phi\mathbf{04}$ is entered, until the following time $KPC\mathbf{12}t\mathbf{1}_{-}$ when departure from $\phi\mathbf{44}$ takes place. Most of the machine cycle is spent in $\phi\mathbf{44}$ when a key is operated which enters a digit or a significant zero to the register. Most of the machine cycle is spent in $\phi\mathbf{04}$ when a non-significant zero, which is not recorded, is entered. Accompanying the recording of each digit is an increase in the number held in the four E flip-flops E1, E2, E3 and E4. Therefore, the number held in the four E flip-flops provides a count of the digits already recorded. If the number held in the four E flip-flops differs from zero then one or more digits have been recorded and at least one of these digits is other than zero. If $E\neq\mathbf{0}$, $\phi\mathbf{44}$ is entered promptly from $\phi\mathbf{04}$, so as to record the newly presented digit, whether it is a zero or not. If, however, $E=\mathbf{0}$ at the time of entry to $\phi\mathbf{04}$ a non-zero digit produces a prompt entry to $\phi\mathbf{44}$, and consequent recording, while a zero digit is not recorded. The four bits S1, S2, S3 and S4 representing a digit corresponding to the key being operated are presented in succession as a signal *s* as shown in FIG. 3. Closing a decimal digit key thus provides a direct binary coded decimal digit in each character period in which the key contact is closed. The four bits of the E flip-flops are presented as the signal *e*. If either signal *s* or *e* presents a one-bit, $\phi\mathbf{44}$ is entered promptly and the recording performed. If no One-bit occurs in either signal *s* or *e* for the remainder of the character period KPC12, then occupancy of $\phi\mathbf{04}$ is continued for nearly all of the available time. If $\phi\mathbf{04}$ is occupied as described above, an incrementation of the decimal character of the selected register is performed as described by Inc.$=\phi\mathbf{04}C\mathbf{13\text{–}14}(K\underline{P}k+P\underline{kq}+\underline{KP}q)+\ldots$ (FIG. 40)

Entry to $\phi$44 from $\phi$04 occurs within the character period KPC12 in the second half of any bit period if $e=1$ or $s=1$. Otherwise entry to $\phi$44 is delayed until the time KPC12$t$1$_-$, almost a full machine cycle later. The entry is shown by $$sU'=\underline{VW}b4KPC12(s+e+t1_-)+\ldots \text{ (FIG. 27) } (\phi04\rightarrow\phi44)$$

Departure from $\phi$44 occurs at the time KPC12$t$1$_-$, with a subsequent entry to $\phi$40 to await the release signal, R, to permit return to the rest state $\phi$00. The entry to $\phi$40 from $\phi$44 is via $\phi$45 and $\phi$41 as described later.

Therefore, if $E=0$ and the zero key is depressed $\phi$04 is entered at the time KPC12$t$1$_+$ and is occupied for very nearly a full machine cycle from KPC12$t$1$_+$ to KPC12$t$1$_-$ in the following cycle and occupancy of $\phi$44 is only for a fraction of a bit period. In any other situation following operation of a digit key $\phi$04 is occupied for some part of character period $\underline{\text{K}}$PC12 and $\phi$44 is occupied for the remainder of the time until KPC12$t$1$_-$ appears the next time.

When a digit is to be recorded during the occupancy of $\phi$44, the digit presented by the signal $s$ is set into the appropriate digit position of the selected register, K, Q, P, or K and Q. The selection of the appropriate digit position is made by incrementing the E flip-flops by one in each of the character periods PC0–11 in addition to other correcting incrementations. The selected character period is the one which follows the advance of the E flip-flops from 15 to 0. Flip-flop H is used in the incrementation, and remains "On" in the character period in which the recording is done.

Except in the case $\underline{kq}$ where the selected register is P, a correcting increment, of amount four, is made in each of the character periods $\underline{\text{P}}$C14. Therefore, the total increase in the E flip-flops in each half-cycle is by the amount 16, which is just sufficient to restore the E flip-flops to their initial value. A further correcting incrementation of one is made in the character period K$\underline{\text{P}}$C12, immediately before departure from $\phi$44. The E flip-flops are therefore advanced by one as a result of the cycle of occupancy of $\phi$44, and the next operation of a digit key places a digit in the next earlier or less significant digit position. If the P register is selected, the two correcting increments of amount four in $\underline{\text{P}}$C14 are replaced by a single correction of amount eight, at the time K$\underline{\text{P}}$C14. The E flip-flops, therefore, count up continuously through the series of the 24 digits of the P register. The counting in the E flip-flops is described as follows:

$$e'=e1(e\neq H)+\ldots \text{ (FIG. 37)}$$

$$e1=\phi44\underline{P}+\ldots \text{ (FIG. 37)}$$

$$sH=\phi44\underline{P}(C0\text{–}11t1+KC12t1+C14(k+q)t3+KC14\underline{kq}t4)+\ldots \text{ (FIG. 44)}$$

$$*\underline{H}=\phi44\underline{Pe}+\ldots \text{ (FIG. 44)}$$

$$rH=\phi44\underline{Pt}1\underline{K}C12+\ldots \text{ (FIG. 44)}$$

Recording in the K and Q registers is performed by replacing the signal $d$ with the signal $s$ as the input to the memory in a PC0–11 character period in which $H=1$. The condition $H=1$ indicates that there was an overflow in the counting-up of the E flip-flops. The recording is shown by $$M'=M11s+\ldots \text{ (FIG. 41)}$$

$$M11=\phi44HPC0\text{–}11(kK+q\underline{K})+\ldots \text{ (FIG. 41)}$$

Entry into the P register is performed by replacing the signal M with the signal $s$ as the input to the D flip-flops. No entry is made in the first eight digits of the P register since these would be duplications of entries made in the last eight digits. The first eight of the twelve pairs of character periods, C0–11, are marked $\underline{\text{T}}$12, the remaining four are marked T12. Therefore, entry to the P register is permitted at the times $(T12+K)$ which correspond to the last four digits appearing in the first half cycle and all the digits appearing in the second half cycle. The entry is described by $$d'=d8s+\ldots \text{ (FIG. 34)}$$

$$d8=\phi44HPC0\text{–}11(T12+K)\underline{kq}+\ldots \text{ (FIG. 35)}$$

Departure from $\phi$44 with entry to $\phi$40 via $\phi$45 and $\phi$41 will be described below. The entry to the rest state, $\phi$00, from $\phi$40 was described previously under Restore-P.

*Decimal point fixation.*—If the zero key is operated when E=O, entry to $\phi$44 is delayed for almost a full machine cycle as previously described. Also, $\phi$04 rather than $\phi$44 is occupied for almost a full machine cycle and the decimal character of the selected register is increased as described previously. Another consequence of the occupancy of $\phi$04 after the character period KPC12 is the setting "On" of the F flip-flop to fix the decimal point as described by $$sF=\phi04C13+\ldots \text{ (FIG. 38)}$$

The fixation of the decimal point prevents the clearance of the register, including the return of the decimal point to the standard position, on the next operation of a digit key. Another way in which the decimal point is fixed is by operating the decimal point key. The operation of the decimal point key is described by the term in the $s$F equation shown earlier, $\phi$00$S_{cd}S_d$. The decimal point key signal, $S_d$, also serves to copy the complement of the number held in the four E flip-flops into the decimal character of the selected register as described above.

A similar copying of $\underline{e}$ into the selected decimal character takes place after departure from $\phi$44 under the condition $\underline{\text{F}}$. The condition $\underline{\text{F}}$ is true if the position of the decimal point is not yet fixed. Phase $\phi$45 is used to record the decimal character and is entered at the time KPC12$t$1$_-$ as described by $$sZ=a4X\underline{Y}KPC12t1_-+\ldots \text{ (FIG. 32) } (\phi44\rightarrow\phi45)$$

Recording of the decimal character is shown by $$d'=d12(\underline{e}+\underline{T}9)+\ldots \text{ (FIG. 34)}$$

$$d12=\phi45\underline{F}\overline{C13}\text{–}14(K\underline{P}k+P\underline{kq}+\underline{KP}q)+\ldots \text{ (FIG. 35)}$$

Flip-flop I is reset in $\phi$45 to ensure escape from $\phi$41. Phase $\phi$41 is entered after about one machine cycle in $\phi$45. The setting of the I flip-flop and escape from $\phi$45 are described by $$rI=\phi45+\ldots \text{ (FIG. 39)}$$

$$rX=a4\underline{Y}ZK\underline{P}C12+\ldots \text{ (FIG. 30) } (\phi45\rightarrow\phi41)$$

Departure from $\phi$41 occurs immediately after entry, by reason of the condition $\underline{\text{I}}$. Phase $\phi$40 is then entered with a subsequent return to the rest state after the appearance of the release signal, R, as described earlier. Since $\phi$45 is occupied after phase $\phi$44 the number held in the E flip-flops during $\phi$45 is the number of significant digits thus far entered in a register. The number set into the decimal indication during $\phi$45 is 62 after one non-zero digit has been entered, 61 after two digits have been entered, and so on. Therefore, as an integer is set into a register by operating keys indicating successive digits starting from the most significant to the least significant the decimal point appears to the right of the digit last placed. If the decimal key is operated in the course of setting in a series of digits, the operation of the decimal key turns flip-flop F "On" and stops the automatic rightward progression of the flip-flop decimal point as digits are inserted. The fixation of the decimal point is revocable since a later operation of the decimal key brings the decimal point to a position to the right of the digit just placed.

*Register transfers.*—Two fast flip-flops, S and M, capture information from the delay line output as described earlier. The bits picked up in the M and S flip-flops at the beginning of each bit period are a working bit and its surrogate. The bits usually remain undisturbed throughout the bit period. The bits may, however, be modified during the Transfer Routine. The Transfer Routine makes use of phases $\phi$10 and $\phi$50, with a return to the rest state via $\phi$40. Phase $\phi$10 is used only to introduce a short delay, about 30 to 60 microseconds before the performance of the indicated transfer process.

Entry to $\phi$10 is at time $\underline{K}PC13t4$ on a signal from the transfer keys 120, 122, 124 and 126, from the Exchange memory key 132, from the Store memory key 130, or from the Recall memory key 128. Operation of any of the above keys produces a common signal, $X_c$, as shown in FIG. 4. Entry to $\phi$10 is decribed by $$sW=\underline{UV}b0\underline{K}PC13X_ct4+\ .\ .\ .\ (\text{FIG. 29})\ (\phi00\rightarrow\phi10)$$

Entry to and departure from $\phi$50 occurs at the time $\underline{K}PC13$ since no information of importance is held in either the S or M flip-flops during that character period. The entry to and departure from $\phi$50 are described by the following equations:

$$sU=\underline{V}Wb0\underline{K}PC13t2+\ .\ .\ .\ (\text{FIG. 27})\ (\phi10\rightarrow\phi50)$$
$$rW=U\underline{V}b0\underline{K}PC13t1+\ .\ .\ .\ (\text{FIG. 29})\ (\phi50\rightarrow\phi40)$$

The information transfer activities in $\phi$50 are controlled by signals from the various transfer keys and by signals from the register selection keys. The signal from the Store memory key 130 is denoted $M_s$, from the Recall memory key 128, $M_r$, and from the Exchange memory key 132, $M_x$, as illustrated in FIG. 4. These signals have effects during $\phi$50 in the character periods associated with the selected register, namely during $(K\underline{P}k+P\underline{kq}+\underline{KP}q)\phi50$.

The transfer keys also initiate actvities which are performed in $\phi$50. The signals from the transfer keys are denoted $T_{pq}$, $T_{pk}$, $T_{qp}$, and $T_{qk}$ as shown in FIG. 4. The first subscript indicates the register which has its contents transferred and the second subscript indicates the register to which the contents are transferred. The transfer takes place in the character periods in which the information to be transferred appears in the M flip-flop, namely KP for $T_{pq}$ or $T_{pk}$ and $\underline{KP}$ for $T_{qp}$ and $T_{qk}$. The donor register is cleared in the above three operations, and it is also cleared in the Store memory operation. In the Recall memory operation, however, the donor is a surrogate register which is not cleared. In the Store, Recall and Exchange memory operations the P register is treated as having 24 digits, while the K and Q registers are treated as having 12 digits each. In the transfer operations, $T_{pq}$, $T_{pk}$ and $T_{qp}$, transfer is from or to only the 12 most significant digit positions in the P register, and the remaining digit positions are cleared.

To effect the transfer from a first character position to a second character position when the second character position follows the first character position by *n* characters, D′ is made equal to M at a time which is 2*n* clock periods later than the time N3, at which time flip-flop M is set. The recording of M in D′ is performed in those character periods in which the information to be transferred is held in M. Specifically, those character periods marked $\underline{KP}$ are used to transfer the Q register and those character periods marked KP are used to transfer the P register. Since only the more significant half of the P register is transferred the transfer activity takes place only in the character periods marked KP, and not in those marked $\underline{K}P$. The number of character periods separating corresponding characters of the donor and recipient registers is shown, under the heading *n*, in the following table.

| Transfer From | Transfer To | Signal marked | n= | D′=M at time |
|---|---|---|---|---|
| P | Q | $T_{pq}$ | 29 | N63 |
| Q | K | $T_{qk}$ | 30 | N67 |
| Q | P | $T_{qp}$ | 31 | N69 |

To determine the name of the clock period, shown in the last column of the table above, in which M is recorded as D′, it must be remembered that the names N32, N33, N64 and N65 and the conditions which these names describe are not used. The transfer $T_{pk}$ is performed by setting $M'=M$ at the times $\phi$50KP.

In the transfer marked $T_{qp}$ the operation $D'=M$ is performed at all character periods marked $\underline{P}$. The character periods marked $\underline{P}$ include characters of the K register as well as the Q register. The bit set into D′ is given the value $\underline{K}M$ thereby setting the twelve least significant digits of the P register, and the spurious sign and decimal characters, $S_{\not{c}}$ and $D_{\not{c}}$, to zero. The clearance of the donor register is effected by clearing *d′* in the same character periods. These operations are described by $$D'=D7M+\ .\ .\ .\ (\text{FIG. 19});\ D7=\phi50)\ (T_{pq}KPN63$$
$$+T_{qk}KPN67+T_{qp}\ \underline{KP}N69)+\ .\ .\ .\ (\text{FIG. 19})$$
$$M'=M6M+\ .\ .\ .\ (\text{FIG. 41})$$
$$M6=\phi50T_{pk}KP+\ .\ .\ .\ (\text{FIG. 41})$$
$$d'=d11\ (t1C12+C13-14)+\ .\ .\ .\ (\text{FIG. 34})$$
$$d11=\phi50[P(T_{pq}+T_{pk})+\underline{KP}\ (T_{qp}+T_{qk})]+\ .\ .\ .\ (\text{FIG 35})$$

The Recall memory operation and part of the Exchange Memory operation are described by $$d'=d14S(\underline{T}4+\underline{T}5)+\ .\ .\ .\ (\text{FIG. 34})$$
$$d14=\phi50(K\underline{P}k+P\underline{kq}+\underline{KP}q)(M_r+M_x)+\ .\ .\ .\ (\text{FIG. 35})$$

The Store memory operation and part of the Exchange memory operation are described by $$sS=M[\phi50N126\text{–}127(K\underline{P}k+P\underline{kq}$$
$$+\underline{KP}q)(M_s+M_x)]+\ .\ .\ .\ (\text{FIG. 19})$$
$$rS=\underline{M}[\phi50N126\text{–}127(K\underline{P}k+P\underline{kq}$$
$$+\underline{KP}q)(M_s+M_x)]+\ .\ .\ .\ (\text{FIG. 19})$$
$$d'=d11(t1C12+C13\text{–}14)+\ .\ .\ .\ (\text{FIG. 34})$$
$$d11=\phi50(K\underline{P}k+P\underline{kq}+\underline{KP}q)M_s+\ .\ .\ .\ (\text{FIG. 35})$$

On the signal $M_x$ the content of flip-flop M is transferred into flip-flop S. This occurs after the prior content of flip-flop S is used in the signal *d′* to set flip-flop $D_e$ "On" in the fourth quadrant. To prevent any interference by the flip-flop M with the new value being set into flip-flop S during the last two microseconds of a bit period, the S term in the *d′* signal is made equal to $S(\underline{T}4+\underline{T}5)$. This allows the S term to disappear for the last 15 microseconds of the bit period while the prior content of flip-flop S may have set $D_e$ "On" in the preceding 15 microseconds.

*Number display.*—The desk calculator uses a cathode ray tube display. An electron beam within the cathode ray tube is controlled to produce the digits, decimal point and assorted symbols used by the desk calculator.

As illustrated in FIG. 1, four lines of numbers are displaced, showing the K, Q and P registers. The P register is divided into two lines having a left half of the P register on top and a right half of the P register underneath. Each line contains twelve digits and, except for the right half of the P register, four additional small zeros to the left of the twelve digits. The digits are formed during the times *t*3 and *t*4, and the small zeros during the time *t*2. In each character period of C0–11 during the time *t*2 a zero is formed, but may be suppressed, and then the electron beam is moved four digit positions to the right and a decimal digit is formed. A figure-eight pattern is used to form the general digits, the small zeros and, with a slight correction, the + or − sign which stands to the left of the digits.

Figure 47:
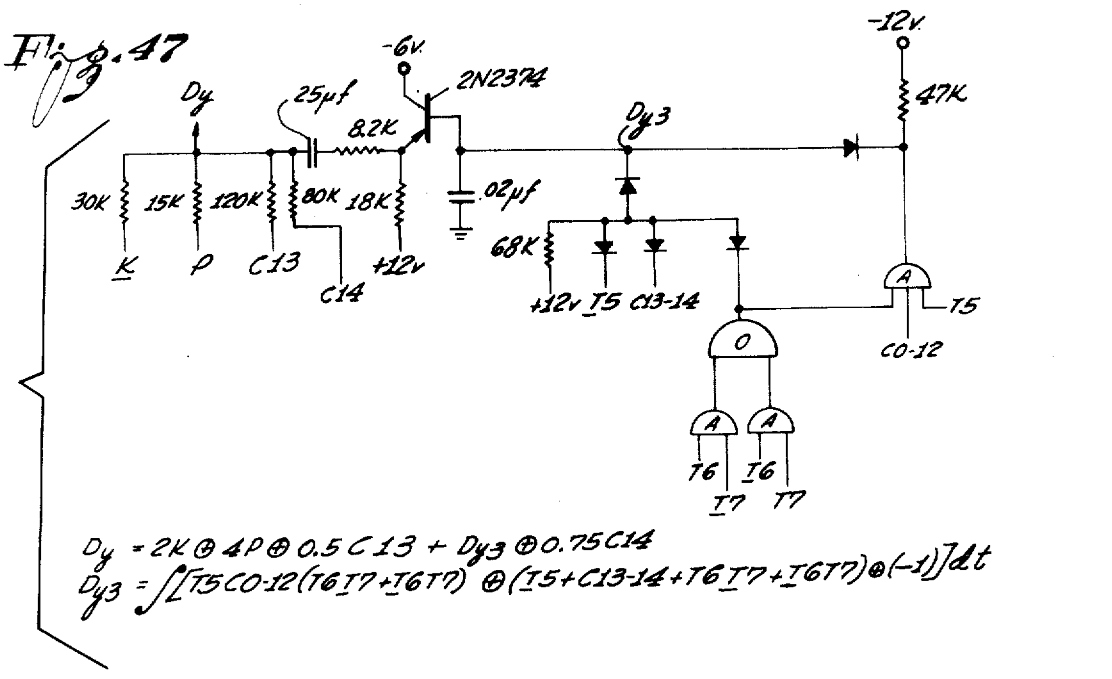
FIG. 47 is a diagram partly in block and partly in schematic form of the vertical deflection circuit for the cathode ray display unit of the desk calculator.

There is a downward vertical displacement of the electron beam which is produced by circuitry as shown in FIG. 47. The downward displacement is two character heights for $\underline{K}$ times in comparison with K times, and a further displacement of four character heights for P times compared with $\underline{P}$ times. Therefore, four lines of digits are formed equidistant from each other with the K register at the top, then the Q register, then the left and right hand halves of the P register. There are further small downward displacements in C13 and C14 when decimal points and streaks are formed. The significance of these streaks is described below. The digits and sign stand slightly above the decimal point in each line and the streaks are well below the numbers at the extremes of digit display.

Figure 48:
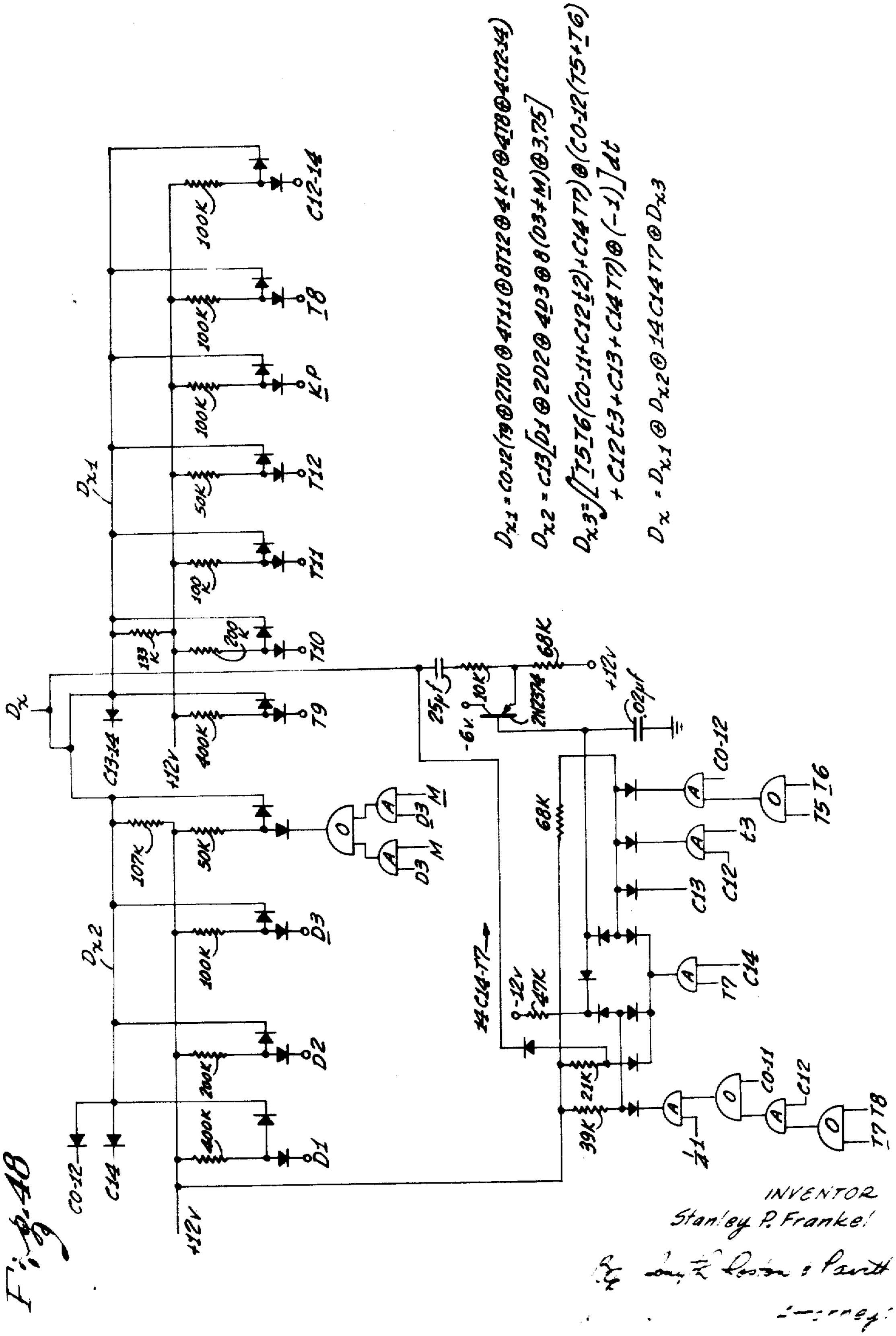
FIG. 48 is a diagram partly in block and partly in schematic form of the horizontal deflection circuit for the cathode ray display unit of the desk calculator.

Leftward horizontal displacement of the electron beam is produced by circuitry as shown in FIG. 48. The leftward displacement of the characters is by a distance of zero to eleven spaces, in times C0 to C11 respectively, plus an additional four spaces for the times $\underline{T8}$ when the small zeros are formed compared with the times T8 when the digits and signs are made, and a displacement of sixteen spaces for the sign. There is a further leftward displacement by four spaces for the right half of the P register so that the meaningless sign character of the right half of the P register is shifted off-scale to the left of the digits. The displacements are described by $D_y$ which refers to the downward displacement of the electron beam and $D_{x1}$ which refers to one part of the leftward displacement of the electron beam.

$$D_y = 2\underline{K} \oplus P \oplus 0.5C13 \oplus 0.75C14 \oplus \ldots \quad \text{(FIG. 47)}$$

The terms $0.5C13 \oplus 0.75C14$ provide the downward displacement for the decimal point and streaks.

$$D_{x1} = C0\text{–}12(T9 \oplus 2T10 \oplus 4T11 \oplus 8T12 \oplus 4\underline{K}P \oplus 4\underline{T}8 \oplus 4T11T12 \oplus 3.0) \quad \text{(FIG. 48)}$$

The term 3.0 provides a displacement with respect to the right streak discussed below. The symbol $\oplus$ refers to an analog addition rather than a Boolean operation and the numerical factors specify the weights of the several terms. The constants shown are only approximate and may be adjusted empirically. The expression $D_{x1}$ applies in the times C0–12. In the times C13–14 an entirely different mechanism determines the leftward displacement for the decimal point and streak display as described below. A decimal point is displayed at the time *t*4C13 when the four least significant bits of the decimal indication are available. During C13 the figure-eight pattern is stopped so that a point is formed rather than one or more line segments. The decimal points of registers Q, K, and P are displayed during the bit periods *t*4 of the three character periods, $\underline{KP}$C13, $\underline{K}P$C13, and KPC13. No display is made of the meaningless decimal point character $D_¢$ at the time $K\underline{P}$C13. To limit the display of the point to the bit period *t*4 and to prevent the display of $D_¢$ the electron beam is suppressed, in C13 character periods, at times called C13 $S_{dc}$ defined by $$C13S_{dc} = C13(t4 + \underline{K}P) = C13(\underline{T}8 + T7 + \underline{K}P)$$

The complete structure of the beam suppression system is shown in FIG. 49.

The position of the decimal point is determined by the four bits held in D1, D2, D3, and M flip-flops which represent the four least significant bits of the decimal character. The leftward position of the decimal point is proportional to the hexadecimal digit formed by the four bits except that the four values, 0, 1, 2 and 3 are presented to the left of the remaining twelve values. For the values 0, 1, 2, and 3 the point stands to the left of one of the four fixed small zeros which precede the twelve significant digits of a line. The leftward displacement of the beam at the time C13 is described by $$D_{x2} = (D1 \oplus 2D2 \oplus 4D3 \oplus 8(D3 \neq M) \oplus 3.75)C13 \quad \text{(FIG. 48)}$$

The four bits held in the flip-flops D1, D2, D3, and M D2, $\underline{D}3$, and $(D3 \neq \underline{M})$. The expression $D_{x2}$ is proportional to a four-bit number having the bits D1, D2, D3, and M in order of increasing significance except that the four values having $D3 = M = 0$ have the largest rather than the smallest values, as shown in the following table:

| D1 | D2 | D3 | M | $D_{x2}$ (omitting constant) |
|---|---|---|---|---|
| 0 | 0 | 0 | 0 | 12 |
| 1 | 0 | 0 | 0 | 13 |
| 0 | 1 | 0 | 0 | 14 |
| 1 | 1 | 0 | 0 | 15 |
| 0 | 0 | 1 | 0 | 0 |
| 1 | 0 | 1 | 0 | 1 |
| 0 | 1 | 1 | 0 | 2 |
| 1 | 1 | 1 | 0 | 3 |
| 0 | 0 | 0 | 1 | 4 |
| 1 | 0 | 0 | 1 | 5 |
| 0 | 1 | 0 | 1 | 6 |
| 1 | 1 | 0 | 1 | 7 |
| 0 | 0 | 1 | 1 | 8 |
| 1 | 0 | 1 | 1 | 9 |
| 0 | 1 | 1 | 1 | 10 |
| 1 | 1 | 1 | 1 | 11 |

The constant term, 3.75, serves to adjust the point position with respect to the decimal digits. In the above expression, as in the expressions $D_y$ and $D_{x1}$ shown earlier, the $\oplus$ sign represents an analog addition and the numerical factors specify the weights of the several terms.

The two most significant bits of the decimal indications are set into the flip-flops D1 and D2 during the C14 character periods. These two most significant bits for each register are used to provide two streaks below the line showing the K, Q, or the left hand half of the P register. One streak indicates that the true decimal point position is more than four places to the left of the normal position, and the other streak indicates that the true decimal point is more than eleven places to the right of the normal position. Neither streak is shown for numbers in which the decimal point is shown in the correct position. Numbers outside a range of 48 decimal point positions are regarded as improper and are displayed with both streaks. FIG. 50(*a*) to (*f*) illustrates the display of the decimal point in the desk calculator. FIGURE 50(*a*) shows the display of a register in the desk calculator after clearance. FIGURE 50(*b*) illustrates a number smaller than one and FIGURE 50(*c*) illustrates a number larger than one. In FIGURE 50(*d*) a streak is shown underneath the numbers at the left side of the row. The left streak indicates that the real position of the decimal point is sixteen places to the left of the decimal point shown in FIGURE 50(*d*). Correspondingly, the streak shown underneath the numbers at the right side of the numbers in FIGURE 50(*e*) indicates that the real position of the decimal point is sixteen places to the right of the decimal point shown in FIGURE 50(*e*). Improper numbers which are very large or very small are shown with two streaks as illustrated in FIGURE 50(*f*).

The four bits held in the flip-flops D1, D2, D3, and M at the times *t*4C13 are called $d^1$, $d^2$, $d^3$, and $d^4$, respectively, and are the first four of the six bits of the decimal point indication of a register. The remaining two bits, called $d^5$ and $d^6$, are presented by the M flip-flop during the corresponding bit periods *t1*C14 and *t*2C14 and are held in flip-flops D1 and D2 for four bit periods thereafter. The six bits of the decimal indication of the P register are given the subscript P and are designated $d_P^1, \ldots d_P^6$. Similarly, subscripts K and Q are used for the K and Q register. The entire six-bit number formed is called $D_P$, $D_K$, or $D_Q$ and is meaningful only modulo 64.

We consider another six-bit number, F, obtained by subtracting 4 from D. For example $$F_P = D_P - 4 \text{ (modulo 64)}$$

The six bits of the number are called $f^1$, $f^2 \ldots f^6$, and have appropriate subscripts P, K and Q identifying the particular register considered. The six bits of the number F are related to the six bits, $d^1 \ldots d^6$ as follows:

$$f^1=d^1$$
$$f^2=d^2$$
$$f^3=d^3+(d^3\neq 1)$$
$$f^4=(d^4\neq d^3)$$
$$f^5=(d^5\neq d^3d^4)$$
$$f^6=(d^6\neq d^3d^4d^5)$$

The directly displayed decimal point correctly indicates the true point position if the number F lies in the range 48 to 63, inclusive. Since F, like D, is meaningful only modulo 64, this range can alternatively be described as −16 and −1, inclusive. The above range of the F number corresponds to the range −12 to +3 for the number D. This normal range is recognized by the circumstance $f^5=f^6=1$. The two streaks which serve to qualify the decimal point display are suppressed for the normal range.

When the decimal point moves to the left out of the normal range by no more than 32 places the number F becomes positive as indicated by $f^6=0$. In this case the leftward streak is allowed to appear to indicate to the operator at the desk calculator that the true decimal point position lies sixteen places to the left of the point shown or that the number is improper. The condition for the suppression of the beam during the time of formation of the left streak is called $S_{LS}$ and is described by $$S_{LS}=f^6=(d^6\neq d^3d^4d^5)$$

When the decimal point moves to the right beyond the end of the normal range by no more than 32 places the value of the number F lies in the range −48 to −17, inclusive. In that range the bits $f^5$ and $f^6$ have opposite values, as described by the expression $f^5\neq f^6$. When $f^5\neq f^6$ the rightward streak is allowed to appear to indicate to the operator that the true decimal point lies sixteen places to the right of the point or that the number is improper. Therefore, the condition for the suppression of the beam, $S_{RS}$, during the formation of the right streak is $$S_{RS}=(f^6\neq \underline{f}^5)=(d^6\neq \underline{d}^3\underline{d}^4\underline{d}^5)\neq(\underline{d}^5\neq \underline{d}^3\underline{d}^4)$$

The above expressions may be simplified by algebraic manipulation. The product $\underline{d}^3\underline{d}^4$ is called $\underline{c}$ as an abbreviation. It can be shown that $$S_{RS}=(d^6\neq \underline{c}+\underline{d}^5)$$

and $$S_{LS}=(d^6\neq \underline{c\,d}^5)$$

When the decimal point is moved by thirty-two places in either direction from a position in the normal range, both streaks are displayed. At that time the number F lies in the range −32 to −17 or, what is equivalent in a six bit system, the range +32 to +47. This range of improper numbers in which both streaks are displayed is marked $f^6=0$ and $f^5=1$, or $\underline{c}=\underline{d}^5=d^6$. Such very large or very small numbers are not ordinarily used in arithmetic operations.

The signal $c$ is formed in flip-flop E5 during the C13 character periods of the rest phase as described by $$rE5=\phi 00C13t2+\ldots \text{ (FIG. 36)}$$
$$sE5=\phi 00M(t3_{+}+t4_{+})C13+\ldots$$
$$=\phi 00MT6T8C13+\ldots \text{ (FIG. 36)}$$

If $c=1$, flip-flop E5 is "On" at the end of C13, otherwise flip-flop E5 is "Off." The $c$-signal associated with the decimal position of the K register is formed in the above manner durng K$\underline{P}$C13; for the P register the $c$-signal is formed in KPC$\overline{1}$3, and for the Q register the $c$-signal is formed in $\underline{KP}$C13. A corresponding meaningless signal is formed in $\underline{K}$PC13. In order to keep the $c$-signal of the K register available for use in the character period K$\underline{P}$C14 it is copied into flip-flop E6 at the time K$\overline{P}$C13$t$1 as described by $$rE6=\phi 00PC13\text{–}14t1_{-}+\ldots \text{ (FIG. 36)}$$
$$sE6=\phi 00PC13\text{–}14t1E5+\ldots \text{ (FIG. 36)}$$

The above equations also describe a similar copying of the signal $c$ associated with the P register into flip-flop E6 at the time KPC14. It also describes the copying of the signal $c$ associated with the Q register into E6 at the time $\underline{K}$PC13 as well as the copying of a meaningless signal at the time $\underline{K}$PC14.

The left streak for each of the three registers is drawn during a bit period marked $t$3C14, and the right streak is drawn during a bit period marked $t$4C14. More specifically, the streaks for the K register are drawn during K$\underline{P}$C14, those for the P register are drawn during K$\overline{P}$C14, and those for the Q register are drawn during $\underline{KP}$C14. At the times $t$3 and $t$4 of K$\underline{P}$C14, KPC14 and $\underline{K}$PC14 the two most significant bits of the decimal point indication, $d^5$ and $d^6$, are held in flip-flops D1 and D2 respectively. Since the signal $c$ is copied into flip-flop E6 earlier, the conditions for beam suppression are written in the form $$S_{LS}=t3C14(D2\neq \underline{D}1\underline{E}6)$$
$$S_{RS}=t4C14(D2\neq(\underline{D}1+\underline{E}6))$$

The above quantities are formed with the help of an auxiliary signal called $h6$. The signal $h6$ is identical with the signal held in the flip-flop D1 except during the character periods C14. Specifically, $$h6\equiv D1C0-13+C14(t3(D1+E6)+t4D1E6)$$
$$\equiv D1(C0-13+E6+T7)+T7E6C14 \text{ (FIG. 25)}$$

The inequality of $h6$ and D2 is $$(h6\neq D2)$$

and the complement of the above expression is $$(h6\neq D2)$$

The condition for beam suppression during the times of formation of the streaks is now simply $(h6\neq \underline{D}2)$. The beam is always suppressed during the first half of a C14 character period, marked $\underline{T}$8, and at the time $\underline{K}$PC14. The entire expression for beam suppression during the character periods C13–14 is written as $$S_{dc}=C13(\underline{T}8+T7+\underline{K}P)+C14[\underline{T}8+\underline{K}P+(h6\neq \underline{D}2)]$$

The figure-eight pattern used in each digit display is formed of eight strokes. The eight strokes in each pattern are in the following sequence.

| Stroke | Time | Marked |
|---|---|---|
| Left | $\frac{1}{4}$1 (t2+t3) | T5T6T7 |
| Down | $\frac{1}{4}$2 (t2+t3) | T5T6T7 |
| Right | $\frac{1}{4}$3 (t2+t3) | T5T6T7 |
| Up | $\frac{1}{4}$4 (t2+t3) | T5T6T7 |
| Left | $\frac{1}{4}$1 (t1+t4) | T5T6T7 |
| Up | $\frac{1}{4}$2 (t1+t4) | T5T6T7 |
| Right | $\frac{1}{4}$3 (t1+t4) | T5T6T7 |
| Down | $\frac{1}{4}$4 (t1+t4) | T5T6T7 |

The figure eight is formed of two squares, an upper square which is traced in a clockwise direction (left, up, right, down) and a lower square which is traversed counterclockwise (left, down, right, up). Each square begins and ends at the right end of the center bar of the figure eight.

At the times $t$1 and $t$2, the figure eight is traced in the opposite order from that used at the times $t$3 and $t$4. First the upper square is traced (in $t$1), then the lower square (in $t$2). The beam is always suppressed for the upper square at the time $t$1, but the beam may or may not be suppressed at the time $t2$ depending on whether a small zero is to be formed. At the times $t3$ and $t4$, the figure eight is traced beginning with the lower square. The beam is always suppressed for the first leftward stroke, at the time $$\frac{1}{4}1t3$$

but the beam may or may not be suppressed in any one of the remaining seven strokes, depending on the digit to be presented. The first three bits of the digit are held in the D1, D2 and M flip-flops during the bit period $t3$. In the bit time $t4$ the third bit is held in D3 while M holds the fourth or most significant bit. The fourth bit serves to distinguish the zero digit from the eight digit and the one digit from the nine digit. The One digit is represented by the rightside of the figure-eight pattern, and the One digit differs from the Nine digit only in the upper square. Similarly, the Zero digit and the Eight digit are the same in the lower square since the leftward centerbar stroke at the bit time $t3$ is always suppressed. Using the arrangement described above, it is not necessary to know the fourth bit of the digit while the lower square is being traced during the time $t3$.

The complete structure of the beam suppression system has been shown in FIG. 49. The circumstances of beam suppression in the formation of decimal digits during $t3$ and $t4$ are shown in the table below:

| Stroke | Suppress for digits | Marked | During | Marked |
|---|---|---|---|---|
| Left | All | | $\frac{1}{4}1t3$ | $\underline{T}5\underline{T}6T7T8$ |
| Down | 1,3,4,5,7,9 | $D1+\underline{D}2M$ | $\frac{1}{4}2t3$ | $T5\underline{T}6T7T8$ |
| Right | 1,4,7,9 | $D1\underline{D}2\underline{M}+D1D2\underline{M}+\underline{D}1\underline{D}2M$ | $\frac{1}{4}3t3$ | $\underline{T}5T6T7T8$ |
| Up | 2 | $\underline{D}1D2\underline{M}$ | $\frac{1}{4}4t3$ | $T5T6T7T8$ |
| Left | 0,1,7 | $\underline{D}2\underline{D}3\underline{M}+D1D2D3$ | $\frac{1}{4}1t4$ | $\underline{T}5\underline{T}6\underline{T}7T8$ |
| Up | 1,2,3,7 | $D1\underline{D}3\underline{M}+D1D2+D2\underline{D}3$ | $\frac{1}{4}2t4$ | $T5\underline{T}6\underline{T}7T8$ |
| Right | 1,4,6 | $D1\underline{D}2\underline{D}3\underline{M}+\underline{D}1D3$ | $\frac{1}{4}3t4$ | $\underline{T}5T6\underline{T}7T8$ |
| Down | 5,6 | $D1\underline{D}2D3+\underline{D}1D2D3$ | $\frac{1}{4}4t4$ | $T5T6\underline{T}7T8$ |

In the formation of small zeros in the first half of a C0–11 character period, the beam is suppressed at the time $t1$. It is also suppressed in the first eight of the twelve character period pairs, marked $\underline{T}12$, and in $\underline{K}P$ character periods. Altogether the circumstances for beam suppression during C0–11 are denoted $S_{dd}$ and described as follows:

$$\begin{aligned}S_{dd}=&[\delta T8+\underline{T}8(\underline{KP}+\underline{T}12+\underline{T}7)]C0\text{–}11 \text{ or } [\underline{T}5\underline{T}6T8\\&(T7+\underline{D}2\underline{D}3\underline{M}+D1\underline{D}2D3)+\underline{T}8(\underline{T}12+\underline{KP}+\underline{T}7)\\&+D1\underline{T}6T7T8+D1\underline{D}2D3T5T6\underline{T}7T8\\&+(D2+\underline{T}5)\underline{D}1D3T6\underline{T}7T8\\&+(D1+\underline{D}3)D2T5\underline{T}6\underline{T}7T8\\&+MT7T8(D1D2\underline{T}5+\underline{D}1\underline{D}2\underline{T}5+\underline{D}2\underline{T}6)\\&\underline{M}T8(\underline{D}1D2T5T6T7+D1\underline{D}2\underline{T}5T7+D1\underline{D}2\underline{D}3\underline{T}5\\&+D1\underline{D}3T5\underline{T}6)]C0\text{–}\overline{11}\end{aligned}$$

In the character periods C12 the signs of the K, Q, and P register are presented and are displayed during the times $t3$ and $t4$ with the use of a slightly modified figure-eight pattern.

At the time $\underline{K}PC12$ the character $S_¢$ is presented and is displayed as if it were a true sign. However, the leftward shift of the righthand half of the P register removes $S_c$ from the visible area. In the time C12, unlike the times C0–11, the beam is not suppressed for the leftward stroke in $$\frac{1}{4}1t3$$

It is also not suppressed in $$\frac{1}{4}1t4$$

The two leftward strokes together form the minus sign which also serves as a part of the plus sign. This minus sign has twice the width of the center bar of the figure-eight pattern by reason of a horizontal displacement introduced between these strokes. More precisely, the usual rightward displacement at the time $$\frac{1}{4}3t3$$

is omitted, so that the upward stroke in $$\frac{1}{4}4t3$$

is superimposed on the downward stroke in $$\frac{1}{4}2t3$$

The plus sign is displayed if $D1=0$ and the minus sign is displayed if $D1=1$. Whenever $D1=0$ the beam remains unsuppressed in the fourth quadrants of the times $t3$ and $t4$ of C12 to form the vertical bar. When $D1=1$ the beam is suppressed in $$\frac{1}{4}4$$

For both plus and minus signs the beam is suppressed in $$\frac{1}{4}2 \text{ and } \frac{1}{4}3$$

Beam suppression in C12 is described by $S_{sc}$, as $$S_{sc}=\left(\frac{1}{4}2+\frac{1}{4}3+D1\frac{1}{4}4\right)C12$$

The circumstances of beam suppression during the time C13–14 have been described earlier. The full expression for the conditions of beam suppression is $$\text{Supp.}=S_{dd}+S_{sc}+S_{dc}$$

The figure-eight pattern may be described for character periods C0–11 as follows: Leftward motion in $\underline{T}5\underline{T}6$, Rightward in $\underline{T}5\underline{T}6$, Upward in $T5(T6=T7)$, Downward in $T5(T6\neq T7)$. In C12 the rightward motion in $$\frac{1}{4}3t3$$

is to be omitted as indicated earlier. To compensate, the leftward motion in $$\frac{1}{4}1t2$$

is also omitted. In C13 all of the figure-eight motions are stopped. In C14 there is a leftward motion during T7, rightward in $\underline{T}7$, to form the two streaks which show decimal point positions beyond the normal range. Altogether, the motions forming the figure-eight are:

Left motion in $\underline{T}5\underline{T}6(C0-11+C12t2)+C14T7$
Right Motion in $\underline{T}5T6(C0-11+C12t3)+C14\underline{T}7$
Upward Motion in $T5(T6T7+\underline{T}6\underline{T}7)C0-\overline{12}$
Downward Motion in $T5(T6\underline{T}7+\underline{T}6T7)C0-12$ The expression for leftward motion is formed in logic as shown above. The logic circuitry indicating leftward motion delivers to a capacitor a current of amount +1, in appropriate units, when leftward motion is required and of amount 0 when it is not. A second circuit delivers current of amount 0 at the times when rightward motion is required and +1 when no rightward motion is required. By reason of the interchange of current values this second circuit may be described as representing the complement of the condition for rightward motion given above. The sum of these two currents has the value 0 for rightward motion, +1 for no motion, and +2 for leftward motion. A third circuit delivers to the capacitor a constant current of amount −1; that is, of unit magnitude and of direction opposite to that of the first two circuits. The total current entering the capacitor is thus +1 when leftward motion is required, −1 when rightward motion is required, and 0 when no motion is required. The potential across the capacitor, which is proportional to the integral with respect to time of this total current, provides a contribution to the total leftward displacement called $D_{x3}$. It is thus described by $$D_{x3}=\int[(\underline{T}5\underline{T}6(C0\text{–}11+C12t2)+C14T7) \oplus(C0\text{–}\overline{12}(T5+\underline{T}6)+C12t3+C13+C14T7\oplus(-1)]dt$$

In the same fashion a component of downward displacement, called $D_{y3}$, is formed as the time integral of the sum of three currents. One indicates the circumstances of downward motion described above. The second indicates the complement of the circumstances of upward motion as described above. The third has the constant value, −1. Thus $$D_{y3}=\int[T5C0\text{–}12(T6\neq T7)\oplus(T5 +C13\text{–}14+(T6\neq T7))\oplus(-1)]dt$$

The complete expressions for the leftward and downward displacements of the electron beam are denoted $D_x$ and $D_y$ respectively, and are given by $$D_x=D_{x1}\oplus D_{x2}\oplus D_{x3}\oplus 19C14T7$$
$$D_y=2\underline{K}\oplus 4P\oplus D_{y3}\oplus 0.5C13\oplus 0.75C14$$

TYPICAL CIRCUITS

FIG. 51 is a schematic diagram of a clock generator 400 which may be used for the clock generator $C_p$ shown in FIG. 17. The portion 402 of the clock generator shown within the dotted lines is a standard free running multivibrator. The clock generator is unique in that the multivibrator is free running only when the enable $C_p$ input is true. The enable $C_p$ input becomes false during the dead portion of time denoted N0 and N1 as described earlier. During the dead period the multivibrator is biased by the false input to a metastable state to disable the multivibrator. The stability of the multivibrator is not absolute. After a particular period of time the false enable $C_p$ input is dissipated by an R-C circuit, including a resistor 404 and a capacitor 406, to a reference potential such as ground, and the multivibrator 402 reverts to a free running state.

A basic flip-flop circuit 410 is shown in FIG. 52 and has both set (*s*) and reset (*r*) inputs. The flip-flop itself may be of any conventional type such as Eccles-Jordan bistable multivibrator or a direct coupled bistable multivibrator as shown in FIG. 52. The flip-flop 410 illustrated in FIG. 52 may be used for all the flip-flops in the desk calculator which require set and reset inputs. These flip-flops are U, V, W, X, Y, Z, **D*e*, E*e*, E1, E2, E3, E4, F, G, M**, $D_L$, *k* and *q*.

FIG. 53 illustrates a flip-flop 412 which includes the basic flip-flop 410 of FIG. 52 but additionally has a clocked complement (*c*) input. When the complement input is true, the flip-flop 412 changes its state after the appearance of a clock signal. FIG. 53 specifically shows flip-flop J as an example and uses the signal $\underline{\mathbf{T6}}$ as the clock signal. Other flip-flops may use different clock signals. The circuit shown in FIG. 53 may be used for flip-flops J, E5, E6, D1, D2 and D3. In addition some of the flip-flops in the desk calculator are constructed with the circuit shown in FIG. 53 but do not incorporate all of the inputs. For example, flip-flop T9 only has set (*s*) and complement (*c*) inputs and flip-flops K, P,T0, T2, T3, T4, T5, T6, T10, T11 and T12 have a complement (*c*) input.

FIG. 54 illustrates a flip-flop 414 which includes the basic flip-flop 410 of FIG. 52 but additionally has clocked star (*) inputs. The star (*) inputs are similar to the set (*s*) and reset (*r*) inputs except that the change in the state of the flip-flop 414 takes place after the appearance of a clock signal. FIG. 54 specifically shows flip-flop H as an example and uses the signal $\underline{\mathbf{T6}}$ as a clock signal. Other flip-flops may use different clock signals. The circuit shown in FIG. 54 may be used for flip-flops D4 and S. In addition, other flip-flops in the desk calculator are constructed with the circuit of FIG. 54 but do not incorporate all of the inputs. For example, flip-flop I only has set (*s*), reset (*r*) and *$\underline{\text{I}}$ inputs, and flip-flops C, T1, T7 and T8 only have both the star (*) inputs.

The "And" and "Or" gates used in the desk calculator may be standard diode gates. The Inverters and Emitter Followers may be of standard transistor construction in order to save space and power consumption in the desk calculator.

*Synchronous logic embodiment.*—For the sake of simplicity and limitation of the number of components, the circuitry of the desk calculator described in the foregoing was based mainly on asynchronous logic; however, it should be noted that the desk calculator may also be designed using mainly synchronous logic—that is, with the exception of flip-flops used in capture of delay line information, all flip-flops being constrained to change state only upon incidence of a clock pulse (the clock pulses not being the same for all flip-flops) even though circumstances for controlling the change to that state might be favorable at a much earlier time.

In this alternative arrangement, then, only flip-flops M and $D_L$ are of the type shown in FIG. 52, all others being of the types shown in FIGS. 53 and 54, with the further exception that the direct-coupled inputs (*r*) and (*s*) are not present.

With respect to the logic expressions presented in the foregoing description, the consequences of this change are of the nature of timing changes alone, for the most part. For example, whereas the setting of flip-flop F in the Delay-P phases was previously timed by appearance of the signal KPC13, it is now timed by the signal $\underline{\mathbf{T6}}$ in conjunction with the signal $K\underline{P}C13t4$. Similarly, whereas the setting of I in the Advance-Q phases previously occurred upon appearance of the signal $\underline{KP}C13t1$, the same setting now occurs upon appearance of signal $\underline{\mathbf{T6}}$ during character period $\underline{K}PC12$. It is thus seen that the flip-flop change of state occurs at essentially the same time, but the control signals are different, corresponding generally to the end of the character period immediately preceding that formerly used to time the change.

Some flip-flop changes of state are now timed to occur at the middle of a bit period. As an example, in the incrementation process of the Delay-P phases, the resetting of I formerly performed asynchronously at time *t1* is now performed under control of a clock signal (such as T6, for example) which appears toward the middle of a bit period. Flip-flop F and H are also set (or reset) at the middle of a bit period under certain circumstances. Such differences in clock times can be differentiated by referring to all clocked inputs occurring at the middle of a bit period as "grid" (#) inputs. The F, H, and I flip-flops have grid inputs in the synchronous logic system, these inputs being denoted by a "grid" mark alongside the appropriate gate in the respective figure for each of the above three flip-flops.

An important by-product of the change to synchronous logic is the elimination of flip-flops $D_e$ and $E_e$. These are no longer needed to permit the bit presented in M in one bit period to be held for entry to the D or E register flip-flops early in the next bit period. Thus, instead of being changed near the beginning of the following bit period, the D flip-flop states are now changed at the end of corresponding bit periods according to the expressions, (similar for E):

$$*D1=d't1,\quad *\underline{D}1=\underline{d}'t1$$

$$*D2=d't2,\quad *\underline{D}2=\underline{d}'t2$$

$$*D3=d't3,\quad *\underline{D}3=\underline{d}'t3$$

$$*D4=d't4,\quad *\underline{D}4=\underline{d}.t4$$

Another by-product is elimination of restriction to a single flip-flop change for each step in a routine. This restriction was required by the asynchronous logic to prevent race conditions. As examples of the consequences of elimination of this restriction, in the Multiply Routine, entry to $\phi$32 from $\phi$16 is now effected directly rather than via $\phi$12, and in the Add-Substract Routine, is the delay number is zero, entry to $\phi$14 from $\phi$01 is immediate rather than through $\phi$11 and $\phi$15 as in the system with asynchronous logic.

Yet another by-product is elimination of the need for provision of a delayed common switch signal $S_{cd}$ to allow time for pre-clearance before exit to $\theta$04 from $\theta$00. This function is now provided by use of flip-flop J in $\theta$00 to control preclearance, as follows:

The preclearance is effected by direct intervention in the state of flip-flop M, which is forced to the value Zero at times ($t$1C12+C0–11) and to the value One at times ($t$1C12+C13–14) in character periods corresponding to the selected register, controlled by the signal $$(\underline{KP}q+K\underline{P}k+P\underline{kq})$$

Flip-flop J is set on in phase $\theta$00 and remains on for one complete machine cycle. Preclearance occurs during that machine cycle, which may be spent in any of the phases $\phi$00, $\phi$04, or $\phi$44. The condition for the preclearance process may without harm be extended to phase $\phi$40 as well, and the phases may then be distinguished by the term $\underline{VWYZ}$. Preclearance is thus described by $$sM=(t1C12+C13\text{–}14)VWYZJ(KPq+KPk+Pkq)+\ldots$$

$$rM=(t1C12+C0\text{–}11)VWYZJ(KPq+KPk+Pkq)+\ldots$$

Flip-flop J is set on at the time $K\underline{P}C12t4$ in phase $\phi$00 if $F+E=0$ when any one of the digit keys or decimal point key is operated, as indicated by the common key signal, $S_c$. This setting is described by:

$$*J=KPC12t4S_cFE1E2E3E4+\ldots$$

If the decimal point key was the one operated, as indicated by presence of the signal $S_d$, then preclearance takes place in phase $\phi$00 during the machine cycle in which $J=1$. During that time flip-flop F is set on and at the end of the machine cycle J is turned off, as shown by:

$$*F=\phi00J+\ldots$$

$$*J=\phi00KPC12t4+\ldots$$

The above description of changes attendant upon conversion to synchronous logic gives typical information and, though not complete in every detail, the information is sufficient to render obvious any details not covered.

While a particular embodiment of the invention has been shown and described, modifications may be made, and it is intended in the claims to cover all such modifications as fall within the spirit and scope of the invention.

What is claimed is:

1. In combination for use in an electronic desk calculator, a delay line of the type having a length dependent on temperature, said delay line having first and second ends and being constructed to hold a first plurality of bits of information and to receive bits of information at the first end of the delay line for passage through the delay line, the bits of information being produced again at the second end of the delay line after said passage;

means operatively coupled to the delay line for introducing into the delay line at the first end a second plurality of bits of information, the maximum number of bits in said second plurality being less than the number of bits in said first plurality, and a marker bit preceding the bits of information and being substantially identical to the information bits;

conditionally-enabled means responsive to the production of the second plurality of information bits and the marker bit at the second end of the delay line for reintroducing such bits at the first end to obtain a recirculation of the marker bit and the bits of information through the delay line with a minimum dead time in each recirculation dependent upon the difference between the number of bits in the first plurality and said maximum; and timing means responsive to production of the marker bit at the second end of the delay line for enabling said conditionally-enabled means for a time just sufficient to allow the maximum number of information bits in the second plurality to be produced at said second end in each such recirculation.

2. A delay line recirculating memory as defined in claim 1, wherein said timing means responsive to production of the marker bit include ordinal means for discriminating said marker bit.

3. In an electronic calculator having a delay line memory as defined in claim 1, wherein said memory holds at least one plural digit value, said memory comprising:

a transducer for entering a plural digit value in said memory, each said digit having a corresponding ordinal weighting;

a transducer for reading said value, and means interconnecting said transducers for said recirculation of said value in the delay line, and further including:

displacement means for discriminating the ordinal weighting of successive digits of said value, one digit being discriminated for each pass of the complete contents of memory past said reading transducer; and a cathode ray tube operable under control of said displacement means for continuously displaying said successive digits.

4. An electronic calculator as defined in claim 3 in which the delay line memory recirculates a plurality of discrete values, together with additional displacement means for displaying said values in discrete areas of the tube.

5. An electronic calculator as defined in claim 3 having means for entering sign and decimal point location information in said delay line and means responsive to said information for displaying said information relative to said value on the display tube.

6. In combination for use in an electronic desk calculator, a delay line having first and second ends and constructed to hold a first plurality of bits of information based on the time delay of the line and on a predetermined clock signal rate and to receive bits of information at the first end of the delay line for passage through the delay line, the bits of information being produced again at the second end after said passage;

first means operatively coupled to the delay line and responsive to clock signals for initially introducing to the first end of the delay line a second plurality of bits of information, the maximum number of bits in the second plurality being less than the number of bits in said first plurality of bits, and also for initially introducing to the delay line a marker bit preceding the information bits in the second plurality and being substantially identical to said information bits;

second means operatively coupled to the second end for receiving the marker bit and the bits of information in the second plurality after passage of such bits through the delay line, third means operatively coupled to the second means and to the delay line, and also responsive to said clock signals, for reintroducing to the first end of the delay line the signals received by the last mentioned means;

a clock generator having a metastable state in the absence of reception of any bits by said second means, departure from said metastable state resulting in production of said clock signals periodically recurring at said predetermined rate only during the reception of the bits of information by the second means; and fourth means, operatively coupled to the clock generator and to the second means, for causing departure from said metastable state in response to reception of the marker bit by the second means.

7. In the electronic desk calculator set forth in claim 6, fifth means for providing electronically controlled arithmetic operations, sixth means operatively coupled to the second and fifth means for performing said arithmetic operations on the bits of information in the second plurality, only in response to in response to production of clock signals.

8. In an electronic calculator having a delay line memory, said memory having a capacity to store a predetermined quantity of plural digit values;

a transducer for entering said plural digit values in said memory, each said digit having a corresponding ordinal weighting;

a transducer for reading said values, means interconnecting said transducers for recirculating said values in the delay line, displacement means for discriminating the ordinal weighting of successive digits of said values, one digit being discriminated for each pass of the complete contents of memory past said reading transducer; and a cathode ray tube operable under control of said displacement means for continuously displaying successive digits of a discrete quantity of said values, said predetermined quantity of recirculating values being at least twice the discrete quantity of values displayed; and switching means for eliminating particular ones of the first displayed values from said display tube and for displaying particular ones of the previously non-displayed values.

9. In an electronic calculator having a delay line binary memory, a single input transducer, and a single output transducer, a multivibrator for generating clock pulses, said multivibrator normally oscillating between a first and a second state, means for temporarily holding said multivibrator in said first state, a normally disabled counter driven by the multivibrator for generating a predetermined number of counts, means for entering a marker pulse in said memory, means for releasing the multivibrator from said first state and for enabling said counter in response to production of the marker pulse by said output transducer, a value entry mechanism for generating pulses representative of a selected digital value, means responsive to said value entry mechanism and to said multivibrator, when in its second state, to cause the input transducer to enter value-representative pulses into said delay line behind the marker pulse, means responsive to a discrete count in said counter for operating said means for holding said multivibrator in said first state, and marker pulse discriminating means comprising means responsive to said multivibrator in the first state and to the first pulse produced by said output transducer thereafter.

10. An electronic calculator as defined in claim 9, in which the delay line timing length is variable between the time of holding the multivibrator in said one state and the time of arrival of the marker pulse at the output transducer.

11. An electronic calculator as defined in claim 9, together with pulse means for introducing an initial marker pulse, said pulse means having a delay time greater than the normal dead time of the multivibrator, said dead time corresponding to the time difference between the holding of the multivibrator in its first state and the arrival of the marker pulse at the output transducer.

12. An electronic calculator as defined in claim 9, in which the marker pulse and the binary "one" value representative pulses are substantially identical.

References Cited

UNITED STATES PATENTS

| | | | |
|---|---|---|---|
| 3,328,763 | 6/1967 | Rathbun et al. | 340—172.5 |
| 3,324,456 | 6/1967 | Brown et al. | 340—172.5 |
| 3,309,671 | 3/1967 | Lekven | 340—172.5 |
| 3,302,176 | 1/1967 | McLaughlin | 340—172.5 |
| 3,289,174 | 11/1966 | Brown et al. | 340—172.5 |
| 3,289,171 | 11/1966 | Scherr et al. | 340—172.5 |
| 3,275,993 | 9/1966 | Bartlett et al. | 340—172.5 |
| 3,273,131 | 9/1966 | Strohm et al. | 340—172.5 |
| 3,231,867 | 1/1966 | Bartlett et al. | 340—172.5 |
| 3,223,981 | 12/1965 | Fischer | 340—172.5 |
| 3,219,802 | 11/1965 | Frank et al. | 340—172.5 |
| 3,164,817 | 1/1965 | Fleming | 340—172.5 |
| 3,156,815 | 11/1964 | Smeltzer | 340—172.5 |
| 3,107,344 | 10/1963 | Baker et al. | 340—172.5 |
| 3,064,241 | 11/1962 | Schnider | 340—172.5 |
| 2,978,680 | 4/1961 | Schulte | 340—172.5 |
| 2,978,679 | 4/1961 | Dieterich | 340—172.5 |
| 2,831,179 | 4/1958 | Wright et al. | 340—172.5 |
| 2,783,455 | 2/1957 | Hindall | 340—173 |

GARETH D. SHAW, Primary Examiner

U.S. Cl. X.R.

235—160

UNITED STATES PATENT OFFICE

CERTIFICATE OF CORRECTION

Patent No. 3,518,629 Dated: June 30, 1970

Stanley P. Frankel

It is certified that errors appear in the above-identified patent and that said Letters Patent is hereby corrected as shown below:

Change: Col. 6, line 13, "Y" to -- Y --. Col. 9, line 62, "T1" to -- T- --. Col. 12, line 58, "t1" to -- t1 --; line 63, equation for "sM", "t1" to -- t1 --. Col. 13, line 36, "Fig. 13" to -- Fig. 33 --; line 52, "P" to -- P --. Col. 14, line 75, "t12+C14" to -- t12C14 --. Col. 15, lines 2 & 7, "t12+C14" to -- t12C14 --; line 3, "$K_k$" to -- $D_k$ --; line 4, "KP" & "t12+C14" to -- KP -- & -- t12C14 --. Col. 16, line 30, "light" to -- digit -- & "K" to -- K --; line 54, "ø13", first occurrence, to -- ø15 --; line 74, "X" to -- X --; line 75, "MO" to -- MO --. Col. 17, lines 2 & 16, "X" to -- X --; line 17, "eo" to -- eo --; line 41, "5d" to -- e5d --; line 65, "I" to -- I --. Col. 18, lines 24 & 34, "t1+" to -- $t1_+$ --; line 66, "øOz" to -- ø03 --. Col. 19, line 4, "405,07)" to -- ø05,07) --; line 5, "sX =" thru "05,07)" to -- sW = UVXZKPC0t4E6(E4+E5)+ ... (Fig. 29) (ø01,03→ø11,13) --; line 18, "E6t3(F1" to -- E6E5t3(E1 --; line 61, insert after "(Fig. 37)", second occurrence, -- (First advance-P cycle) --; line 74, "C13-13" to -- C13-14 --. Col. 20, line 17, "d6a" to -- d6d --; line 34, "ZK" to -- ZFK --; line 63, "e4d" to -- e4d -- & "P" to -- P --. Col. 21, line 3, "F" to -- F --. Col. 22, lines 23 & 25, "P" to -- P --; line 50, "(M≠5)+" to -- (M≠I)+ --. Col. 23, line 59, "$t4c_+$" to -- $t4_+$ --. Col. 24, lines 40 & 46, "*C" to -- *C --; line 58, "cD3" & "$P_b$t1" to -- cD3 -- & -- $PC_b$t1 --; line 59, "*D4" to -- *D4 --; line 72, "FM 25" to -- FM ø25 --; line 73, "(d+F)" to -- (d+F) --. Col. 25, line 24, "$C_b$1C)" to -- $C_b$t1C) --; line 39, "ø27" to -- ø25 --; line 41, "ø25eP" to -- ø25eP --. Col. 26, line 44 (sixth equation of set), "cD2" to -- cD3 --. Col. 27, line 16, "Cbt1" to -- $C_b$t1 --; line 21, "t1C)+" to -- t1C)D2+ --. Col. 28, line 40, "KPC14" to -- KPC14 --; line 42, after "dh2", "(e≠P)" to -- (e≠P) --; line 46, 'KPC14" to -- KPC14 --; line 56, "(P≠E5)" to -- (P≠E5) --. Col. 29, .ine 25, "KPC0" to -- KPC0 --; lines 43 & 48, "KPC0" to -- KPC0 --. :ol. 30, line 41, "$P_p$" to -- $D_p$ --; lines 53 & 55, "KPC14" to - KPC14 --; line 57, "(E6H)" & "t1" to -- (E6≠H) -- & -- t2 --; ine 59, "KP11" to -- KPC11 --. Col. 31, line 8, "dK" to -- dK --; ine 33, "V = UW" to -- V = UW --; line 50, "dp" & "U" to -- ødp -- -- U --. Col. 32, line 3, "(e≠H)" & "KP" to -- (e≠H) -- & - KP --; lines 4, 6, & 8, "PC" to -- PC --; line 7, "KPC1-11e" to - KPC1-11e --. Col. 33, line 11, "2(e≠H)" to -- e2(e≠H) --; line 7, "XZ" to -- XZ --; line 38, "rV" & "UW" to -- rV -- & -- UW --; ine 53, insert "as shown by" after the equation; line 54, "$b_J$" & t1-T5" to -- b0 -- & -- t1_T5 --; line 75, "J" to -- J --. Col. 4, line 13, "K" to -- K --; line 24, "YZK" & all six "E"'s to - YZK -- & -- E --; line 39, "d'd10" to -- d' = d10 --. Col. 35, ine 51, "rU" to -- rZ --. Col. 36, line 65, "xX" to -- rX --; ine 72, "P" to -- P --. Col. 37, line 74, "U" & all three "E"'s o -- U -- & -- E --. Col. 38, line 1, "E5" to -- E5) --; line 12, P" & "IU" to -- P -- & -- IU --; line 18, "UV" & "K" to -- UV -- -- K --; line 27, "K" to -- K --; line 31, "sw" to -- sW -- & "K" o -- K --; line 39, "K" to -- K --; line 41, "YZK" to -- YZK --; ine 44, "K" to -- K --; line 47, "(d+1)" to -- (d+I) --; lines 9-50, "pe-ior," should be -- per-iod, --; line 72, "C13-14→" to - C13-14+ --. Col. 39, line 43, "M5-ø71P" to -- M5 = ø71 KP --; ine 64, "P" to -- P --. Col. 40, line 14, "$C_h$" to -- $C_b$ --; line ), "sZ" to -- sZ --. Col. 41, line 5, "$C13_+$" to -- $C13tl_+$ --; ine 11, "rw = UVb7+" to -- rW = UVb7P+ --; line 17, "J" to -- J --; ine 22, after "significant digit of the", insert -- P register is ›t a zero by shifting the digits of the --; line 36, "s1" to - sI --; line 37, "*I" to -- *I --; line 40, "ry" to -- rY --; ine 75, "ru" to -- rU --. Col. 42, line 60, "*C" to -- *C --. ›1. 45, line 73, "t" to -- t --; line 74, "(KPk+PKq+KPq)$S_e$FE1E2E3E4" › -- (KPk+Pkq+KPq)$S_e$FE1E2E3E4 --. Col. 46, line 13, "YZ" to · YZ --; line 16, "e" to -- e --; line 20, "(e+T9)" to -- (e+T9) --; ine 21, "KPk+Pkq+KPq" to -- KPk+Pkq+KPq --; line 34, "S+" to · $S_+$ --; line 37, "S" to -- S_ --. Col. 47, line 6, "sU'" to -- sU --; line 27, "P" to -- P --; line 58, "Ptl" to -- Ptl --. Col. 50, line 17, "$T_{qk}$KP" to -- $T_{qk}$KP --; lines 21 & 36, "tlC12" to -- tlC12 --. Col. 51, line 24, "⊕P" to -- ⊕4P --; line 53, "t4" to -- t4 --; line 69, "4D3" to -- 4D3 --; line 70, "M" to -- M --; lines 72 & 73, "The four bits" thru "(D3≠M)." to -- The position is formed as a linear combination of Dl, D2, D3, and (D3≠M). -- (not a new paragraph). Col. 53, line 5, "$f^3$=$d^3$" to -- $f^3$=$d^3$ --; line 6, "($d^4$≠$d^3$)" to -- ($d^4$≠$d^3$) --; line 7, "($d^5$≠$d^3d^4$)" to -- ($d^5$≠$d^3d^4$) --; lines 8 & 28, "($d^6$≠$d^3d^4d^5$)" to -- ($d^6$≠$d^3d^4d^5$) --. Col. 54, line 34, "D2" to -- D2 --; under column headed "Marked" of Table: line 48, "T5T6" to -- T5T6 --, line 50, "T6" to -- T6 --, line 52, "T5" to -- T5 --, line 56, "T5T6T7" to -- T5T6T7 --, line 58, "T6T7" to -- T6T7 --, line 60, "T5" & "T7" to -- T5 -- & -- T7 --, line 62, "T7" to -- T7 --. Col. 55, in the first column of the Table headed "Marked", line 36, (first "Right"), "D1D2M" to -- D1D2M --; lines 54 & 55, "P" to -- P --; line 60, "M" to -- +M --; line 69, "$S_c$" to -- $S_{\not c}$ --. Col. 56, line 62, "T5T6", second occurrence, to -- T5T6 --. Col. 57, lines 3, 4, & 30, "t2" & "t3" to -- t2 -- & -- t3 --; line 40, "T5", second occurrence, to -- T5 --. Col. 59, line 20, "d.t4" to -- d't4 --; lines 34, 35, & 45, "θ04" & "θ00" to -- ∅04 -- & -- ∅00 --; line 40, "tlC12" to -- tlC12 --; line 53, "sM=(tl" to -- sM=(tl --; lines 53 & 54, "VWYZJ(KPq+KPk+Pkq)" to -- VWYZJ(KPq+KPk+Pkq) --; line 60, "P", "F", and all four "E"'s to -- P --, -- F --, & -- E --; line 69, "J" & "P" to -- J -- & -- P --. Col. 61, line 37 (Claim 7), delete first "in response to".

SIGNED AND
SEALED
[illegible]9 1971

(SEAL)
Attest:

Edward M. Fletcher, Jr.
Attesting Officer

WILLIAM E. SCHUYLER, JR.
Commissioner of Patents